US012552464B2

(12) United States Patent
Clark et al.

(10) Patent No.: US 12,552,464 B2
(45) Date of Patent: Feb. 17, 2026

(54) OFF-ROAD VEHICLE

(71) Applicant: Polaris Industries Inc., Medina, MN (US)

(72) Inventors: Lee M. Clark, Minneapolis, MN (US); Owen J. Dickinson, Minneapolis, MN (US); Aaron D. Deckard, Zionsville, IN (US); Evan R. Wozniak, Coon Rapids, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/667,018

(22) Filed: May 17, 2024

(65) Prior Publication Data

US 2024/0383541 A1 Nov. 21, 2024

Related U.S. Application Data

(62) Division of application No. 17/034,077, filed on Sep. 28, 2020, now Pat. No. 12,005,963.
(Continued)

(51) Int. Cl.
*B60K 11/00* (2006.01)
*B60S 5/00* (2006.01)
(Continued)

(52) U.S. Cl.
CPC ............. *B62D 25/24* (2013.01); *B60S 5/00* (2013.01); *B62D 23/005* (2013.01);
(Continued)

(58) Field of Classification Search
CPC ................................................... B60K 11/04
See application file for complete search history.

(56) References Cited

U.S. PATENT DOCUMENTS 4,723,594 A * 2/1988 Koehr .................. F01P 3/18
165/44
4,881,610 A * 11/1989 Kosuge ................. B62J 33/00
237/12.3 A
(Continued)

FOREIGN PATENT DOCUMENTS

CN 202648032 1/2013
CN 203335788 12/2013
(Continued)

OTHER PUBLICATIONS

Can-Am Maverick Sport 60 (front deflector panel for hot radiator air, 2019.
(Continued)

*Primary Examiner* — Valentin Neacsu
*Assistant Examiner* — Hosam Shabara
(74) *Attorney, Agent, or Firm* — SCHWEGMAN LUNDBERG & WOESSNER, P.A.

(57) ABSTRACT

A vehicle shown herein is a side by side utility vehicle having a skid plate positioned beneath a frame, wherein at least a portion of an edge of the skid plate extends upward above a lowermost portion of the frame. The vehicle may further or alternatively include a brake and steering mount coupled to the frame, at least one tie down integrated into the frame, at least on deflection shield positioned between a radiator of the vehicle and a seating area of the vehicle, a floor having at least one channel, and/or a propeller shaft accessible through a console of the floor of the vehicle.

12 Claims, 80 Drawing Sheets

Related U.S. Application Data

(60) Provisional application No. 62/908,194, filed on Sep. 30, 2019.

(51) Int. Cl.
  B62D 23/00 (2006.01)
  B62D 25/20 (2006.01)
  B62D 25/24 (2006.01)
  B60K 17/34 (2006.01)

(52) U.S. Cl.
  CPC ..... B62D 25/2063 (2013.01); B62D 25/2072 (2013.01); *B60K 11/00* (2013.01); *B60K 17/34* (2013.01)

(56) References Cited

U.S. PATENT DOCUMENTS

| | | |
|---|---|---|
| 5,992,926 A | 11/1999 | Christofaro et al. |
| D703,102 S | 4/2014 | Eck et al. |
| 8,746,719 B2 | 6/2014 | Safranski et al. |
| D712,311 S | 9/2014 | Wilcox et al. |
| 8,973,693 B2 | 3/2015 | Kinsman et al. |
| D730,239 S | 5/2015 | Gonzalez |
| 9,102,205 B2 | 8/2015 | Kvien et al. |
| 9,393,894 B2 | 7/2016 | Steinmetz et al. |
| 9,566,858 B2 | 2/2017 | Hicke et al. |
| 9,623,912 B2 | 4/2017 | Schlangen |
| 9,718,351 B2 | 8/2017 | Ripley et al. |
| 9,776,481 B2 | 10/2017 | Deckard et al. |
| 9,789,909 B2 | 10/2017 | Erspamer et al. |
| 9,969,259 B2 | 5/2018 | Safranski et al. |
| 10,036,303 B2 * | 7/2018 | Shiraga ................ F01P 11/10 |
| 10,160,497 B2 | 12/2018 | Wimpfheimer et al. |
| 10,183,605 B2 | 1/2019 | Weber et al. |
| 10,202,149 B1 | 2/2019 | Johnson et al. |
| 10,246,153 B2 | 4/2019 | Deckard et al. |
| 10,259,507 B1 | 4/2019 | Martin et al. |
| 10,279,849 B1 | 5/2019 | Kirtland et al. |
| 10,300,786 B2 | 5/2019 | Nugteren et al. |
| 10,369,861 B2 | 8/2019 | Deckard et al. |
| 10,428,705 B2 | 10/2019 | Nugteren et al. |
| 10,550,754 B2 | 2/2020 | Nugteren et al. |
| 10,639,985 B2 | 5/2020 | Rempelewert et al. |
| 10,737,547 B2 | 8/2020 | Deckard et al. |
| D904,227 S | 12/2020 | Bracy |
| 10,960,941 B2 | 3/2021 | Endrizzi et al. |
| 11,091,003 B2 | 8/2021 | Deckard et al. |
| 11,173,808 B2 | 11/2021 | Swain et al. |
| 11,260,803 B2 | 3/2022 | Fredrickson et al. |
| 11,628,722 B2 | 4/2023 | Rasa et al. |
| 11,660,927 B2 | 5/2023 | Hollman et al. |
| 11,993,124 B2 | 5/2024 | Deckard et al. |
| 12,005,963 B2 | 6/2024 | Clark et al. |
| 2011/0308763 A1* | 12/2011 | Charnesky ............ B60H 1/3229 165/41 |
| 2012/0068498 A1* | 3/2012 | Wolf ...................... B60T 5/00 296/193.1 |
| 2014/0065936 A1* | 3/2014 | Smith .................... B60K 28/04 280/781 |
| 2015/0061275 A1 | 3/2015 | Deckard et al. |
| 2016/0099770 A1 | 4/2016 | Glottmann |
| 2016/0339960 A1 | 11/2016 | Leonard et al. |
| 2017/0106747 A1 | 4/2017 | Safranski et al. |
| 2018/0147966 A1 | 5/2018 | Reed et al. |
| 2018/0178677 A1 | 6/2018 | Swain et al. |
| 2019/0047622 A1 | 2/2019 | Johnson et al. |
| 2019/0183051 A1 | 6/2019 | Matsuo et al. |
| 2019/0285159 A1 | 9/2019 | Nelson et al. |
| 2019/0285160 A1 | 9/2019 | Nelson et al. |
| 2019/0351728 A1 | 11/2019 | Deckard et al. |
| 2020/0338948 A1 | 10/2020 | Deckard et al. |
| 2020/0346542 A1 | 11/2020 | Rasa et al. |
| 2021/0094627 A1 | 4/2021 | Clark et al. |
| 2021/0263513 A1 | 8/2021 | Liu et al. |
| 2021/0268863 A1 | 9/2021 | Deckard et al. |
| 2021/0331752 A1 | 10/2021 | Bennett et al. |
| 2022/0024354 A1 | 1/2022 | Fredrickson et al. |
| 2022/0161884 A1 | 5/2022 | Kramer et al. |
| 2023/0150334 A1 | 5/2023 | Deckard et al. |
| 2024/0294062 A1* | 9/2024 | Malhotra ............. B62D 23/005 |

FOREIGN PATENT DOCUMENTS

| | | |
|---|---|---|
| CN | 104010930 | 8/2014 |
| JP | 2002067800 | 3/2002 |
| KR | 20020009091 | 2/2002 |
| WO | 2016/099770 A2 | 6/2016 |
| WO | 2019/183051 A1 | 9/2019 |

OTHER PUBLICATIONS

International Preliminary Report on Patentability received for PCT Patent Application No. PCT/US2020/053043, mailed on Nov. 12, 2021, 25 pages.

International Search Report and Written Opinion received for PCT Patent Application No. PCT/US2020/053043, mailed on Feb. 22, 2021, 15 pages.

Invitation to Pay Additional Fees received for PCT Patent Application No. PCT/US2020/053043, mailed on Dec. 3, 2020, 2 pages.

"Chinese Application Serial No. 202080069127.2, Decision of Rejection mailed Apr. 2, 2025", With English Machine Translation, 36 pgs.

"U.S. Appl. No. 17/034,077, Restriction Requirement mailed Aug. 22, 2023", 7 pgs.

"U.S. Appl. No. 17/034,077, Response filed Oct. 6, 2023 to Restriction Requirement mailed Aug. 22, 2023", 8 pgs.

"U.S. Appl. No. 17/034,077, Non Final Office Action mailed Oct. 27, 2023", 7 pgs.

"U.S. Appl. No. 17/034,077, Response filed Jan. 29, 2024 to Non Final Office Action mailed Oct. 27, 2023", 7 pgs.

"U.S. Appl. No. 17/034,077, Notice of Allowance mailed Feb. 14, 2024", 7 pgs.

"Mexican Application Serial No. MX a 2022 003722, Office Action mailed Apr. 10, 2025", With English Machine Translation, 17 pgs.

"Canadian Application Serial No. 3150378, Examiners Rule 86(2) Report mailed Jun. 25, 2025", 5 pgs.

"Chinese Application Serial No. 202080069127.2, Response filed Jul. 1, 2025 to Decision of Rejection mailed Apr. 2, 2025" w English Claims, 13 pgs.

* cited by examiner

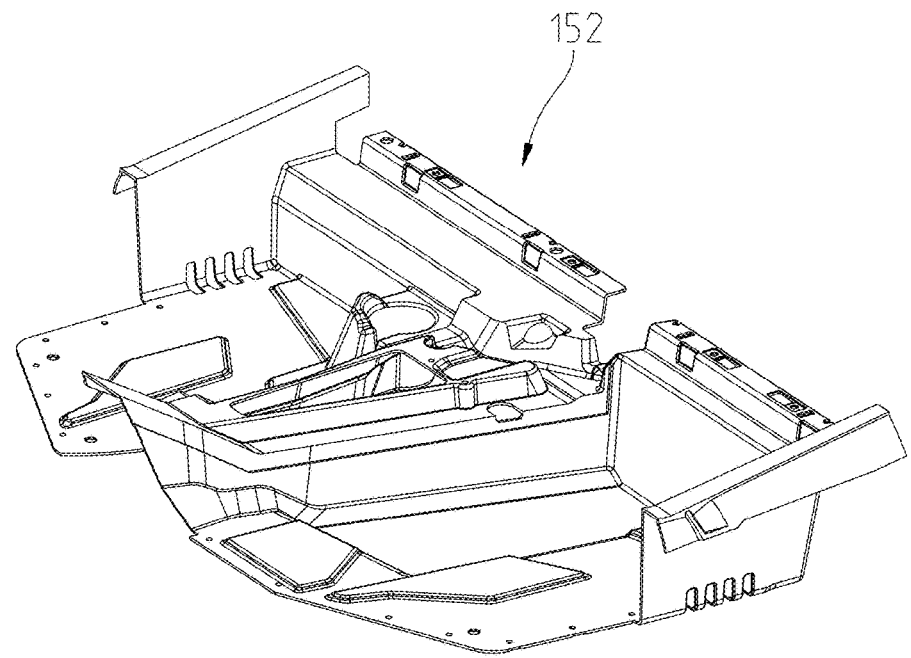
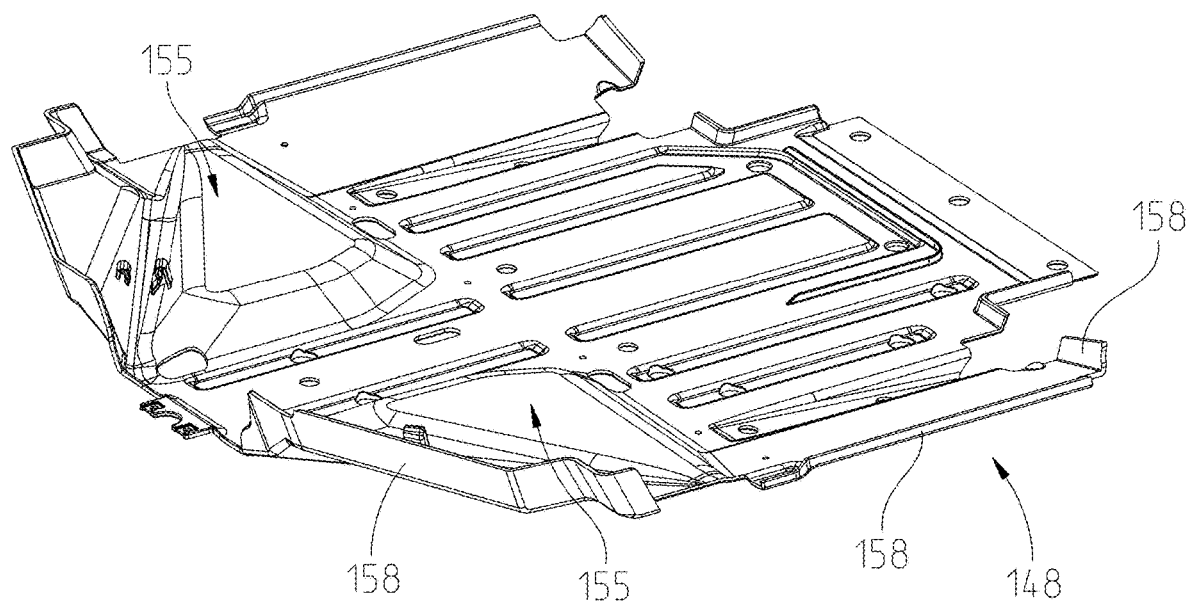
Fig. 16

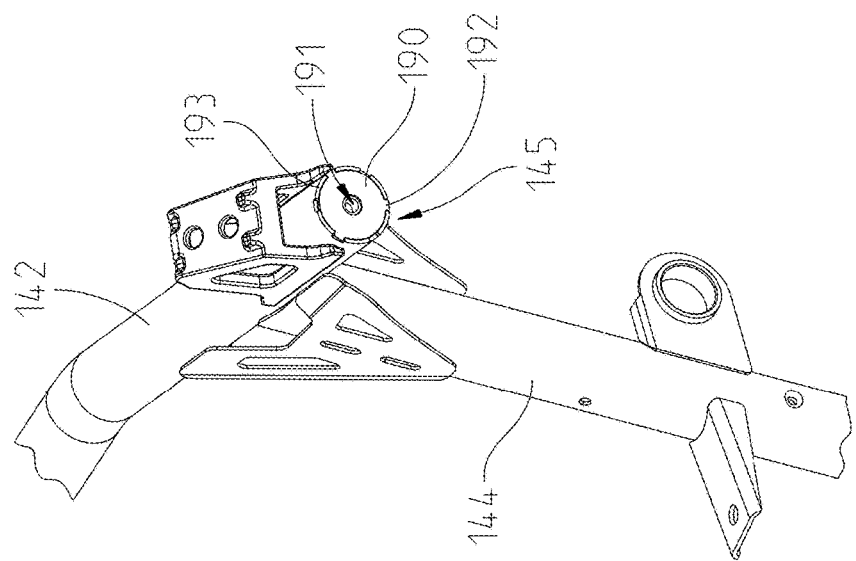
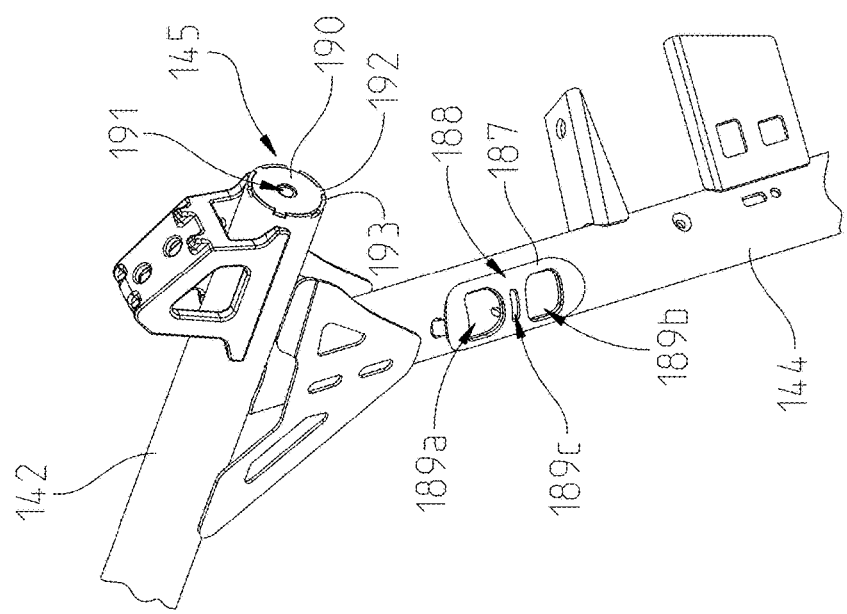
Fig. 24

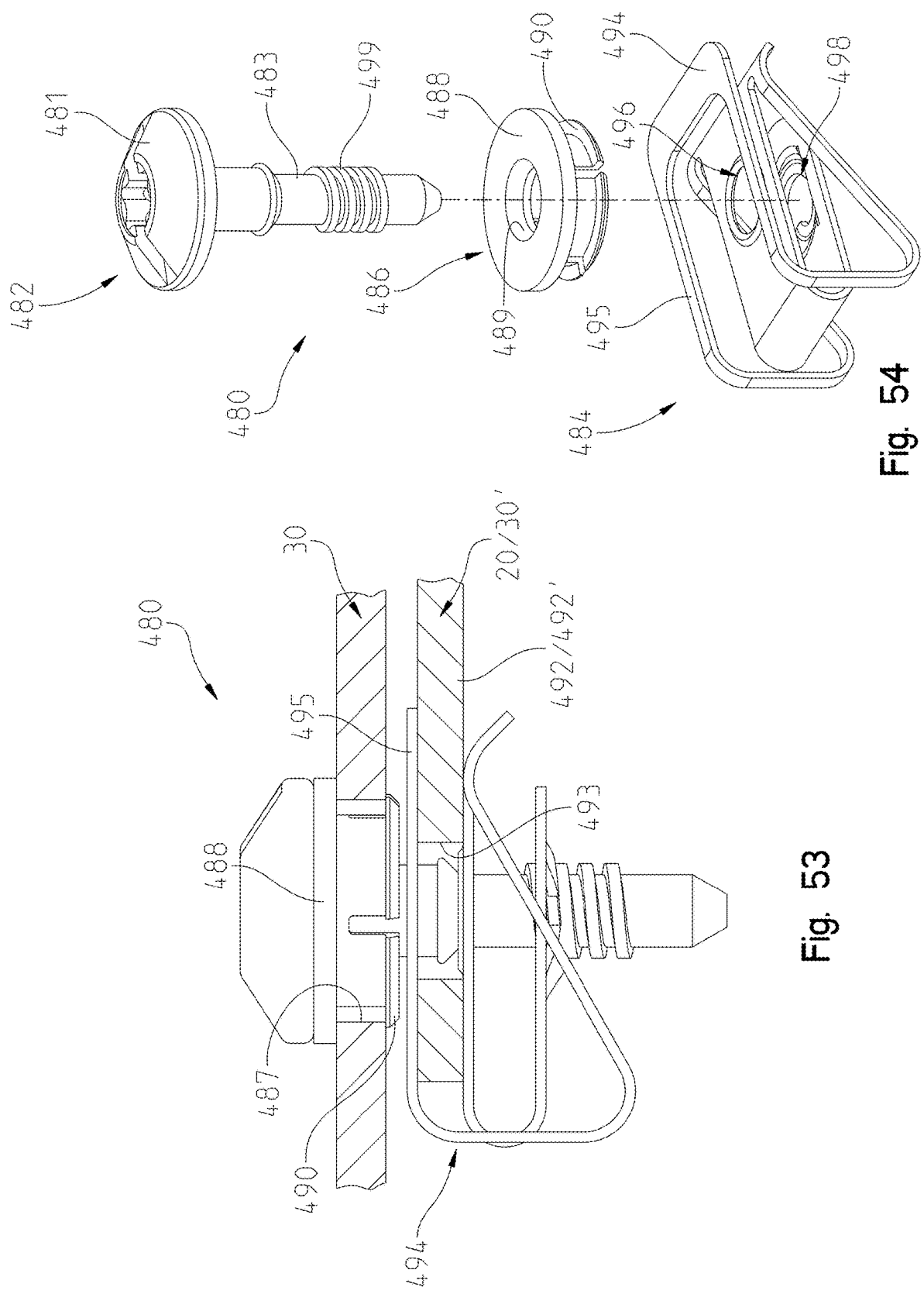

OFF-ROAD VEHICLE

CROSS-REFERENCE TO RELATED APPLICATIONS

The present application is a divisional of U.S. patent application Ser. No. 17/034,077, filed Sep. 28, 2020, which claims priority to U.S. Provisional Patent Application Ser. No. 62/908,194, filed Sep. 30, 2019, the complete disclosures of which are expressly incorporated by reference herein.

FIELD OF THE DISCLOSURE

The present invention relates to off-road vehicles including side-by-side vehicles or utility vehicles ("UTVs").

BACKGROUND OF THE DISCLOSURE

Generally, UTVs or side-by-side vehicles are used to carry one or two passengers and a small amount of cargo over a variety of terrains. Due to the terrain often traveled when using UTVs, the frame of the vehicle is susceptible to damage. To protect the frame, a skid plate is often used. However, present skid plates fail to provide protection to an outer portion of the frame closest to the skid plate. Thus, a need exists for a skid plate that is capable of further protecting the frame as well as other components of the vehicle.

In addition, current UTVs have connection mounts for brake and steering assemblies that is bulky and/or requires multiple brackets and/or couplers. Thus, a need exists for a brake and steering assembly mount that is less bulky and/or requires fewer brackets and/or couplers.

Furthermore, in order to transport a UTV, the UTV is often secured to a hauling trailer using various straps. However, current UTVs fail to provide an easy connection point for coupling these various straps to the vehicle. Thus, a need exists for a secure connection point on the UTV.

In addition, a radiator is often used in UTVs. In many instances, the radiator is positioned near a seating area for occupants of the UTV, and often blows heated air into the seating area causing an undesired elevation of temperature within the seating area. Thus, a need exists for a way to reroute this heated air away from the seating area.

Also, currently, lines used to route fluid, whether it be air, oil, water, brake fluid, etc., from the front of the UTV to the back of the UTV or vice versa are often positioned below a floor of the UTV causing problems with serviceability and protection of these lines. As such, a need exists for alternative positioning of these lines to improve serviceability and protection of these lines.

Furthermore, in current UTVs, when service is required for a drivetrain of the UTV, multiple components, or components whose removal is labor intensive, are required to be removed from the UTV in order to do. Thus, a need exists for easier serviceability of the drivetrain of the UTV.

SUMMARY OF THE DISCLOSURE

In one embodiment of the disclosure, a vehicle comprises a frame, a body supported by the frame, front and rear ground engaging members supporting the frame and the body, a powertrain drivingly coupled to the front and rear wheels, a seating area supported by the frame, a cab frame positioned over the seating area, and a skid plate positioned beneath the frame, wherein at least a portion of an edge of the skid plate extends upward above a lowermost portion of the frame.

In another embodiment of the disclosure, a vehicle comprises a frame, a body supported by the frame, a floor supported by the frame, front and rear ground engaging members supporting the frame and the body, a powertrain drivingly coupled to the front and rear wheels, a seating area supported by the frame, a cab frame positioned over the seating area, and a skid plate positioned beneath the frame, wherein the skid plate includes a plurality of openings and the floor includes a plurality of openings, the plurality of openings in the skid plate being misaligned with the plurality of openings in the floor.

In another embodiment, a vehicle comprises a frame, front and rear ground engaging members supporting the frame, a powertrain drivingly coupled to the front and rear wheels, a seating area supported by the frame, and a brake and steering mount coupled to the frame, the brake and steering mount comprising a plate coupled to the frame and a bracket configured to be coupled to the plate, wherein the plate includes a plurality of stamped posts and the bracket includes at least one opening, the at least one opening of the bracket being configured to receive the plurality of stamped posts of the plate.

In another embodiment, a vehicle comprises a frame having a plurality of tube members, front and rear ground engaging members supporting the frame, a powertrain drivingly coupled to the front and rear wheels, a seating area supported by the frame, and at least one tie down, the at least one tie down comprising a plate configured to be received with an opening in one of the plurality of tube members, wherein the plate includes at least two openings.

In another embodiment, a vehicle comprises a frame, front and rear ground engaging members supporting the frame, a powertrain drivingly coupled to the front and rear wheels, a radiator configured to cool the powertrains, a seating area supported by the frame, and at least one deflection shield positioned between the radiator and the seating area, wherein the deflection shield is configured to route hot air from the radiator away from the seating area.

In yet another embodiment, a vehicle comprises a frame, front and rear ground engaging members supporting the frame, a powertrain drivingly coupled to the front and rear wheels, a seating area supported by the frame, the seating area including a first seat and a second seat, and a floor supported by the frame, the floor including at least one channel positioned between the first seat and the second seat, wherein the at least one channel is integrally formed within the floor.

In another embodiment, a vehicle comprises a frame, front and rear ground engaging members supporting the frame, a powertrain drivingly coupled to the front and rear wheels, a seating area supported by the frame, the seating area including a first seat and a second seat, and a floor supported by the frame, the floor including at least one channel positioned within an upper surface of the floor, wherein at least one of a wire and a fluid line configured to be positioned within the at least one channel is accessible from the seating area.

In yet another embodiment, a method for servicing a propeller shaft of a vehicle is discloses. The method comprises accessing the propeller shaft through an opening within a console in a floor of the vehicle, disengaging the propeller shaft from a drivetrain of the vehicle, and removing at least a portion of the propeller shaft through the opening in the console.

In another embodiment, a vehicle comprises a frame, front and rear ground engaging members supporting the frame, a powertrain drivingly coupled to the front and rear wheels, a seating area supported by the frame, the seating area including a first seat and a second seat, and a floor supported by the frame, the floor including an opening accessible within the seating area, wherein a portion of the powertrain is removable through the opening.

BRIEF DESCRIPTION OF THE DRAWINGS

FIG. 16 shows an exploded view of the skid plate of FIG. 14 and a floor of the vehicle of FIG. 1;

FIG. 24 shows a left rear perspective view an upper rear portion of the lower frame portion of FIG. 11 including integrated tie downs and capped off chassis tubes of the present disclosure;

FIG. 53 shows an elevational view of the coupler of FIG. 52 coupling the body panel and the frame portion of FIG. 52;

FIG. 54 shows an exploded view of the coupler alone of FIG. 52;

DETAILED DESCRIPTION OF THE DRAWINGS

Figure 1:
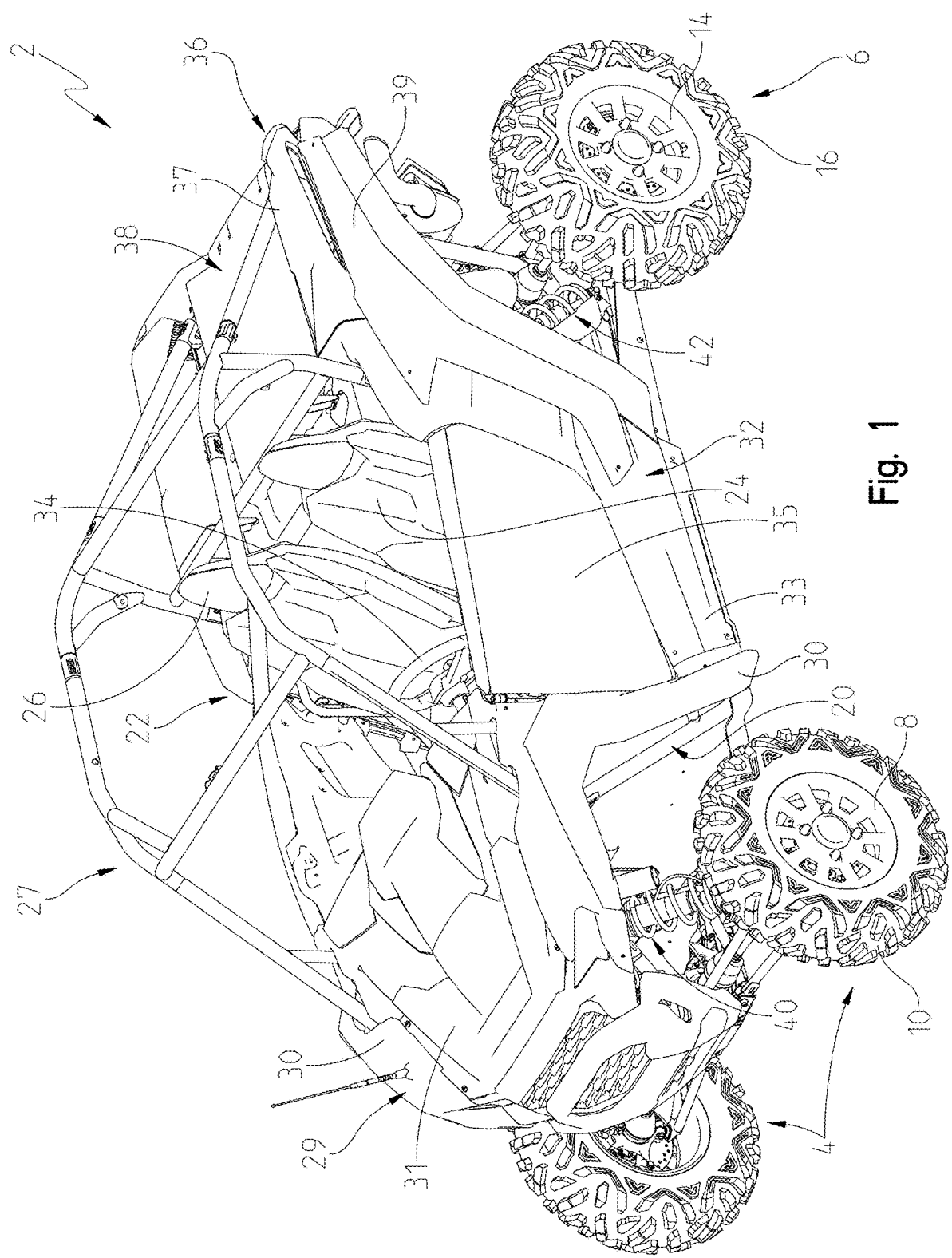
FIG. 1 shows a front left perspective view of a vehicle of the present disclosure.
Figure 2:
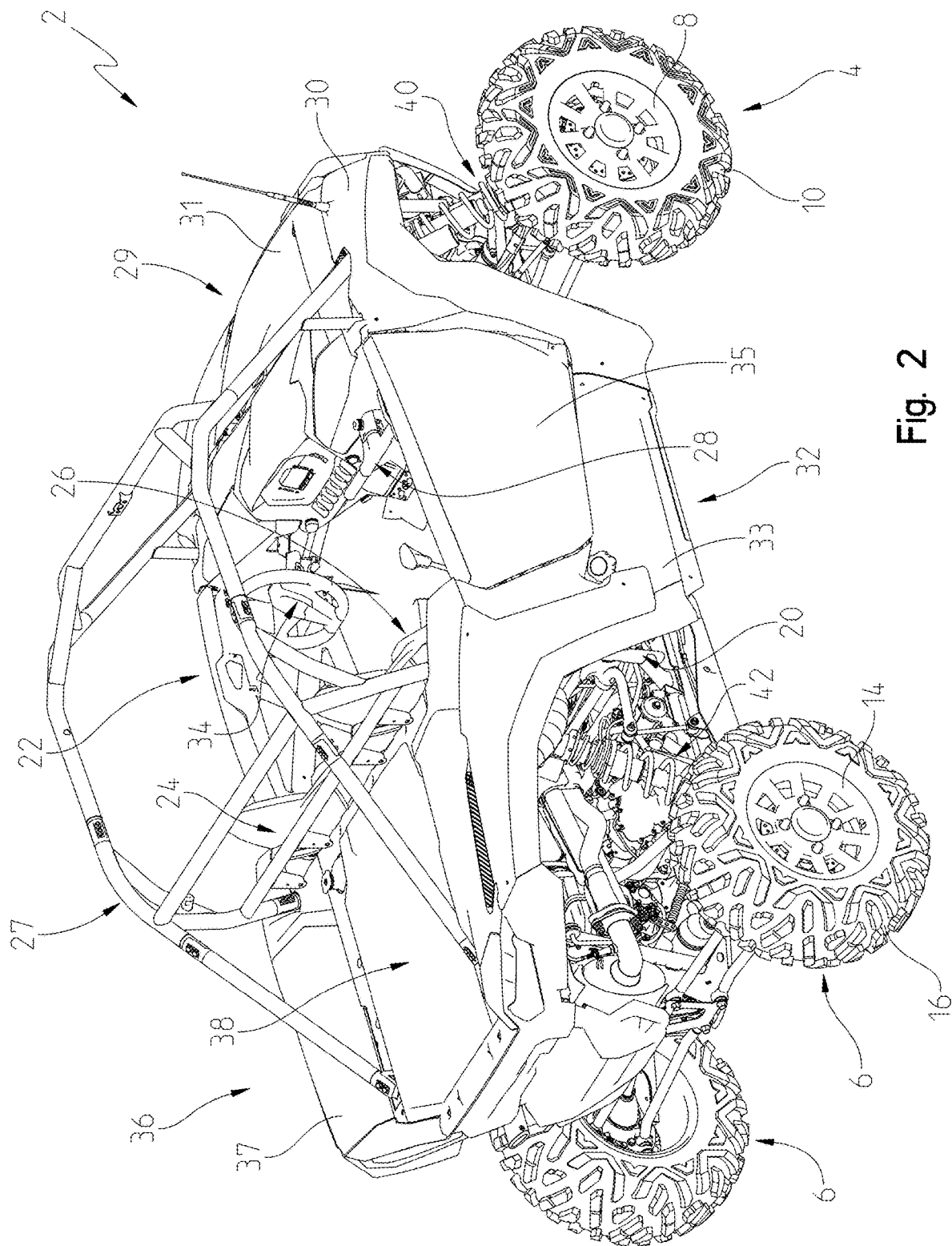
FIG. 2 shows a right rear perspective view of the vehicle of FIG. 1.
Figure 3:
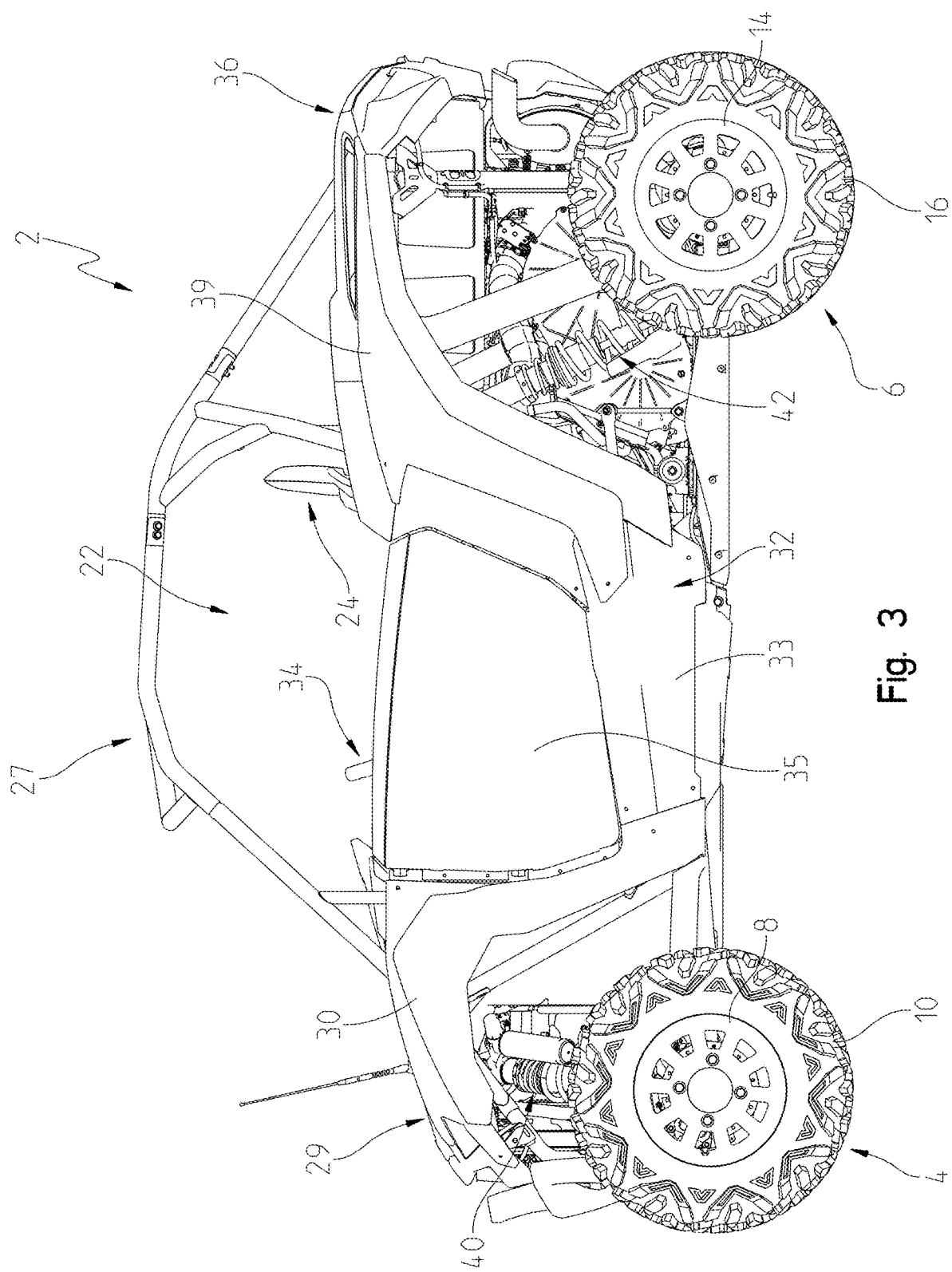
FIG. 3 shows a left elevational side view of the vehicle of FIG. 1.
Figure 4:
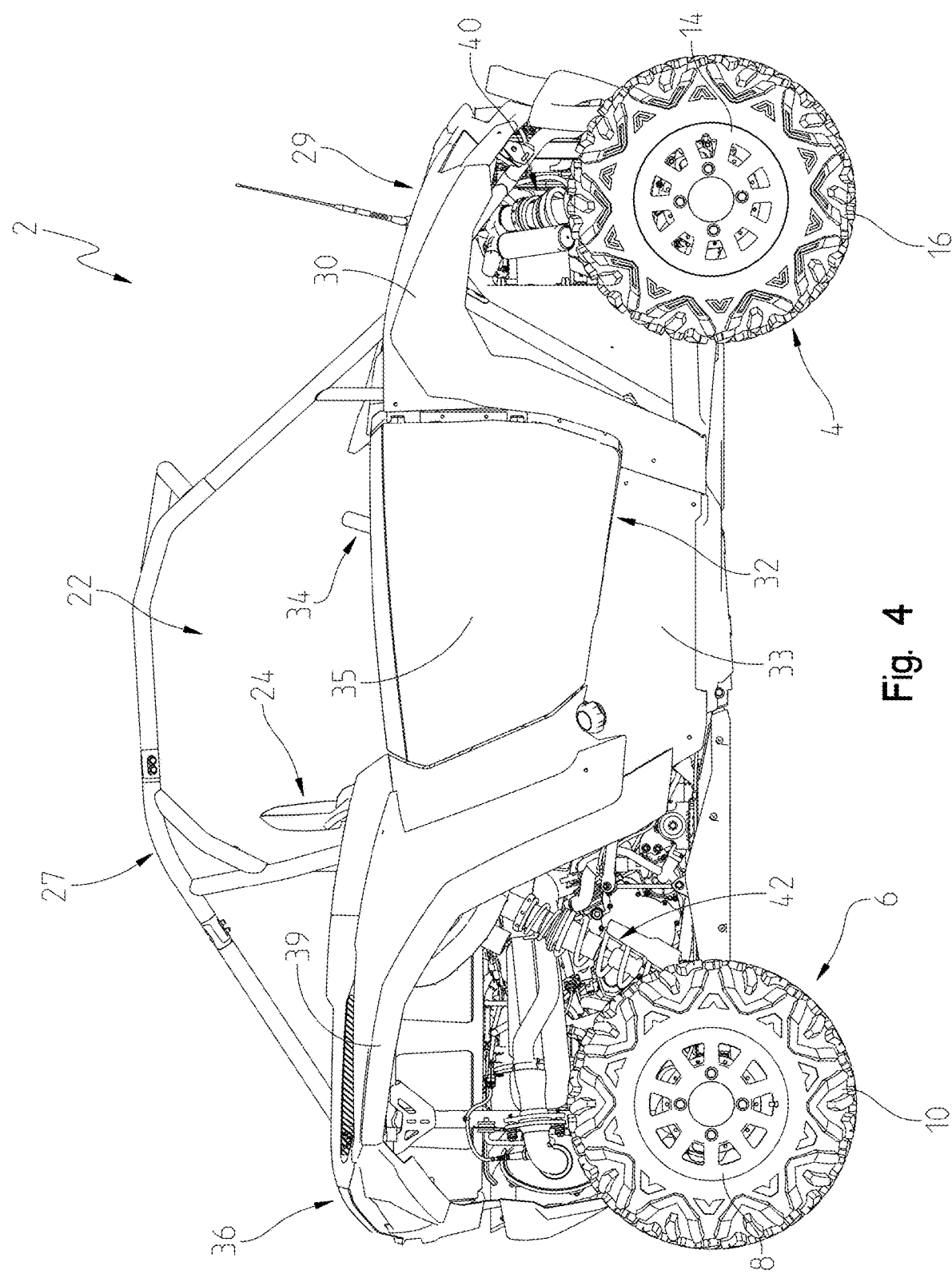
FIG. 4 shows a right elevational side view of the vehicle of FIG. 1.
Figure 5:
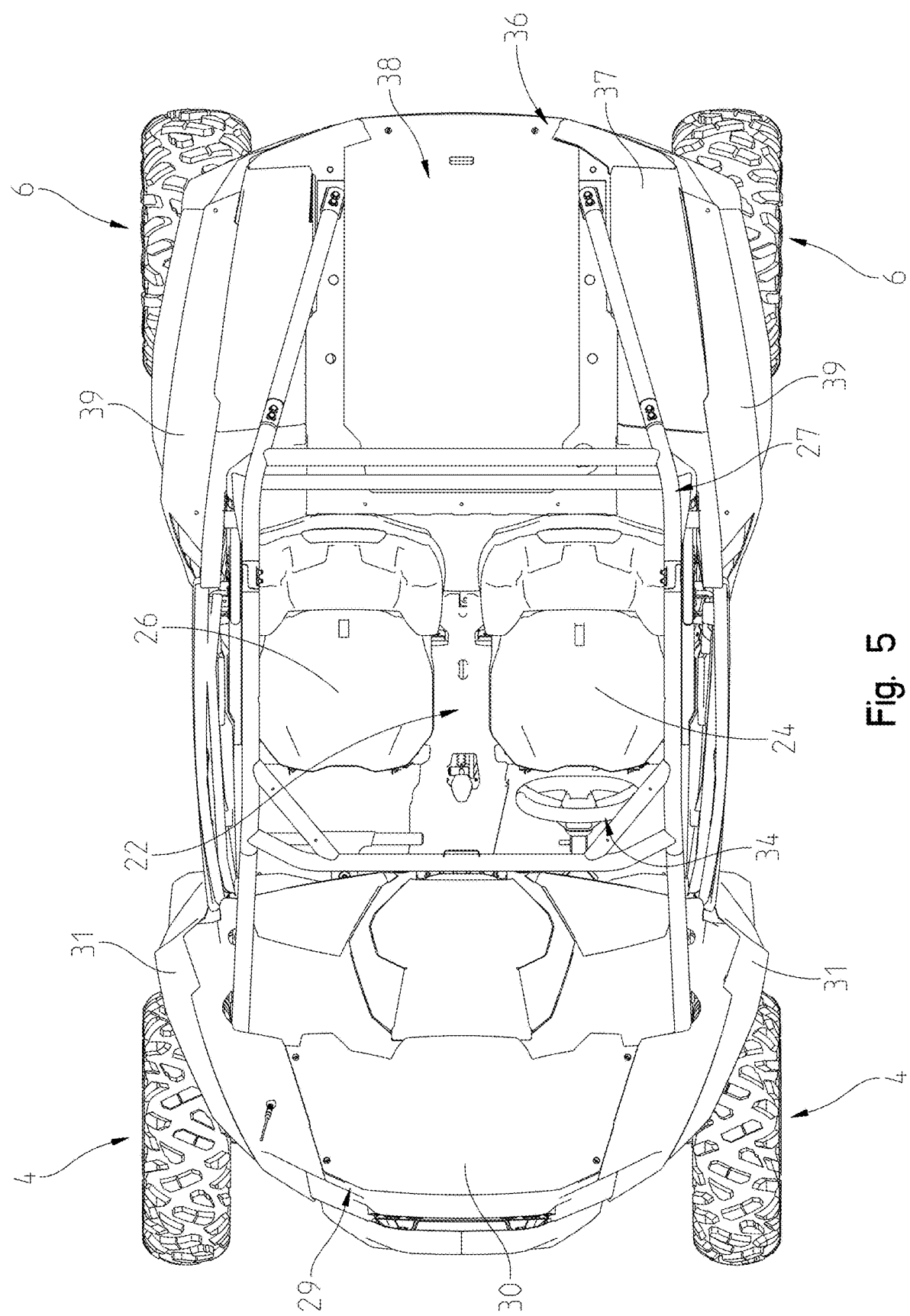
FIG. 5 shows a top plan view of the vehicle of FIG. 1.
Figure 6:
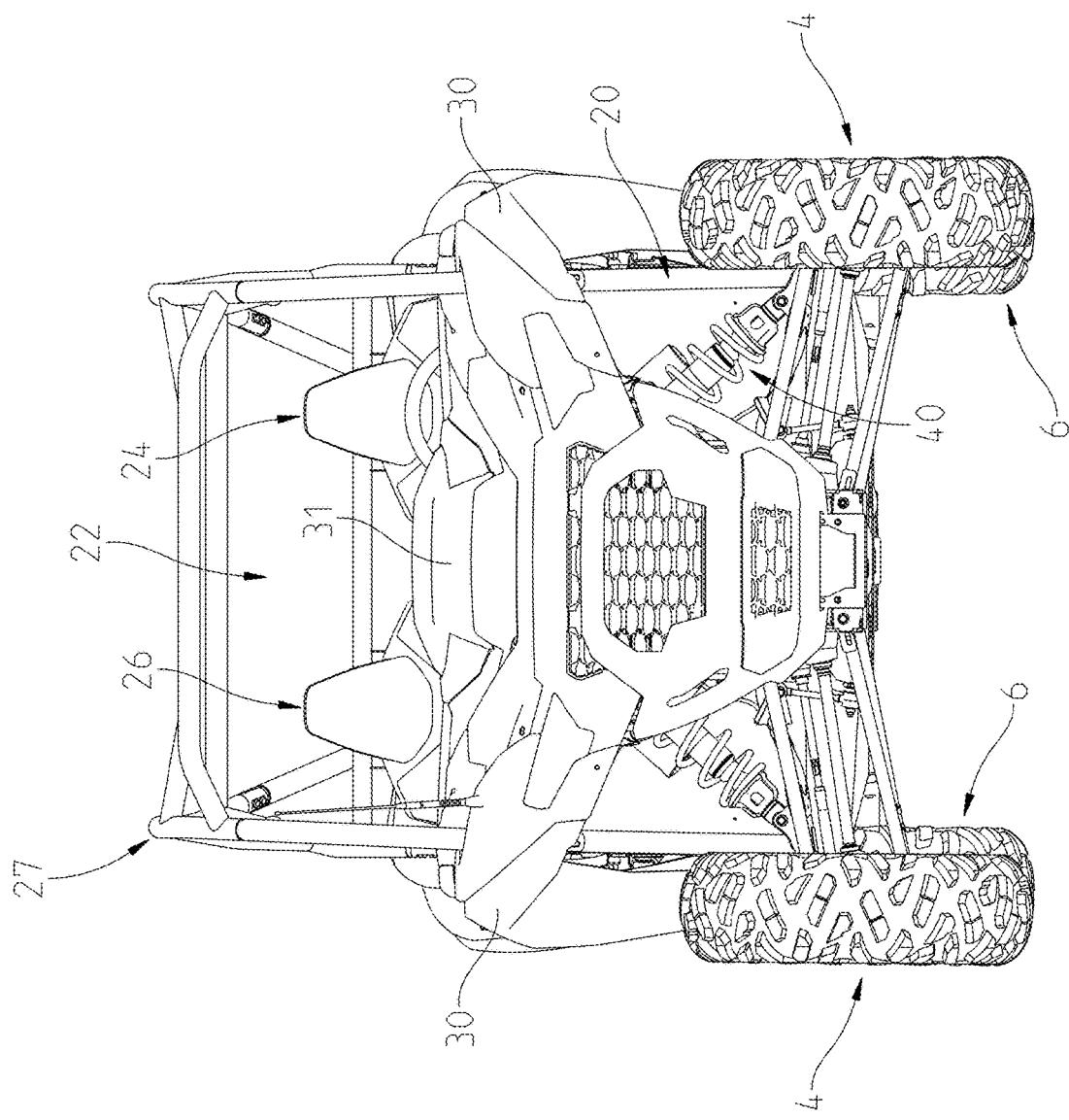
FIG. 6 shows a front elevational view of the vehicle of FIG. 1.
Figure 7:
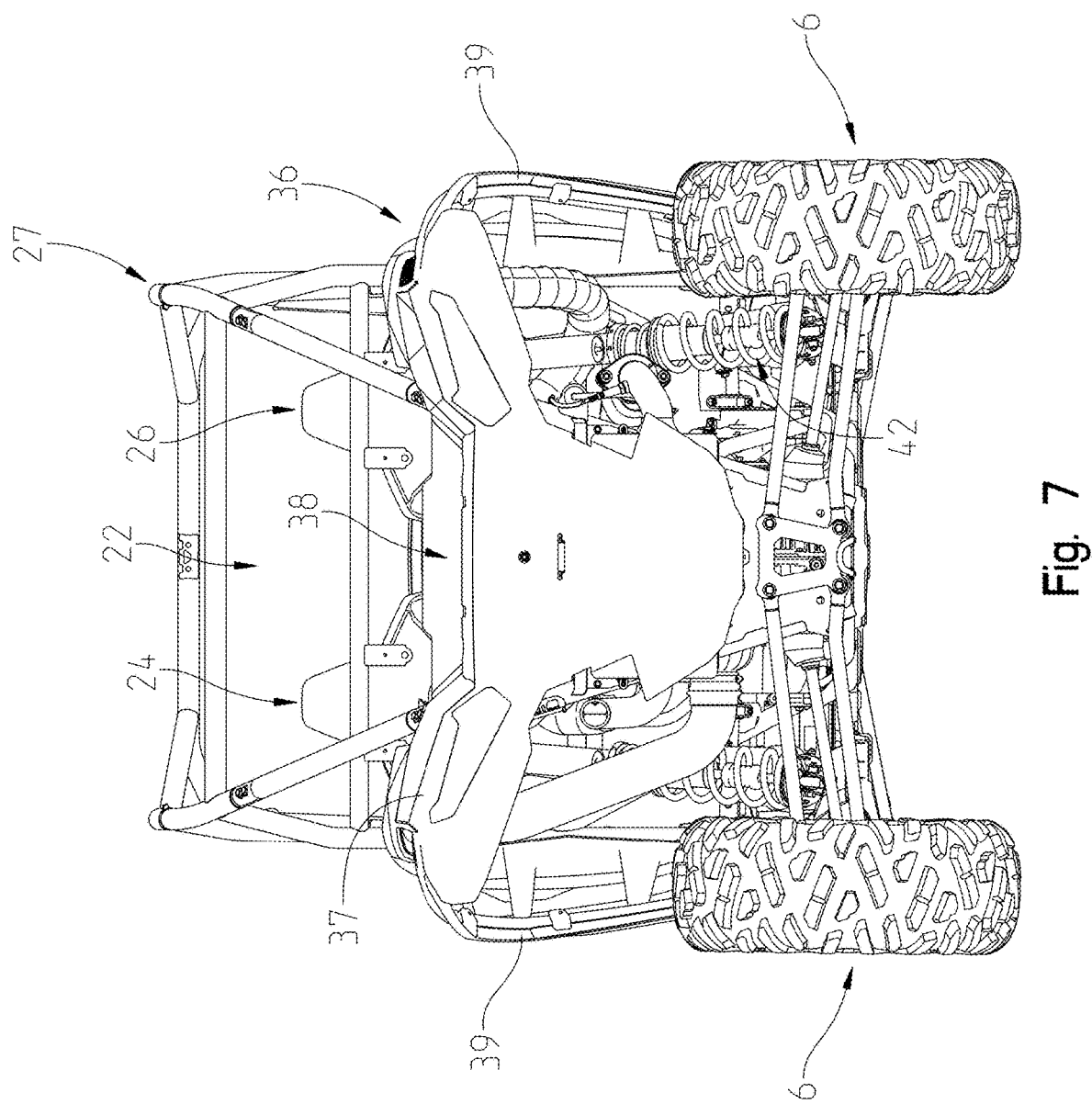
FIG. 7 shows a rear elevational view of the vehicle of FIG. 1.
Figure 8:
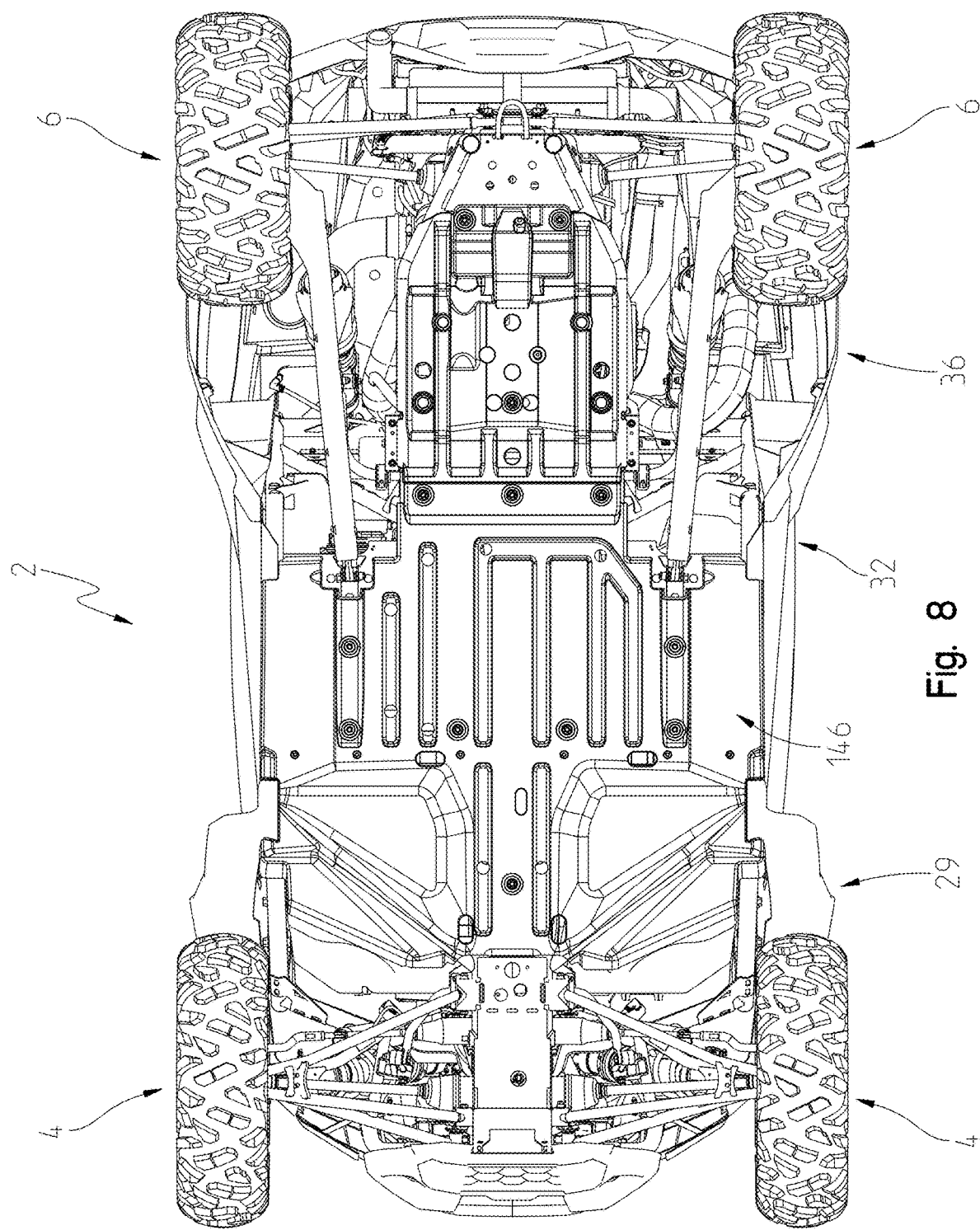
FIG. 8 shows a bottom plan view of the vehicle of FIG. 1.

With reference first to FIGS. 1-8, the vehicle of the present invention will be described. As shown, the vehicle is generally depicted as reference number 2 which includes front ground engaging members 4 and rear ground engaging members 6. Front ground engaging members 4 are comprised of rims 8 and tires 10, and rear ground engaging members 6 are comprised of rims 14 and tires 16. Ground engaging members 4 and 6 support a vehicle frame, which is shown generally at 20, through front and rear suspension assemblies 40 and 42, respectively. Vehicle frame 20 supports a seating area 22 comprised of a driver's seat 24 and a passenger seat 26. A passenger grab bar 28 (FIG. 2) is provided for a passenger in seat 26 as described in further detail below. As best shown in FIG. 2, vehicle 2 further includes a steering assembly for steering front ground engaging members 4 whereby the steering assembly includes a steering wheel 34 which is both tiltable and longitudinally movable.

Frame 20 of vehicle 2 is comprised of a cab frame 27 that generally extends over the seating area 22 to protect the driver and passenger(s) from such objects as tree branches, etc, and a lower frame portion 98 (FIGS. 11 and 12) positioned below and supporting cab frame 27. Frame 20 is configured to support a front body assembly 29 having front fender body panels 30 and a hood panel 31, a main body assembly 32 having main body panels 33 and doors 35, and a rear body assembly 36 having rear fender body panels 39, a rear body panel 37, and a cargo area 38. In various embodiments, portions of rear fender body panels 37 are positioned above rear body panel 39.

Figure 9:
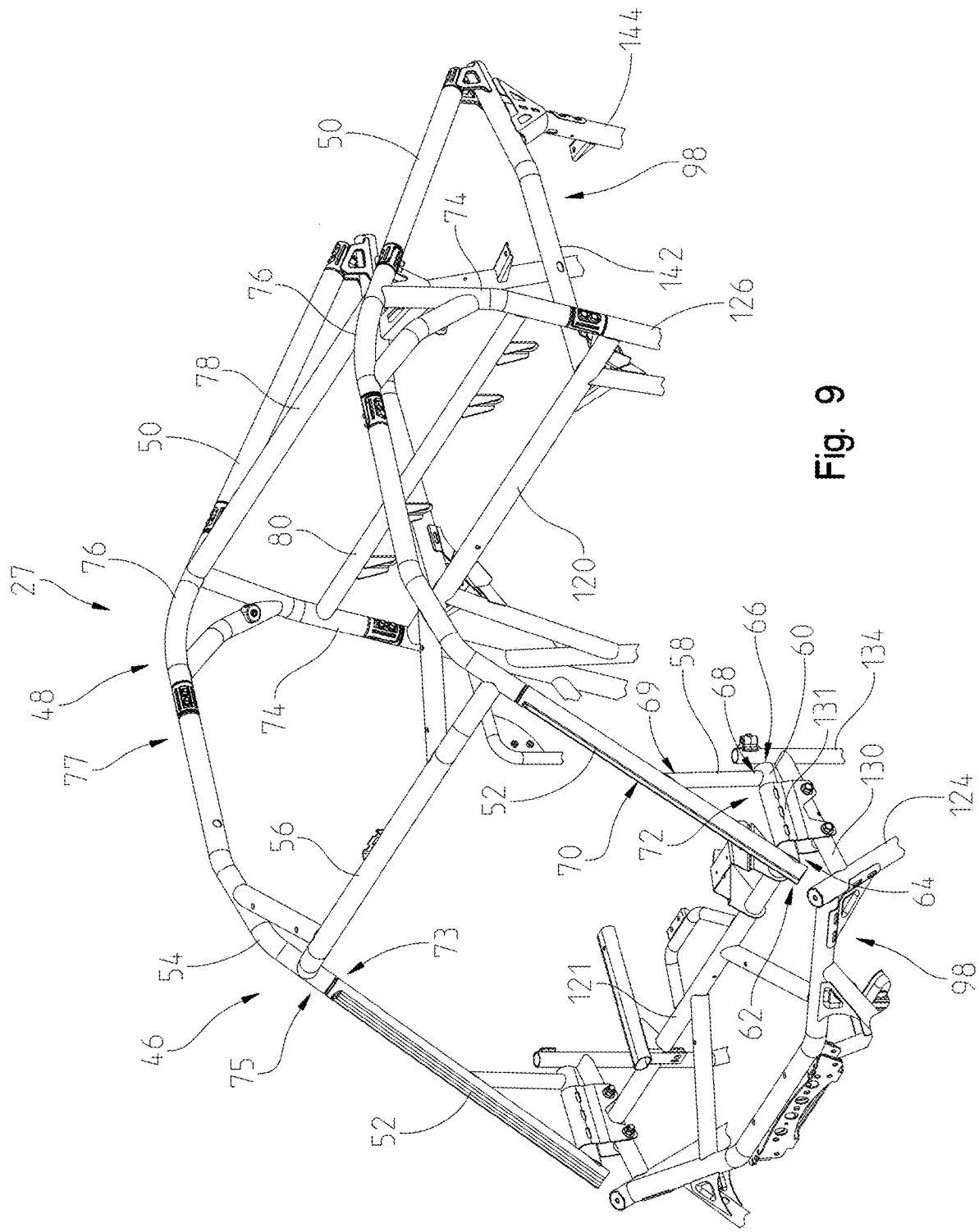
FIG. 9 shows a front left perspective view of a cab frame of the vehicle of FIG. 1.
Figure 10:
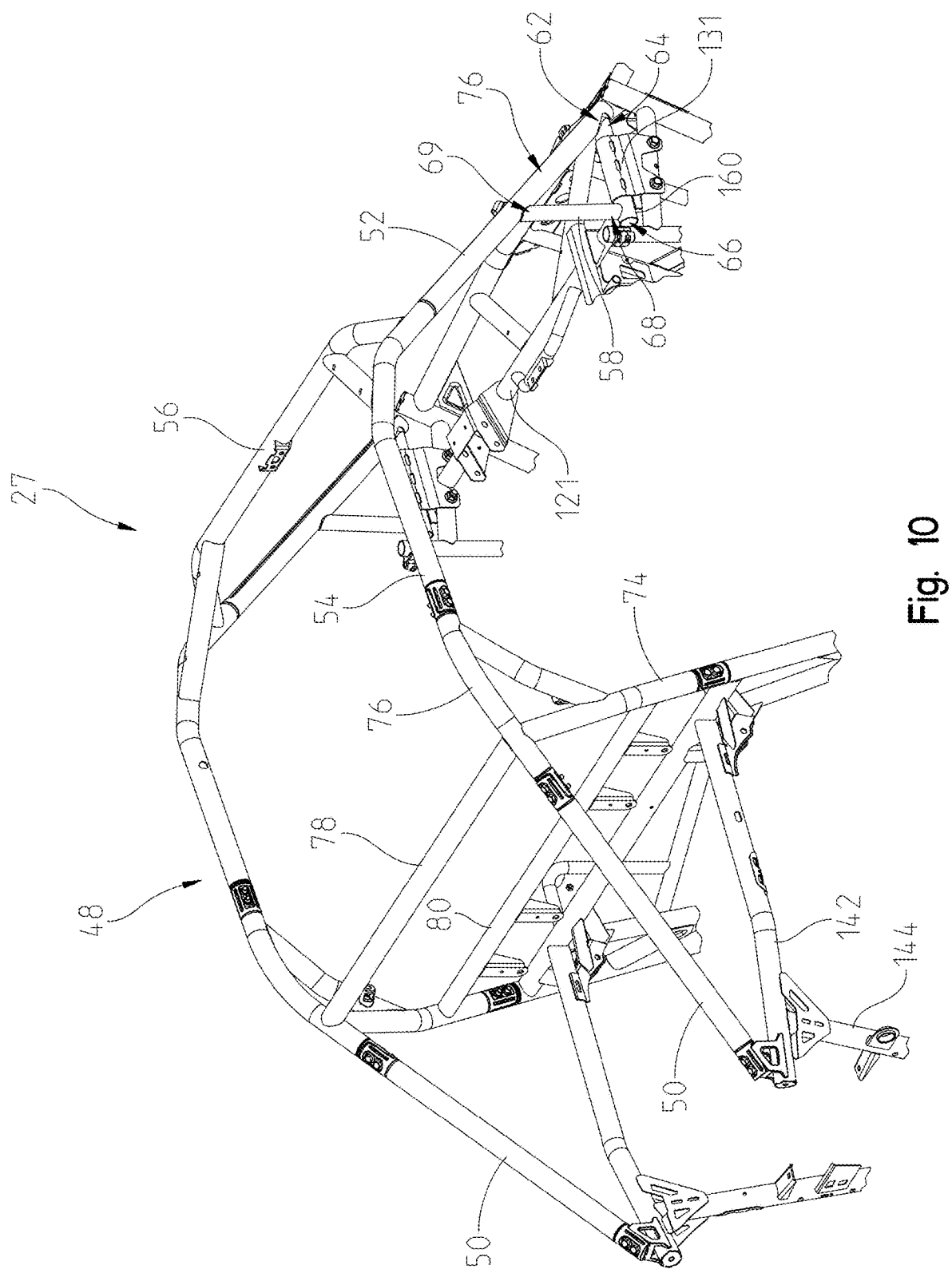
FIG. 10 shows a right rear perspective view of the cab frame of FIG. 9

Referring now to FIGS. 9 and 10, cab frame 27 of frame 20 will be described in further detail. Cab frame 27 generally includes a front frame portion 46, a middle frame portion 48 coupled to front frame portion 46, and rear downwardly angled frame members 50 coupled to middle frame portion 48 and lower frame portion 98. In general, cab frame 27 is coupled to lower frame portion 98 under front body assembly 29, main body assembly 32, and rear body assembly 36 in such a way that front body assembly 29, main body assembly 32, and rear body assembly 36 may be removed without removing cab frame 27.

Front frame portion 46 generally includes front upwardly angled frame tubes 52, arced frame tubes 54, front cross frame tube 56, support frame tube 58, and coupling frame tube 60. A first or lower end 62 of front frame tubes 52 is coupled to a first end 64 of coupling frame tube 60, and a second end 66 of coupling frame tube 60 is coupled to a first end 68 of support frame tube 58. A second end 69 of support frame tube 58 is coupled to a midsection 70 of front frame tube 52, such that front frame member 52, coupling frame tube 60 and support frame tube 58 create a triangular opening 72 therebetween. An upper or second end 73 of front frame tubes 52 is coupled to a first end 75 of arced frame tubes 54, and a second end 77 of arced frame tubes 54 is coupled to middle frame portion 48.

Middle frame portion 48 generally includes upstanding frame members 74, arced frame members 76, an upper cross member 78, and a lower cross member 80. Upstanding frame members 74 are coupled to arced frame members 76 and lower frame portion 98, and arced frame members 76 are also coupled to front frame portion 46 and rear frame members 50. Upper cross member 78 is coupled between arced frame members 76, and lower cross member 80 is coupled between upstanding frame members 74.

Figure 11:
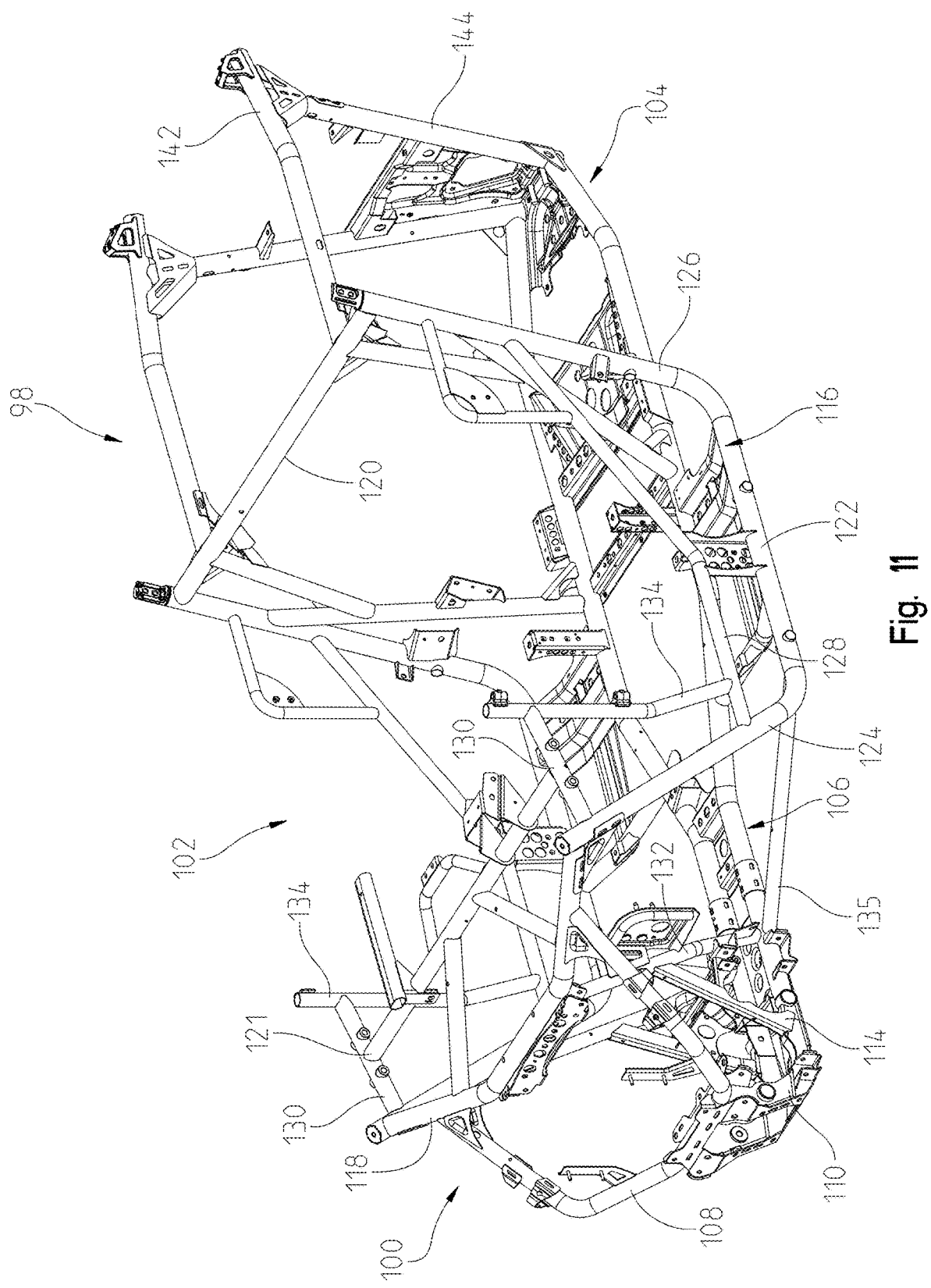
FIG. 11 shows a front left perspective view of a lower frame portion of the vehicle of FIG. 1.
Figure 12A:
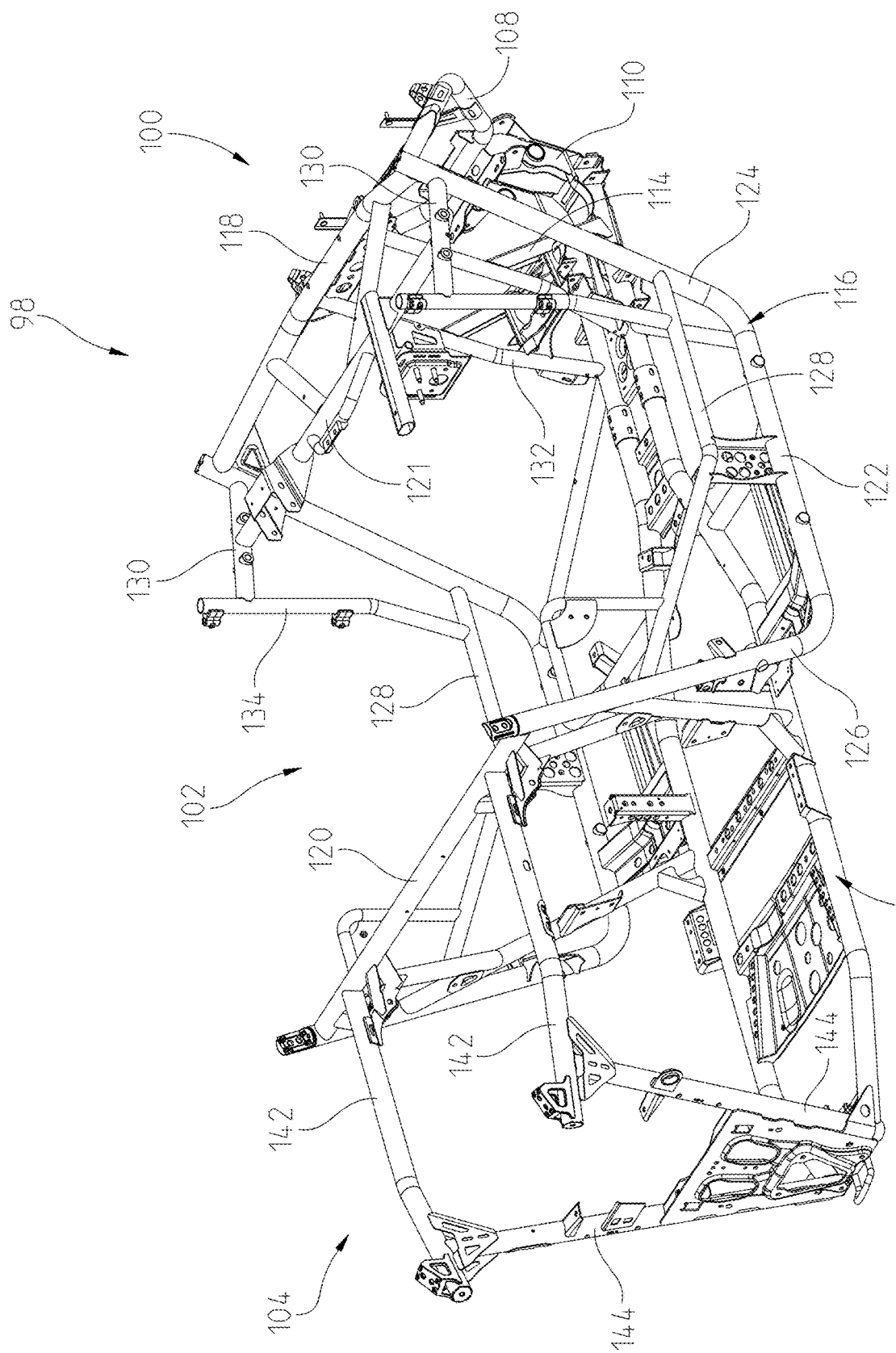
FIG. 12A shows a right rear perspective view of the lower frame portion of FIG. 11.

With reference now to FIGS. 11 and 12A, lower frame portion 98 will be described in further detail. Lower frame portion 98 generally includes a front frame portion 100, a middle frame portion 102, a rear frame portion 104, and a pair of inner frame tubes 106 coupled to each of front frame portion 100, middle frame portion 102, and rear frame portion 104. In various embodiments, front frame portion 100, middle frame portion 102, rear frame portion 104, and inner frame tube 106 are all formed together as a single unit with weldments coupling the various portions, tubes, and/or members in order to reduce the overall cost and weight of vehicle 2 as well as increase its strength efficiencies.

Still referring to FIGS. 11 and 12A, front frame portion 100 includes an upper U-shaped frame tube 108, a front gear drive access bracket 110, a front gear drive access panel 112 (FIG. 26), and upstanding members 114. Front gear drive access bracket 110 and upstanding members 114 are coupled to inner frame tubes 106, while upper U-shaped frame tube 108 is coupled to front gear drive access bracket 110 and middle frame portion 102. Upstanding members 114 are coupled to middle frame portion 102 at a position inward of U-shaped frame tube 108.

Middle frame portion 102 includes a pair of outer frame tubes 116, an arced front frame tube 118 coupling front ends of outer frame tubes 116, a rear frame tube 120 coupling rear ends of outer frame tubes 116, and dash frame tube 121 extending between outer frame tubes 116. Outer frame tubes 116 each include a longitudinal portion 122, a front upstanding portion 124, and a rear upstanding portion 126. Middle frame portion 102 further includes a first pair of longitudinal frame members 128, each extending between front upstanding portion 124 of one of outer frame tube 116 and rear upstanding portion 126 of the one outer frame tube 116, a second pair of longitudinal frame members 130 extending rearward from front upstanding portions 124, a first pair of upstanding frame tubes 132 coupling arced front frame tube 118 to inner frame tubes 106, a second pair of upstanding frame tubes 134 coupling the first pair of longitudinal frame members 128 to second pair of longitudinal frame members 130, and a pair of forward extending angled frame tubes 135 coupling outer frame tubes 116 to inner frame tubes 106. Dash frame tube 121 extends between second pair of longitudinal frame members 130, and cab frame 27 is coupled to lower frame portion 98 at longitudinal frame members 130 via a bracket 131 (FIGS. 9 and 10).

Referring still to FIGS. 11 and 12A, rear frame portion 104 includes a pair of longitudinal tubes 142 extending rearward from rear frame tube 120 of middle frame portion 102 and a pair of upstanding frame tubes 144 coupling longitudinal tubes 142 to inner frame tubes 106.

Figure 12B:
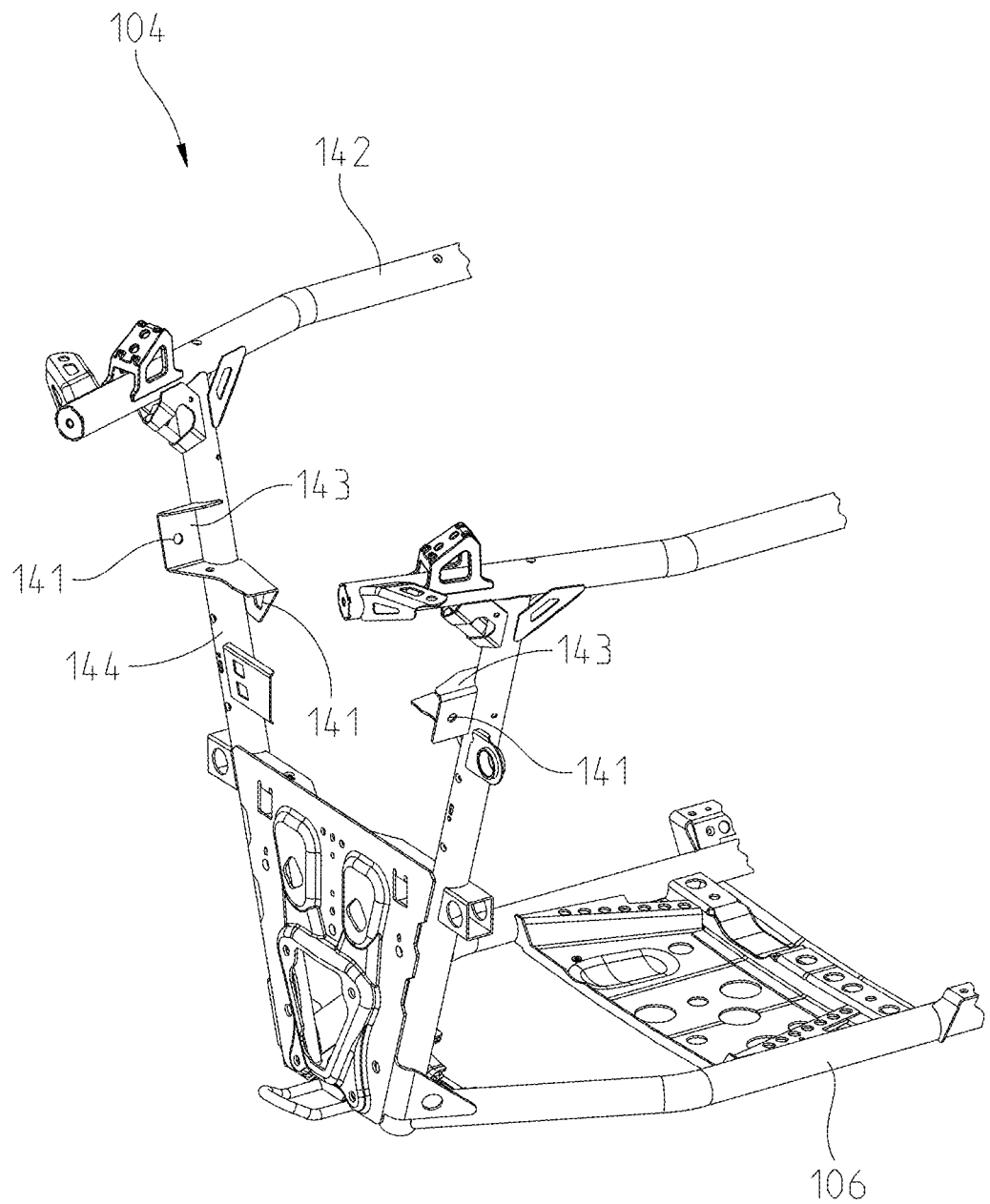
FIG. 12B shows a right rear perspective view of the lower frame portion of FIG. 11 with alternative integrated tie-down or coupling members.

Referring now to FIG. 12B, rear frame portion 104 may include integrated coupling members, illustratively gusseted tie-down members 143 supported on upstanding frame tubes 144. Tie-down members 143 may be integrally formed with upstanding frame tubes 144 or may be welded, adhered, or otherwise permanently coupled thereto. Tie-down members 143 are configured as gussets and include apertures 141 which may be used to secure cargo or vehicle components to tie-down members 143. Because tie-down members 143 are integrated with upstanding frame tubes 144, any load at tie-down members 143 may be distributed to upstanding frame tubes 144 to reduce localized loads and stresses at rear frame portion 104.

Figure 13:
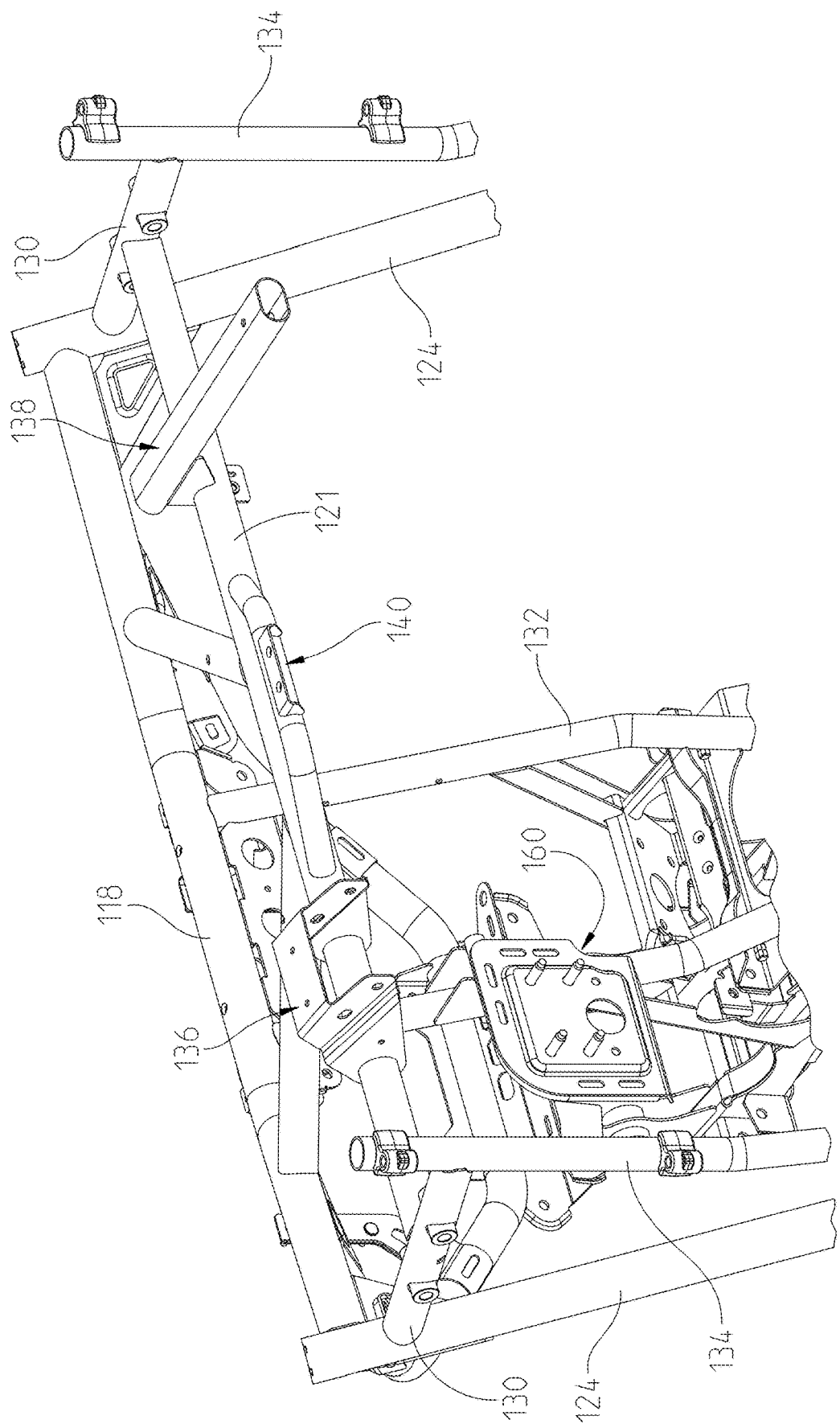
FIG. 13 shows an enlarged view of a dashboard frame portion of the lower frame portion of FIG. 11.
Figure 14:
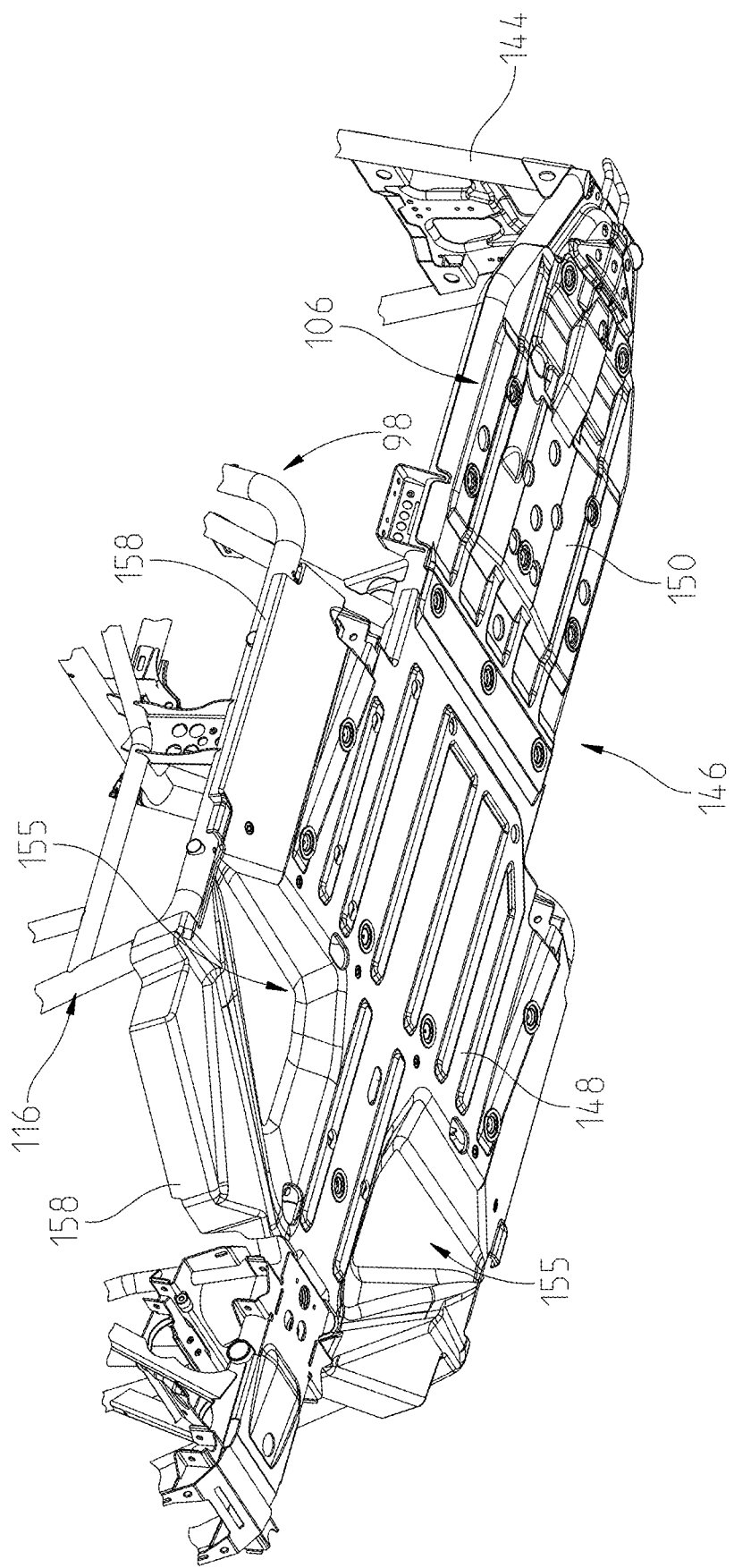
FIG. 14 shows a bottom perspective view of a portion of the lower frame portion of FIG. 11 including a skid plate of the present disclosure.
Figure 15:
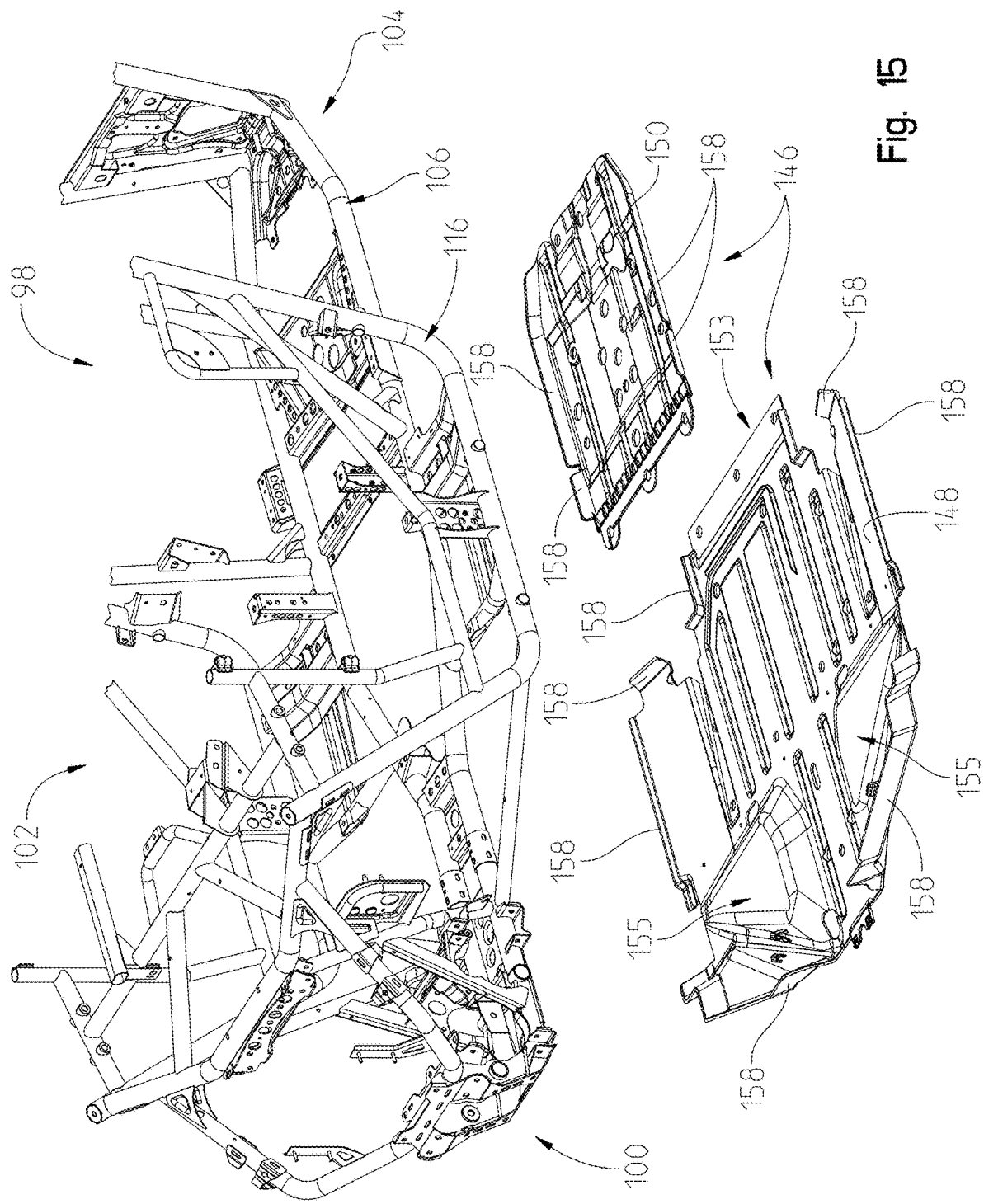
FIG. 15 shows an exploded view of the lower frame portion and the skid plate of FIG. 14.
Figure 17:
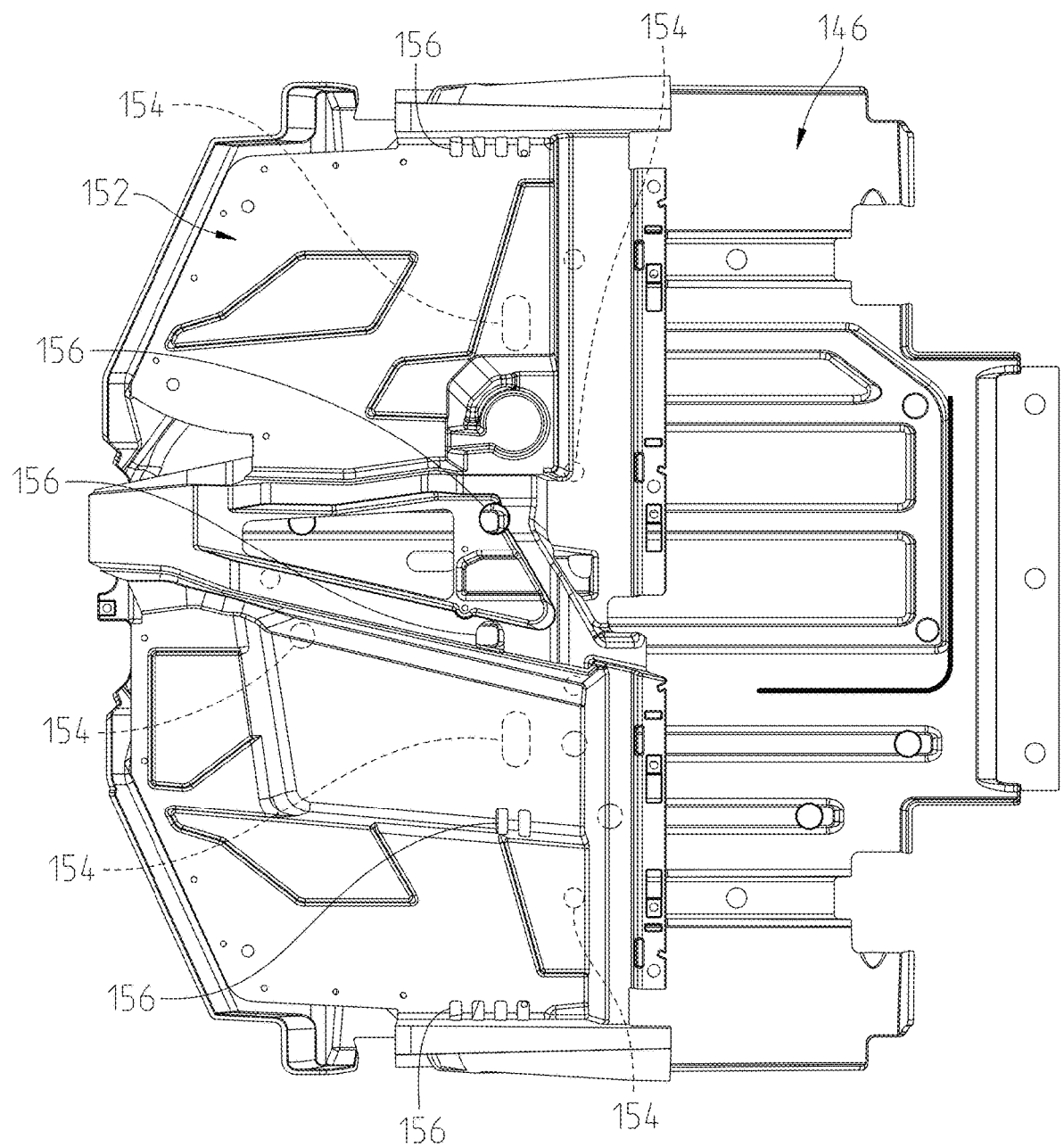
FIG. 17 shows a top plan view of the skid plate and the floor of FIG. 16 assembled.

With reference now to FIG. 13, dash frame tube 121 includes a steering assembly mounting bracket 136, a passenger grab bar mounting bracket 138, and a dash board mounting bracket 140. Each of steering assembly mounting bracket 136, passenger grab bar mounting bracket 138, and dash board mounting bracket 140 are welded to dash frame tube 121 such that brackets 136, 138, and 140 and dash frame tube 121 are a single welded unit with the remainder of lower frame portion 98 rather than multiple parts coupled together using various couplers (i.e., nuts, bolts, pins, etc.).

Referring now to FIGS. 14-19, in various embodiments, vehicle 2 may further include a skid plate 146 positioned below frame 20. Skid plate 146 is generally coupled to lower frame portion 98 of frame 20. In various embodiments, skid plate 146 may be comprised of a first portion 148 and a second portion 150, while in other various embodiments, skid plate 140 may be a single unitary piece. First portion 148 of skid plate 146 is generally positioned vertically below a floor 152 of vehicle 2, and second portion 150 is generally coupled to a rear portion 153 of first portion 148 such that a portion of first portion 148 is positioned between second portion 150 and frame 20 and floor 152. Both skid plate 146 and floor 152 have a plurality of holes 154 and 156, respectively. In various embodiments, holes 154 of skid plate 146 are misaligned with holes 156 of floor 152 to provide protection from debris penetration through floor 152 while still allowing fluid to quickly leave floor 152.

In various embodiments, skid plate 146 may include at least one elevated portion or upward indentation 155 extending upward into the space between skid plate 146 and floor 152. Elevated portion 155 is configured to relieve surface tension more quickly by channeling water between skid plate 146 and floor 152 out more quickly and prevent excessive accumulation of mud build up between skid plate 146 and floor 152. In the illustrative embodiment shown in FIGS. 16-18, skid plate 146 includes two elevated portions 155, one on each lateral side.

Figure 18:
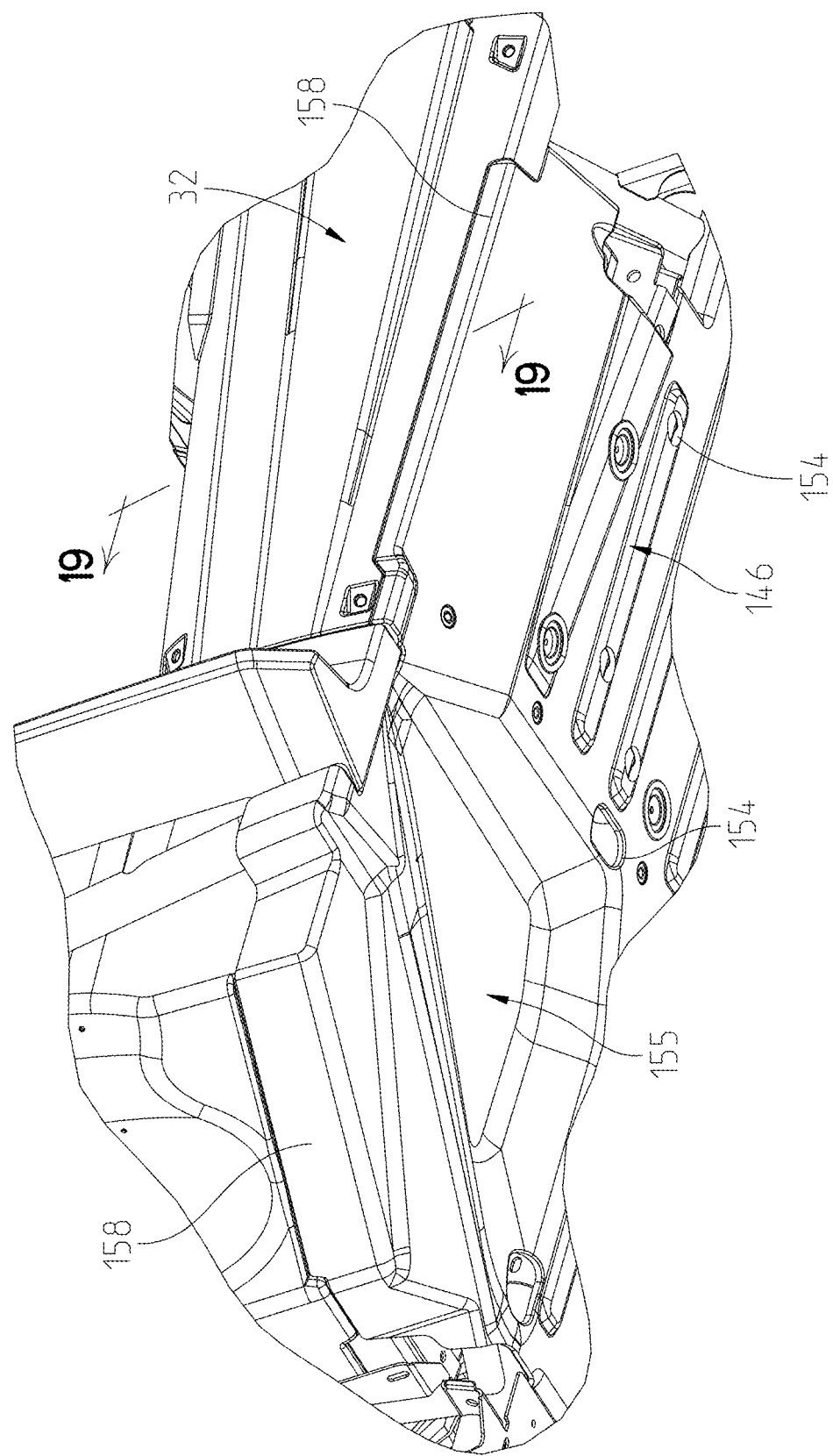
FIG. 18 shows an enlarged bottom left perspective view of the vehicle of FIG. 1 including the skid plate of FIG. 17 and a portion of a body of the present disclosure coupled over the lower frame portion of FIG. 14.
Figure 19:
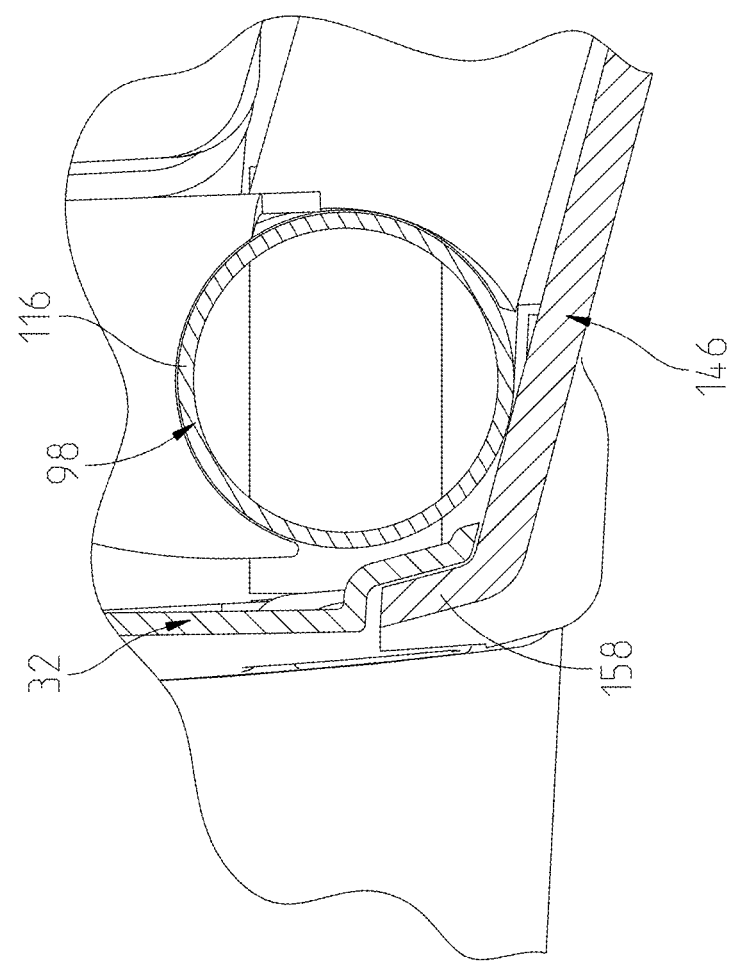
FIG. 19 shows a cross sectional view of the skid plate, the lower frame portion, and the body along line 19-19 of FIG. 18.

With reference to FIGS. 18 and 19, various portions of an edge 158 of skid plate 146 wrap upward around sides of vehicle 2, such that edge 158 extends upward above a lowermost portion of frame 20 and skid plate 146 may provide protection to lower frame portion 98 of frame 20 and other various components of vehicle 2. In this way, edge 158 of skid plate 146 is positioned laterally outward of outer frame tubes 116 of lower frame portion 98. In addition, as shown in FIG. 18, edge 158 may wrap up and provide protection to a bottom of main body assembly 32 by positioning the bottom of main body assembly 32 laterally between edge 158 of skid plate 146 and outer frame tubes 116.

Figure 20:
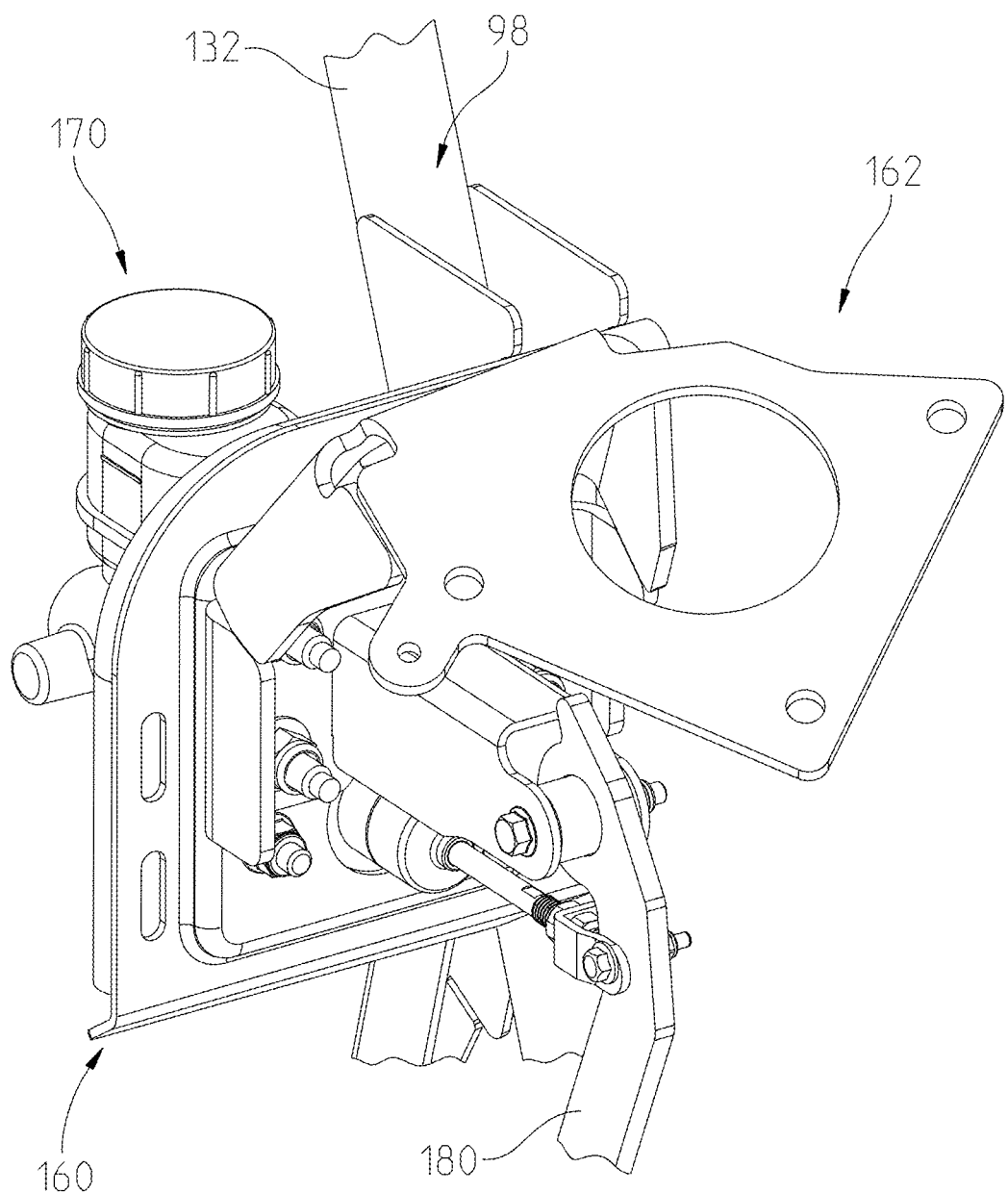
FIG. 20 shows a perspective view of an electric power steering and brake mount of the present disclosure.
Figure 21:
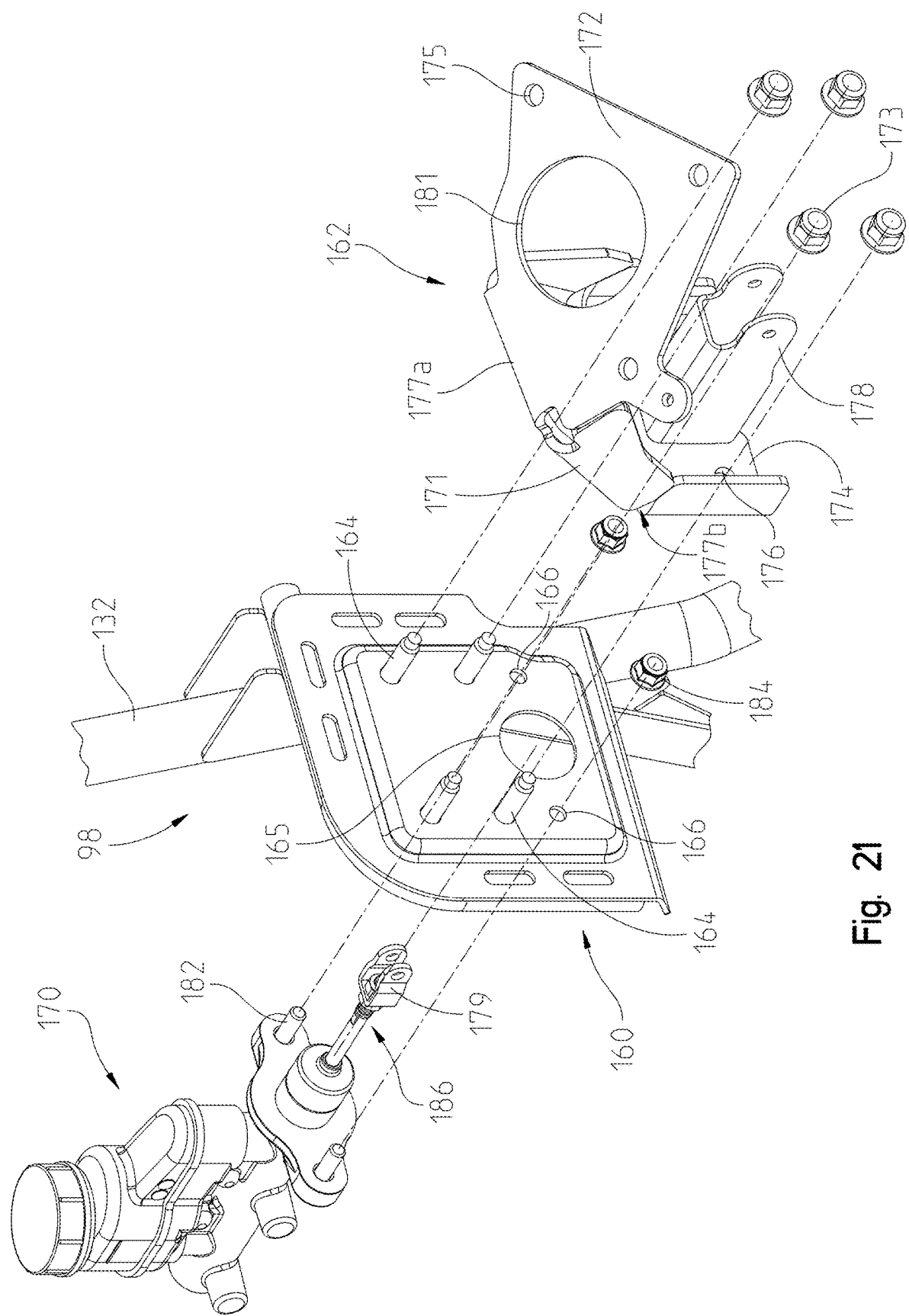
FIG. 21 shows an exploded view of the electric power steering and brake mount of FIG. 20.

Now referring to FIGS. 20 and 21, in various embodiments, lower frame portion 98 may further include a brake and power steering plate 160 welded thereto for supporting a brake and power steering mount 162 and a master cylinder 170 for brakes of vehicle 2. Brake and power steering plate 160 generally includes a plurality of posts or threaded studs 164 stamped into or welded onto plate 160, a central opening 165, and a pair of openings 166. Brake and power steering mount 162 generally includes a first plate 172, a second plate 174, and a third plate 171 coupling first plate 172 to second plate 174. In various embodiments, first, second, and third plates 172, 174, and 171 are a single unitary piece with a bend 177a, 177b between each of the plates. First plate 172 generally includes at least one opening 176 for receiving posts 164 of brake and power steering plate 160, which are configured to receive a plurality of couplers 173 for coupling brake and power steering mount 162 to brake and power steering plate 160, and an inverted U-shaped bracket 178 configured to couple to a brake pedal 180. Second plate 174 of brake and power steering mount 162 generally includes a large central opening 181 for receiving a portion of a steering assembly (not shown) of vehicle 2 and a plurality of smaller openings 175 for coupling second plate 174 to the steering assembly. Master cylinder 170 includes a set of posts 182 configured to pass through openings 166 of brake and power steering plate 160 and receive a plurality of couplers 184 for coupling master cylinder 170 to brake and power steering plate 160. Master cylinder 170 further includes a portion 186 configured to pass through central opening 165 of brake and power steering plate 160 and couple to brake pedal 180 via U-shaped bracket 179.

Figure 22:
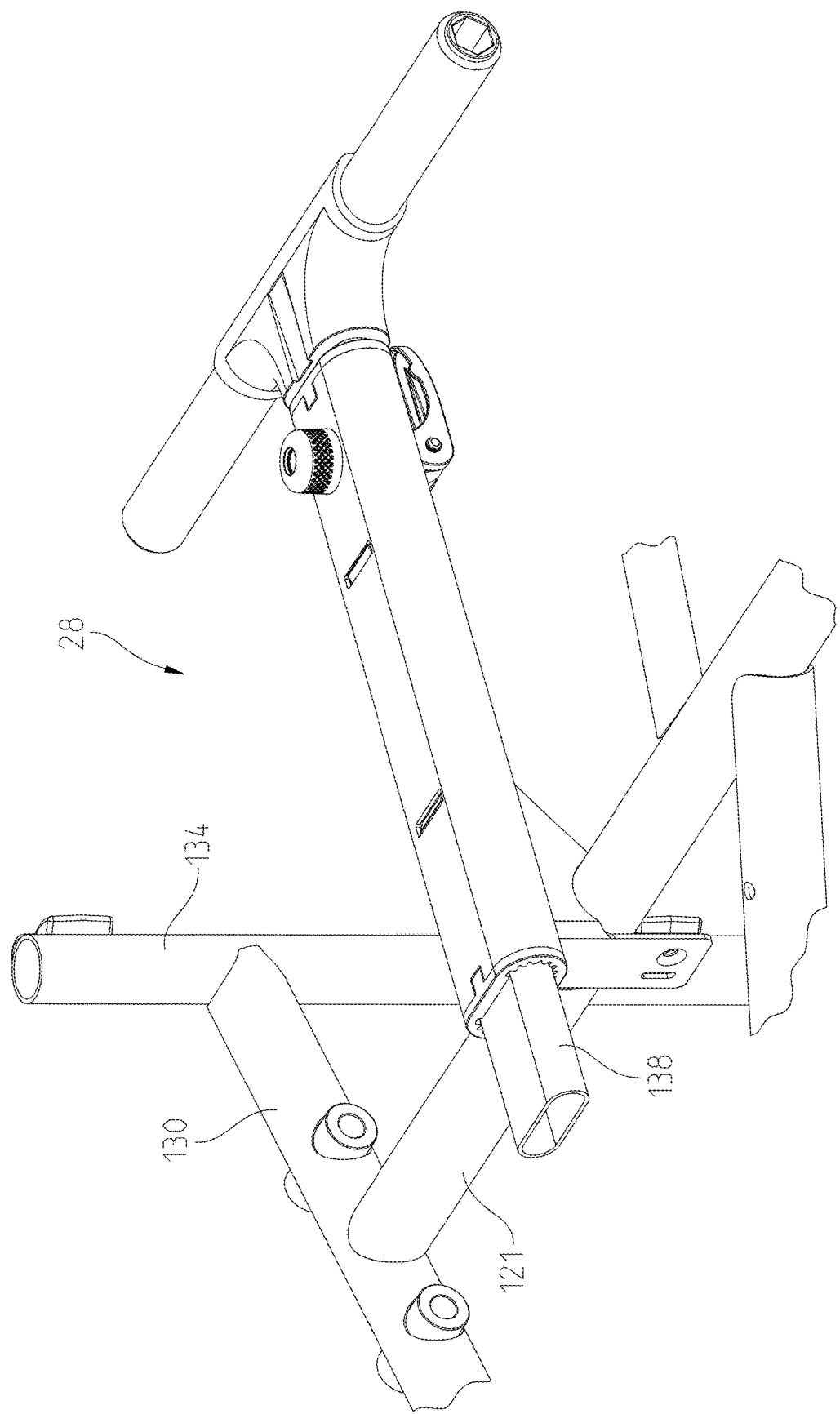
FIG. 22 shows an enlarged front left perspective view of a passenger grab bar of the present disclosure coupled to a portion of the dashboard frame portion of FIG. 13.
Figure 23:
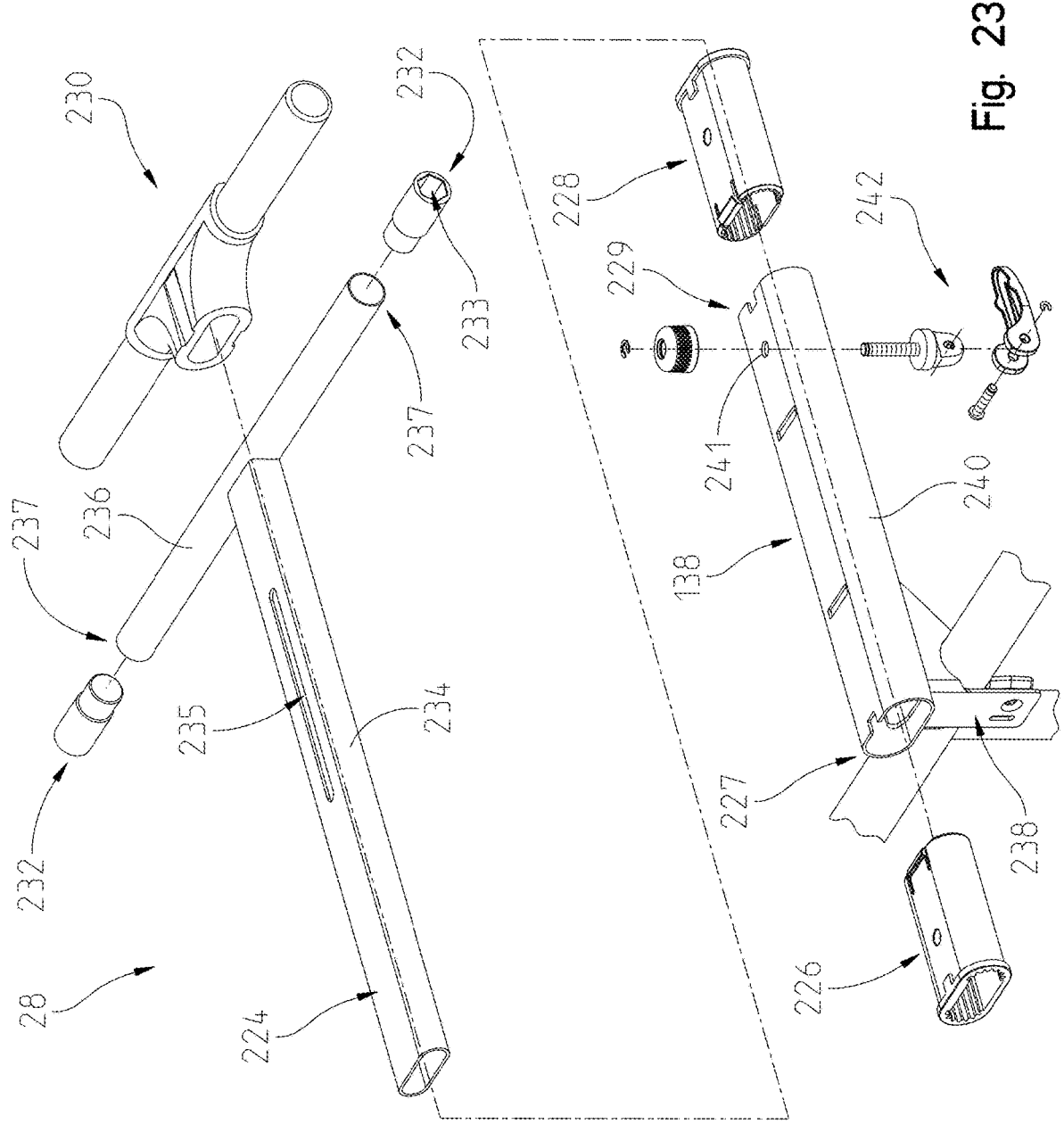
FIG. 23 shows an exploded view of the passenger grab bar of FIG. 22.

With reference now to FIGS. 22 and 23, passenger grab bar 28 is shown coupled to passenger grab bar mounting bracket 138 of dash frame tube 121. Passenger grab bar 28 is generally T-shaped and includes T-bar 224, a first end cap 226 received within a first end 227 of passenger grab bar mounting bracket 138, a second end cap 228 received within a second end 229 of passenger grab bar mounting bracket 138, a handle cover 230 overmolded onto T-bar 224, and a set of handle plugs 232. Bar 224 generally includes an oval elongated body 234 having an elongated opening 235 and a handle bar 236. Handle plugs 232 are received within or removably or fixedly coupled to ends 237 of handle bar 236, and provide a compatible lug nut wrench/socket opening 233 such that passenger grab bar 28 may be used to easily change ground engaging members 4, 6 when out on the trail. Passenger grab bar mounting bracket 138 generally includes a mounting portion 238 for coupling with dash frame tube 121, and a support portion 240 coupled to mounting portion 238 for supporting passenger grab bar 28. Support portion 240 is a generally oval elongated tube and is configured to receive bar 224 such that bar 224 can translate within support portion 240 to adjust passenger grab bar 28 forward and aft to provide a desired position of grab bar 28 for the passenger. Support portion 240 includes an opening 241 configured to receive coupler 242. To adjust passenger grab bar 28, coupler 242, positioned within opening 241 of support portion 240 and elongated opening 235 of bar 224, is released or loosened, and grab bar 28 is moved forward and/or aft as desired until a desired position is reached. Once a desired position is reach, coupler 242 is engaged or tightened such that grab bar 28 can no longer move. In various embodiments, coupler 242 is an expansion retainer coupler.

With reference now to FIG. 24, in various embodiments, upstanding frame tube 144 of frame 20 includes integrated tie downs 188 along a side of frame tube 144 configured to be used as securing points for securing vehicle 2 for transportation and/or caps 190 in an end 145 of frame tubes 142 configured to be used as mounting points. Tie downs 188 generally include a plate 187 coupled to an opening within frame tube 144. Plate 187 includes a first opening 189a, a second opening 189b, and a third opening 189c. In various embodiments, first and second openings 189a and b are substantially the same shape and/or size. In various embodiments, other frame tubes, such as frame tubes 116, 142, and/or 118, may also or alternatively include tie downs 188.

Cap 190 is a circular cap received within end 145 of frame tube 142 and includes a central opening 191. In various embodiments, cap 190 includes tabs 192 configured to be receiving within notches 193 in frame tube 142 to help couple and hold cap 190 within end 145 of frame tube 144. In various embodiments, other frame tubes, such as frame tubes 116, 144, and/or 118, may also or alternatively include caps 190.

Figure 25:
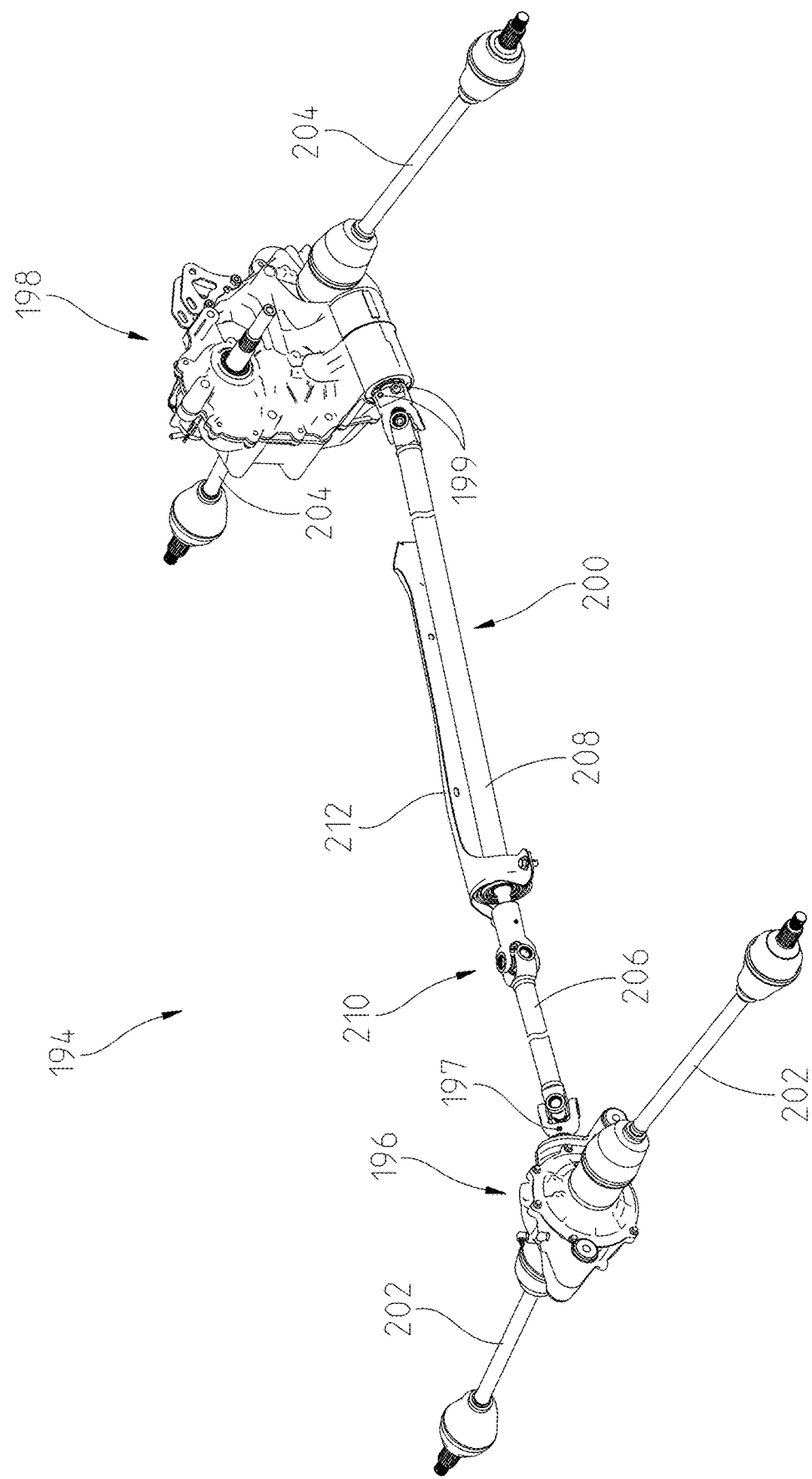
FIG. 25 shows a drivetrain of the present disclosure.

Referring now to FIG. 25, vehicle 2 includes a powertrain having an engine (not shown), a continuously variable transmission (CVT) 282 (FIG. 32), and a drive train 194. In various embodiments, CVT 282 may include a scattershield (not shown) as further disclose and shown in U.S. patent application Ser. No. 16/357,695.

Drive train 194 generally includes a front gear drive 196, a rear gear drive 198, and a propeller shaft 200. Front gear drive 196 is coupled to front ground engaging members 4 through front stub shafts 202, while rear gear drive 198 is coupled to rear ground engaging members 6 through drive half shafts 204. In various embodiments, propeller shaft 200 is a two-piece propeller shaft having a first or front portion 206 coupled to front gear drive 196 via a pin, bolt or other coupler 197 and a second or rear portion 208 coupled to rear gear drive 198 via pins, bolts, or other couplers 199. First portion 206 is coupled to second portion 208 via a universal joint 210. Furthermore, in various embodiments, propeller shaft 200 includes a swell guard 212 configured to prevent a fuel tank (not shown) of vehicle 2 from expanding toward propeller shaft 200.

Figure 26:
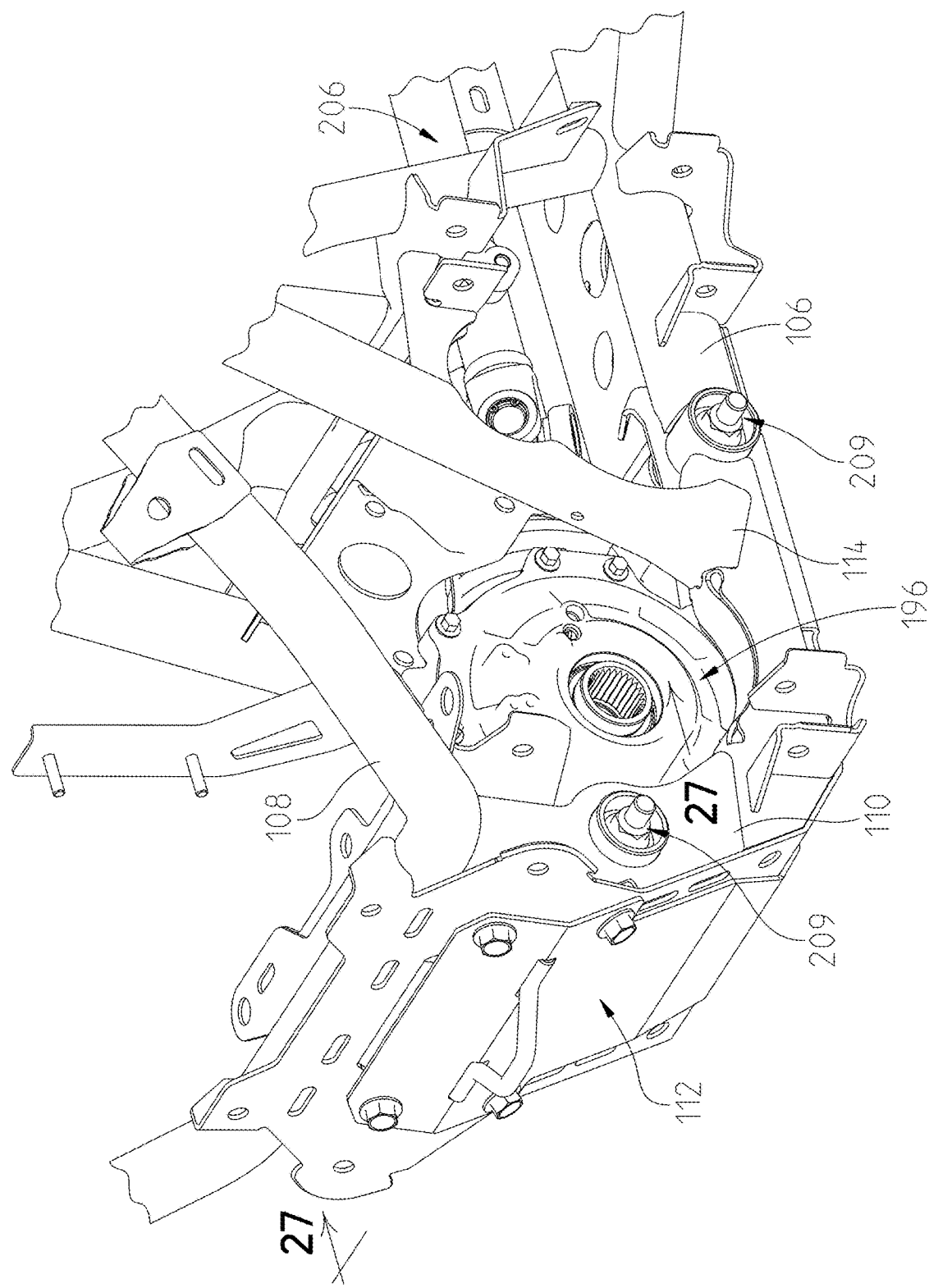
FIG. 26 shows an enlarged front left perspective view a lower front section of the lower frame portion of FIG. 11 and a front drive of the drivetrain of FIG. 25.
Figure 27:
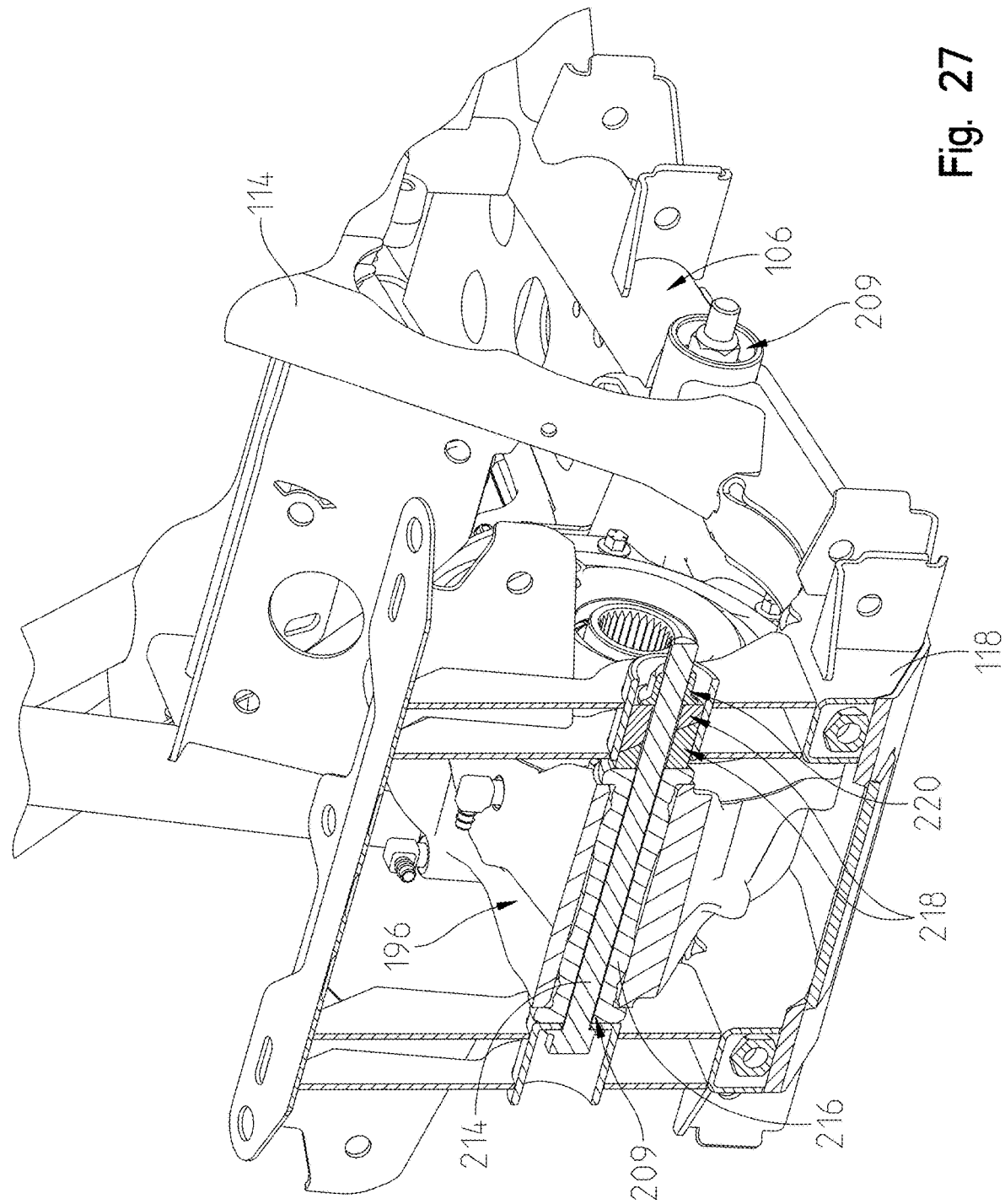
FIG. 27 shows a cross sectional view of the front drive and the lower front section of the lower frame portion taken along line 27-27 of FIG. 26.
Figure 28:
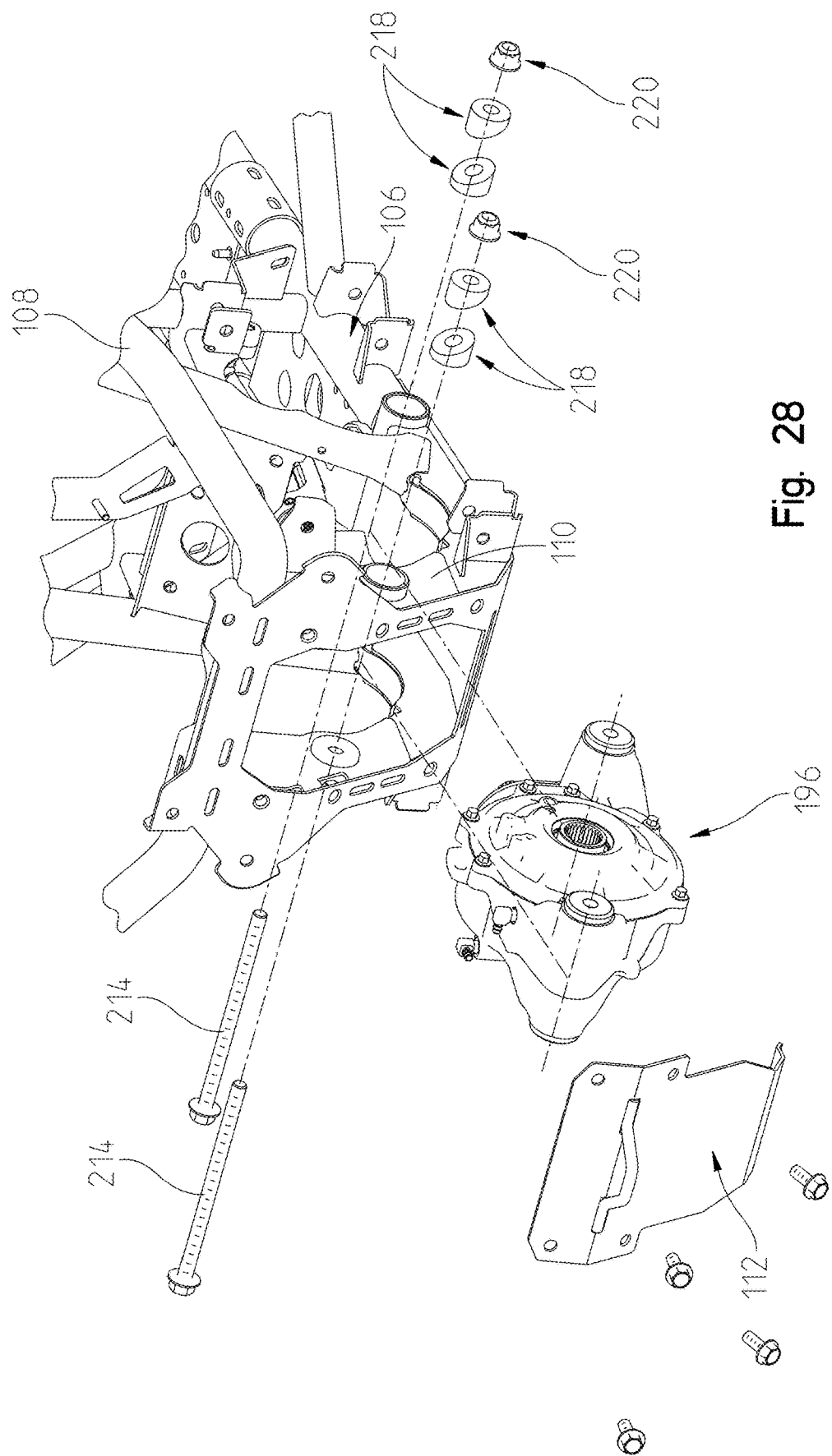
FIG. 28 shows an exploded view of the lower front section of the lower frame portion and the front drive of FIG. 26.

With reference to FIGS. 26-28, front gear drive 196 is coupled to front drive access bracket 110 and inner frame tubes 106 of frame 20 using a plurality of couplers 209. Couplers 209 include a pin, bolt or other coupler 214, a damper 216, wedge locks 218, and a securing mechanism 220 (i.e., a nut). When front gear drive access panel 112 is removed from being coupled to front drive access bracket 110, couplers 209 may also be removed such that front gear drive 196 may be removed from vehicle 2 through front drive access bracket 110 for service and/or replacement without disassembly of any other portion of frame 20.

Figure 29:
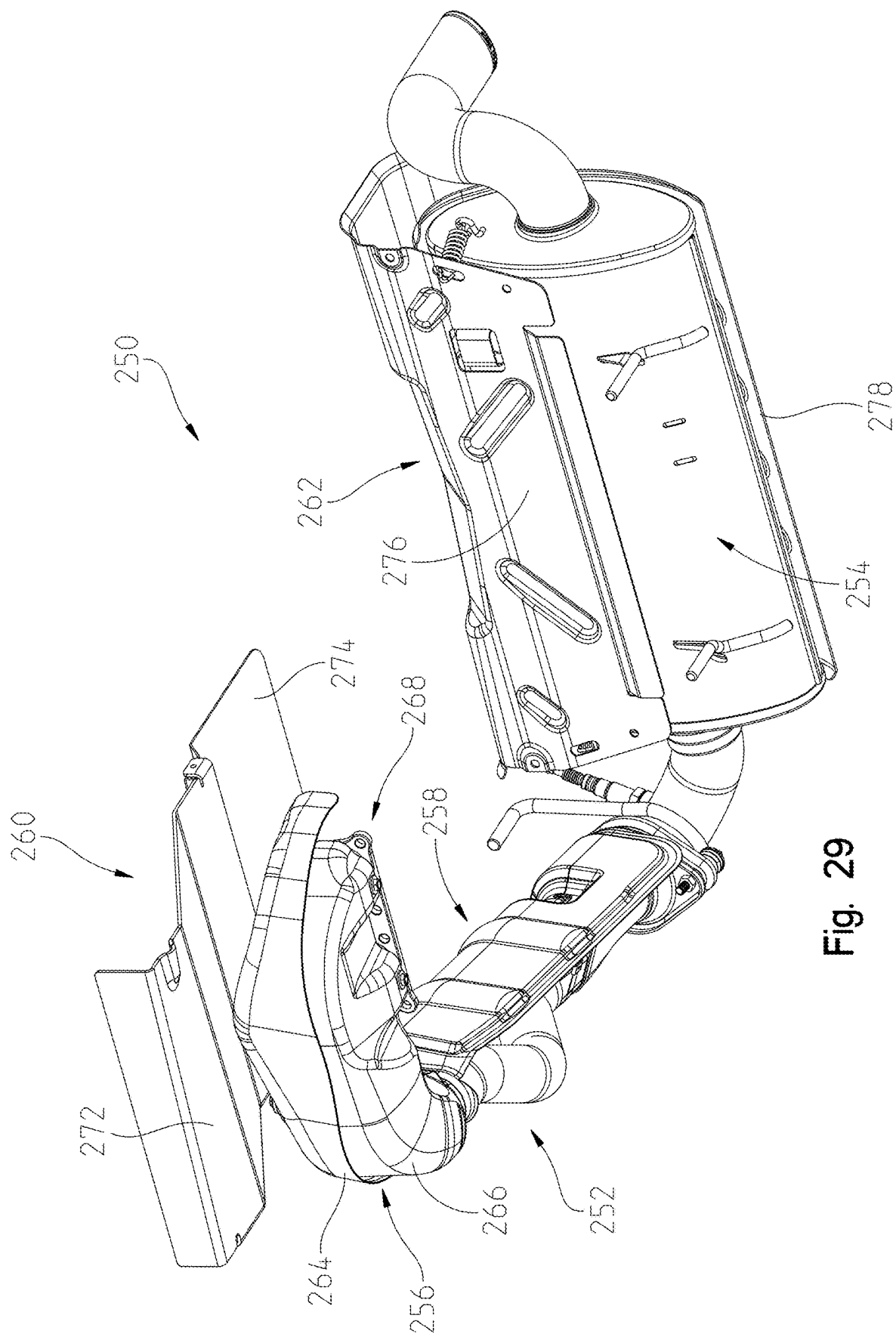
FIG. 29 shows a left rear perspective view of an exhaust system of the present disclosure including a plurality of heat shields positioned along the exhaust system.
Figure 30A:
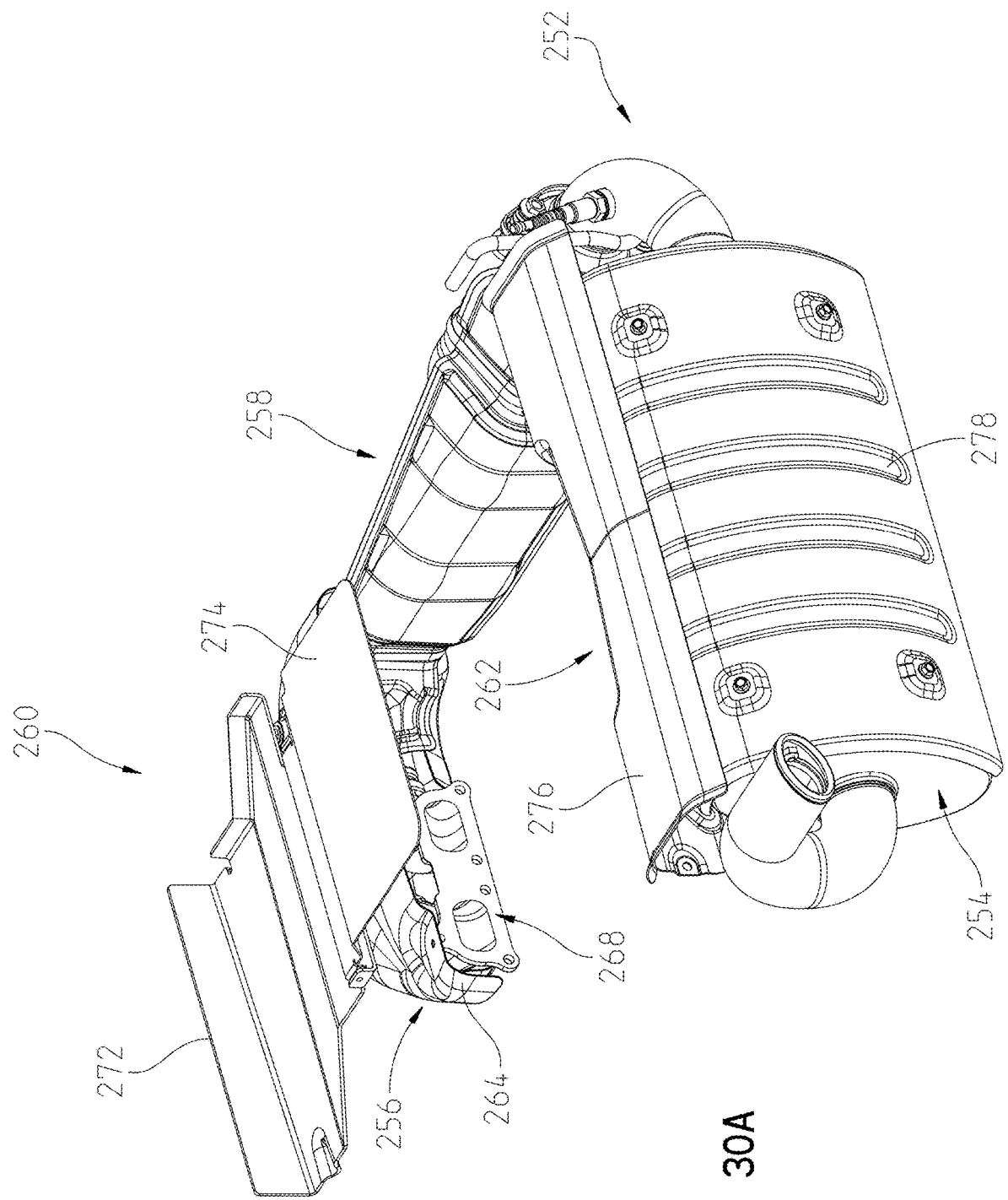
FIG. 30A shows a left rear perspective view of the plurality of heat shields and the exhaust system of FIG. 29.
Figure 30B:
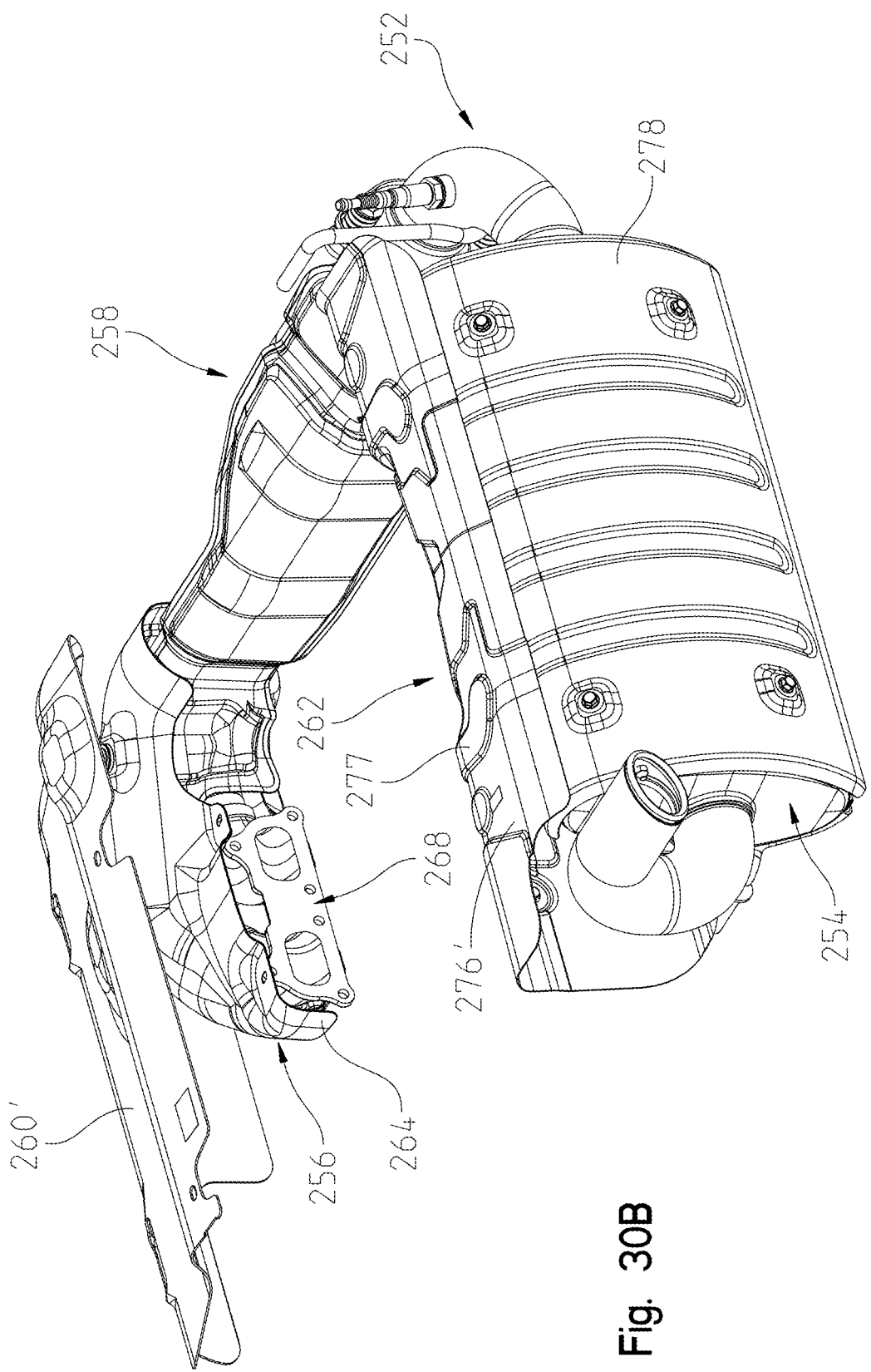
FIG. 30B shows a left rear perspective view of an alternative embodiment of the plurality of heat shields of FIG. 30A.
Figure 31:
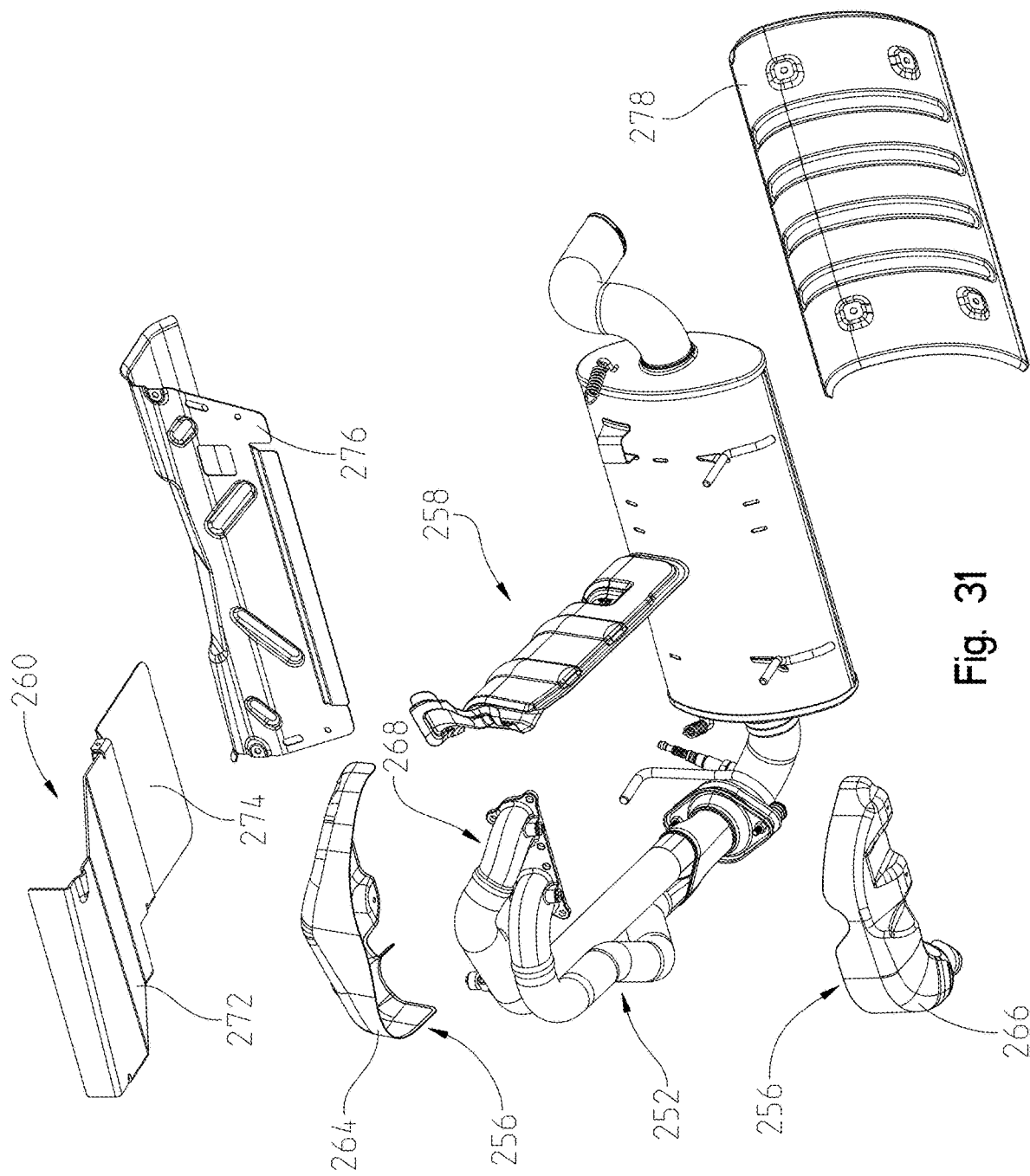
FIG. 31 shows an exploded view of the plurality of heat shields and the exhaust system of FIG. 29.

Referring now to FIGS. 29-31, vehicle 2 further includes an exhaust assembly 250 having an exhaust conduit 252, a muffler 254, and a plurality of heat shields 256, 258, 260, and 262. Heat shield 256 generally includes a first portion 264 and a second portion 266 which couple or fit together to cover an intake manifold 268 of exhaust conduit 252. Heat shield 258 generally includes a single body 270 and is configured to cover a portion of exhaust conduit 252, and be positioned between exhaust conduit 252 and rear body assembly 36. As shown in FIG. 30A, heat shield 260 generally includes a first member 272 and a second member 274, where second member 274 is hingedly coupled to first member 272. Alternatively, as shown in FIG. 30B, heat shield 260 may be configured as a single component or single piece heat shield, shown as heat shield 260'. Heat shield 260 is generally positioned between exhaust conduit 252 and a cargo area 38 of vehicle 2 and may be positioned over a portion of the engine, but due to first and second members 272 and 274 being hingedly coupled, the engine of vehicle 2 is accessible when cargo area 38 is removed as discussed further below.

As shown in FIG. 30A, heat shield 262 generally includes a first member 276 and a second member 278, where first and second members 276, 278 enclose muffler 254 shielding the remainder of vehicle 2, including rear body assembly 36, from the heat produced at muffler 254. Each of heat shield 256, 258, 260, and 262 may be formed of a single layer of material or multiple layers of the same or different material. Alternatively, as shown in FIG. 30B, first member 276 may be shown as first member 276' which includes a plurality of protrusions 277 shown in a lands-and-grooves configuration. Protrusions 277 may increase the surface area of first member 276', thereby increasing the thermal dissipation or dispersion at muffler 254.

Figure 32:
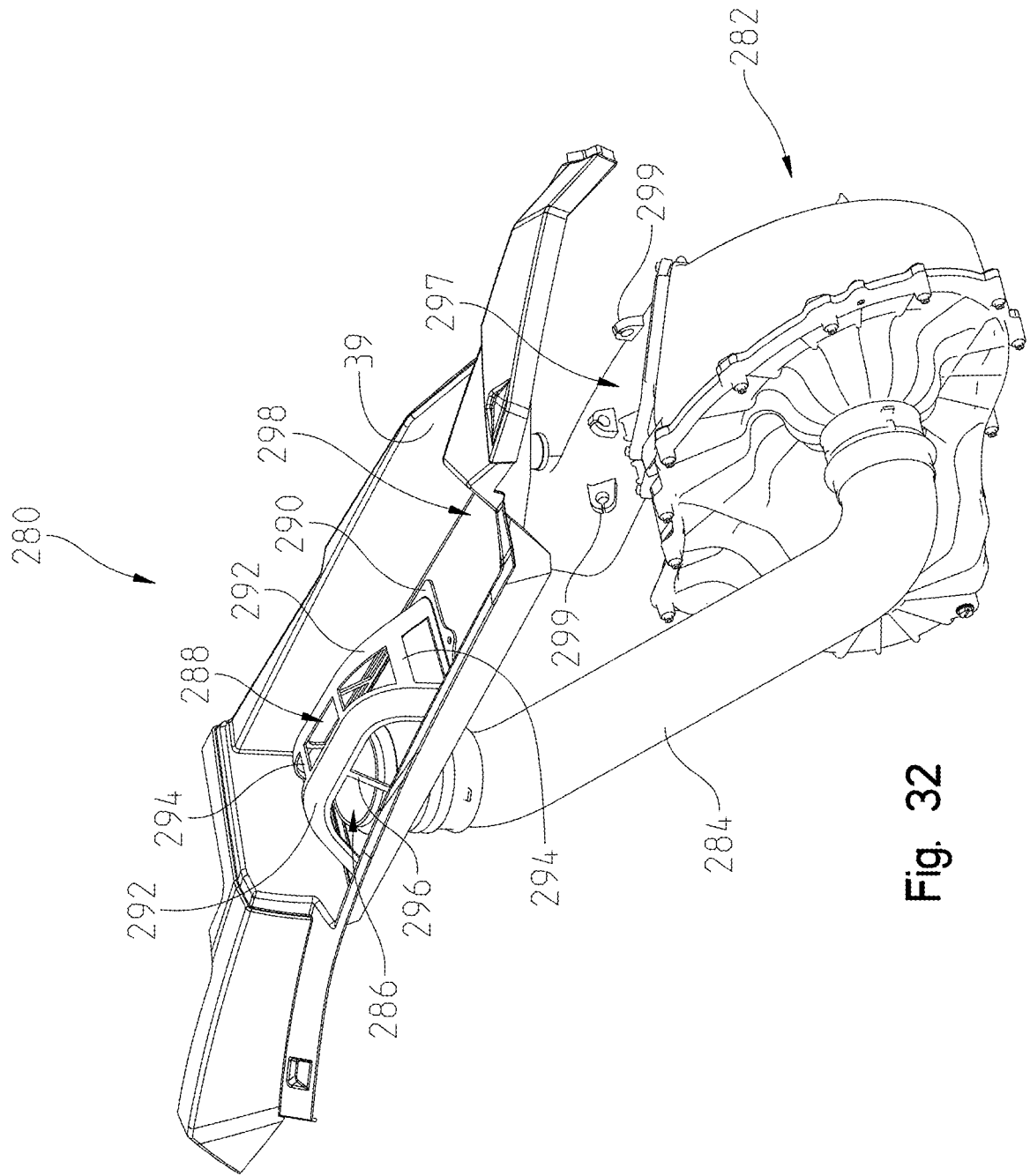
FIG. 32 shows a left rear perspective view of an air intake assembly for a continuously variable transmission (CVT) of the present disclosure.

With reference now to FIG. 32, an air intake assembly 280 for providing fresh air to CVT 282 is generally shown. Air intake assembly 280 generally includes an air intake conduit 284 coupled to and between rear body assembly 36 of vehicle 2 and CVT 282 and having an air intake input 286, and an air intake input cover 288 coupled to rear body assembly 36 and extending over air intake input 286. Air intake input cover 288 generally includes a base 290, two arced members 292 extending longitudinally over air intake input 286 and coupled at each end to base 290, a plurality of coupling members 294 coupling arced member 292 to each other, and a pair of coupling member 296 coupling a center portion of arced member 292 to base 290. Cover 288 is coupled to rear body assembly 36 within an indention 298 of rear body assembly 36. In various embodiments, cover 288 is positioned below rear fender body panel 32 and/or a portion of rear body panel 39. A filter, such as a screen or mesh, may be positioned within air intake input cover 288 or between air intake input cover 388 and air intake conduit 284 to keep debris out of air intake assembly 280. In various embodiments, the filter is positioned under air intake input cover 288 such that it is not visible from the outside of vehicle 2 allowing the filter to be protected from damage.

An exhaust conduit 297 extends from CVT 282 and routes the exhaust air from CVT 282 out over the engine area of vehicle 2 and/or to another area within or outside of vehicle 2. Exhaust conduit 297 includes a plurality of coupling members 299 for coupling a wiring harness cable 312 (shown in phantom in FIG. 32) or other various lines or components to exhaust conduit 297. In various embodiments, coupling members 299 are claw-like couplings configured to receive and hold wiring harness cable 312.

Figure 33:
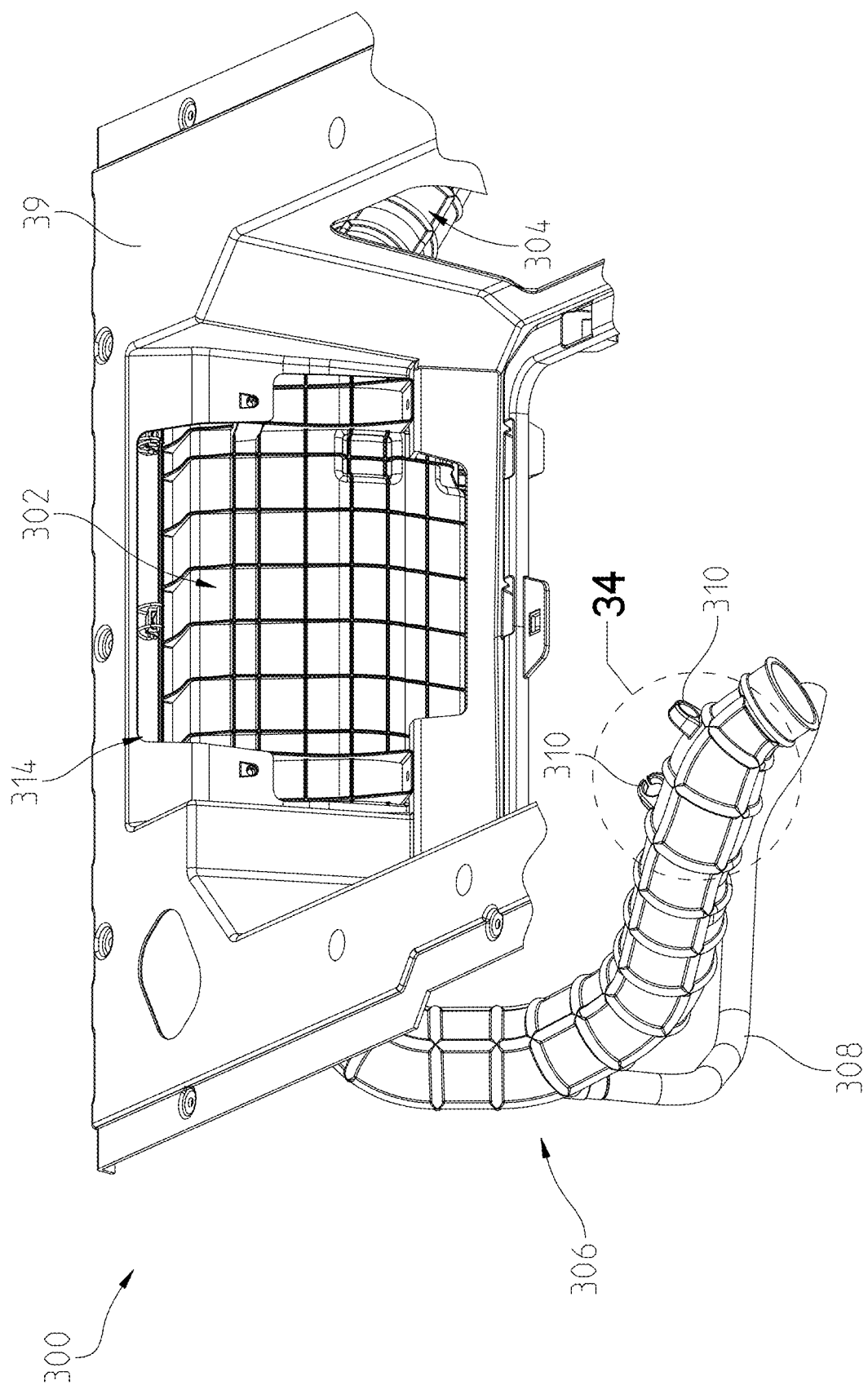
FIG. 33 shows a left rear perspective view of a portion of an air intake system for an engine and a portion of a rear body assembly of the present disclosure.
Figure 34:
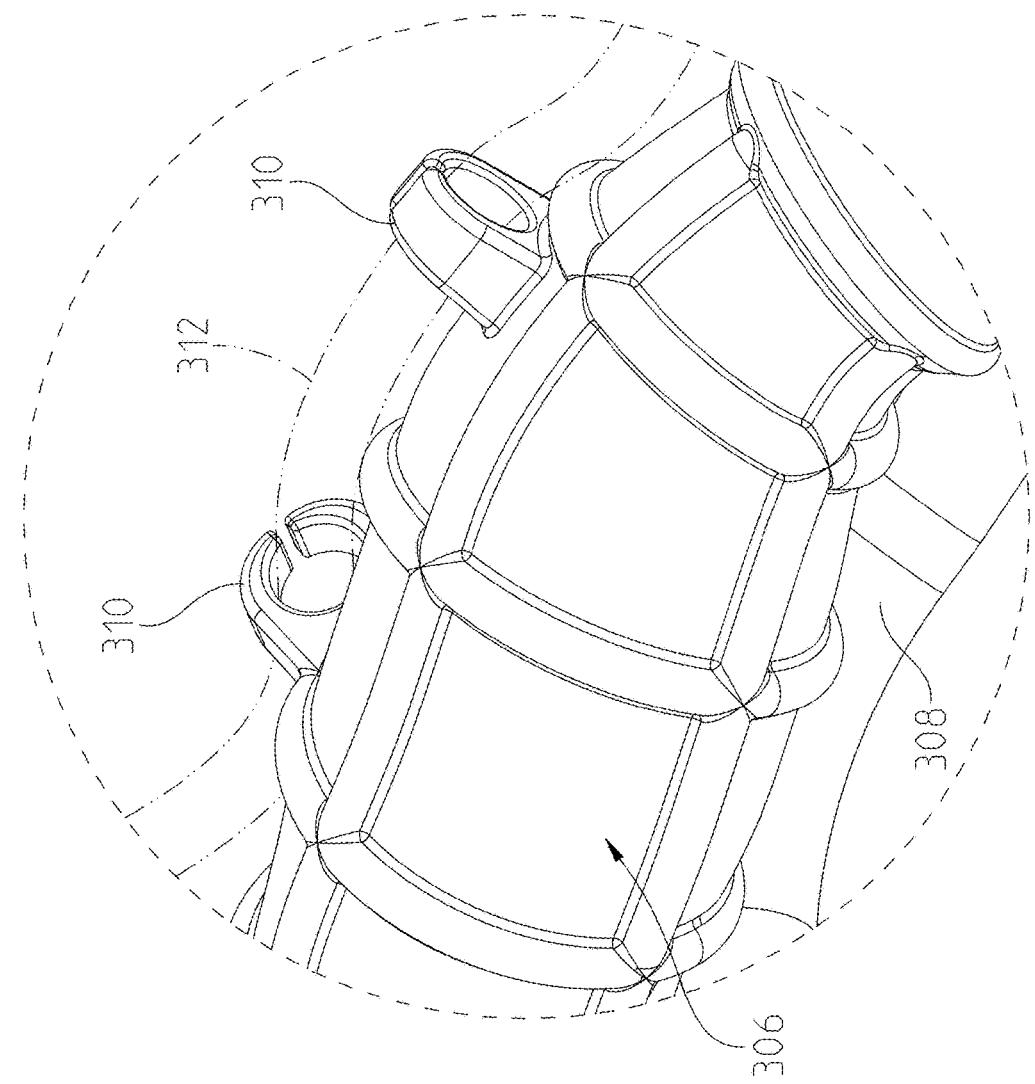
FIG. 34 shows an enlarged view of a portion of an air intake duct of the air intake system of FIG. 33 encircled by section 34 in FIG. 33.

Referring to FIGS. 33 and 34, an air intake assembly for providing fresh cooling air to the engine of vehicle 2 is generally shown at 300. Air intake assembly 300 generally includes an airbox 302 positioned beneath at least a portion of rear body panel 39, a first air intake conduit 304 providing ambient air to airbox 302, and a second air intake conduit 306 coupled between airbox 302 and the engine. Second air intake conduit 306 may include a branched conduit 308 branching off of second air intake conduit 306 to provide cooling air to other parts of vehicle 2, and/or a plurality of coupling members 310 for coupling a wiring harness cable 312 (shown in phantom in FIG. 32) or other various lines and/or components to second air intake conduit 306. In various embodiments, coupling members 310 are claw-like coupling configured to receive and hold wiring harness cable 312.

Airbox 302 is generally positioned rearward of seating area 22 and forward of cargo area 38 such that airbox 302 is positioned between cargo area 38 and seating area 22. Rear body panel 39 includes an opening 314 for allowing access to airbox 302 from the rear of vehicle 2 when cargo area 38 is removed.

Figure 35:
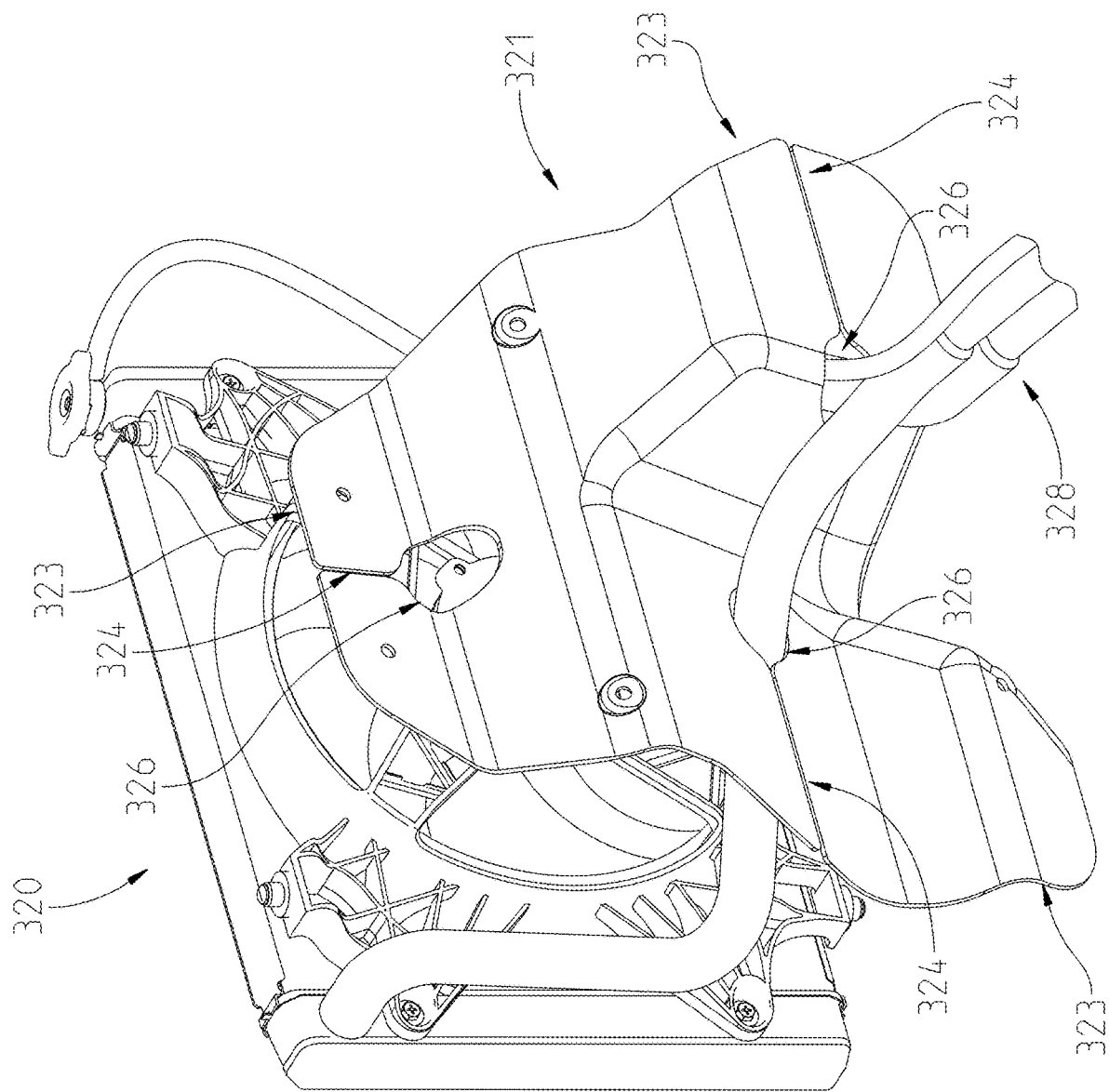
FIG. 35 shows a left rear perspective view of a radiator and a deflection shield of the present disclosure.
Figure 36:
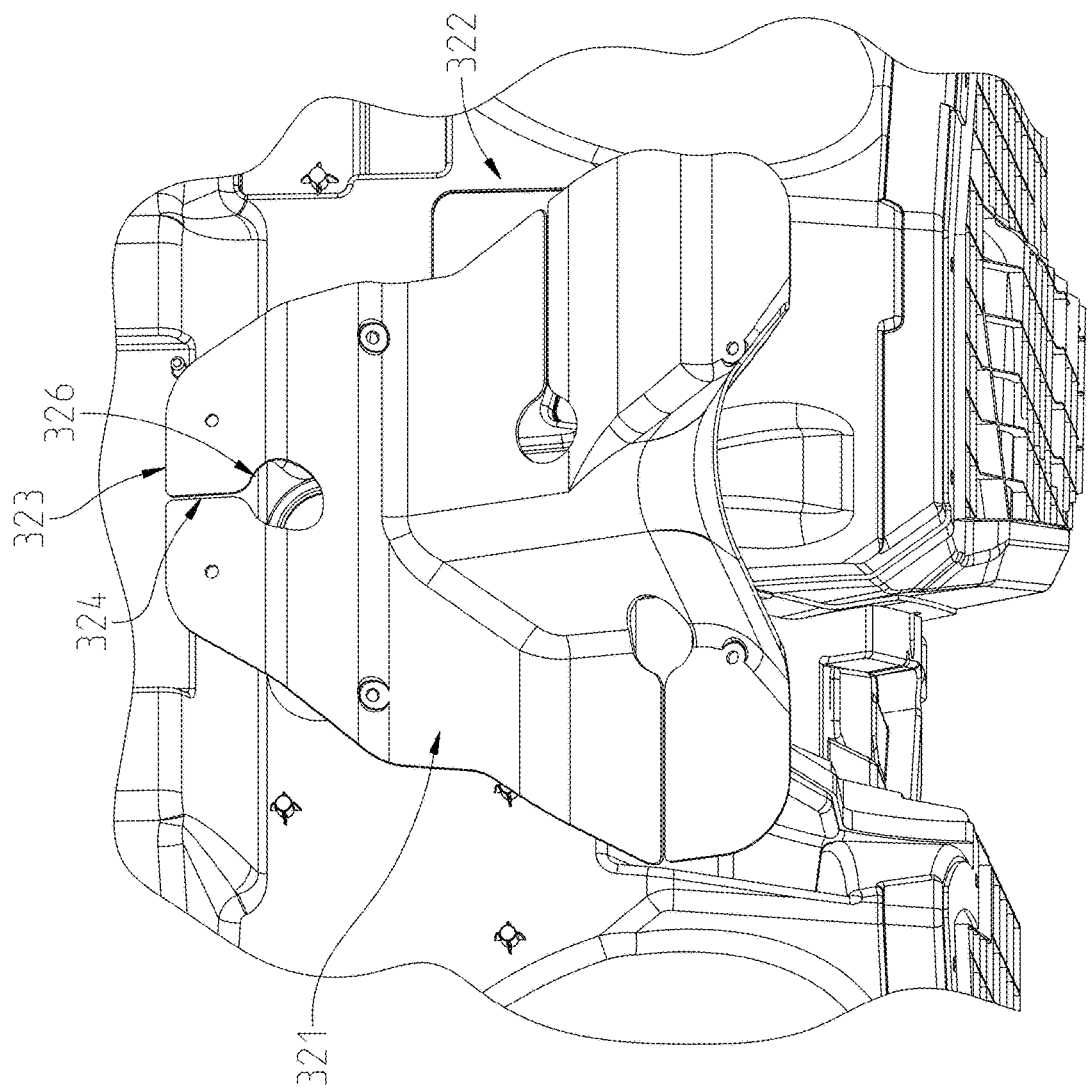
FIG. 36 shows a front plan view of the deflection shield of FIG. 33 relative to a close off wall of the present disclosure.

With reference now to FIGS. 35 and 36, a radiator 320 is provided for purposes of cooling the powertrain. A deflection shield 321 is also provided between radiator 320 and a close off wall 322 (FIG. 34) of vehicle 2 to deflect hot air from radiator 320 away from seating area 22. In various embodiments, the hot air is routed outward towards ground engaging members 4, 6 to keep the hot air from blowing into seating area 22 positioned behind close off wall 322 and/or downwards below skid plate 146 to keep the hot air from blowing into the area between driver seat 24 and passenger seat 26. Deflection shield 321 is a flexible plate with a plurality of slits 324 and openings 326 for receiving lines 328 routed to radiator 320. Slits 324 each extend from an edge 323 of shield 321 to one of openings 326, and allow for shield 321 to be flexed such that one of lines 328 may be positioned within one of openings 326. In various embodiments, an air gap extends between deflection shield 321 and close off wall 322 to further protect seating area 22 from the hot air of radiator 320.

Figure 37:
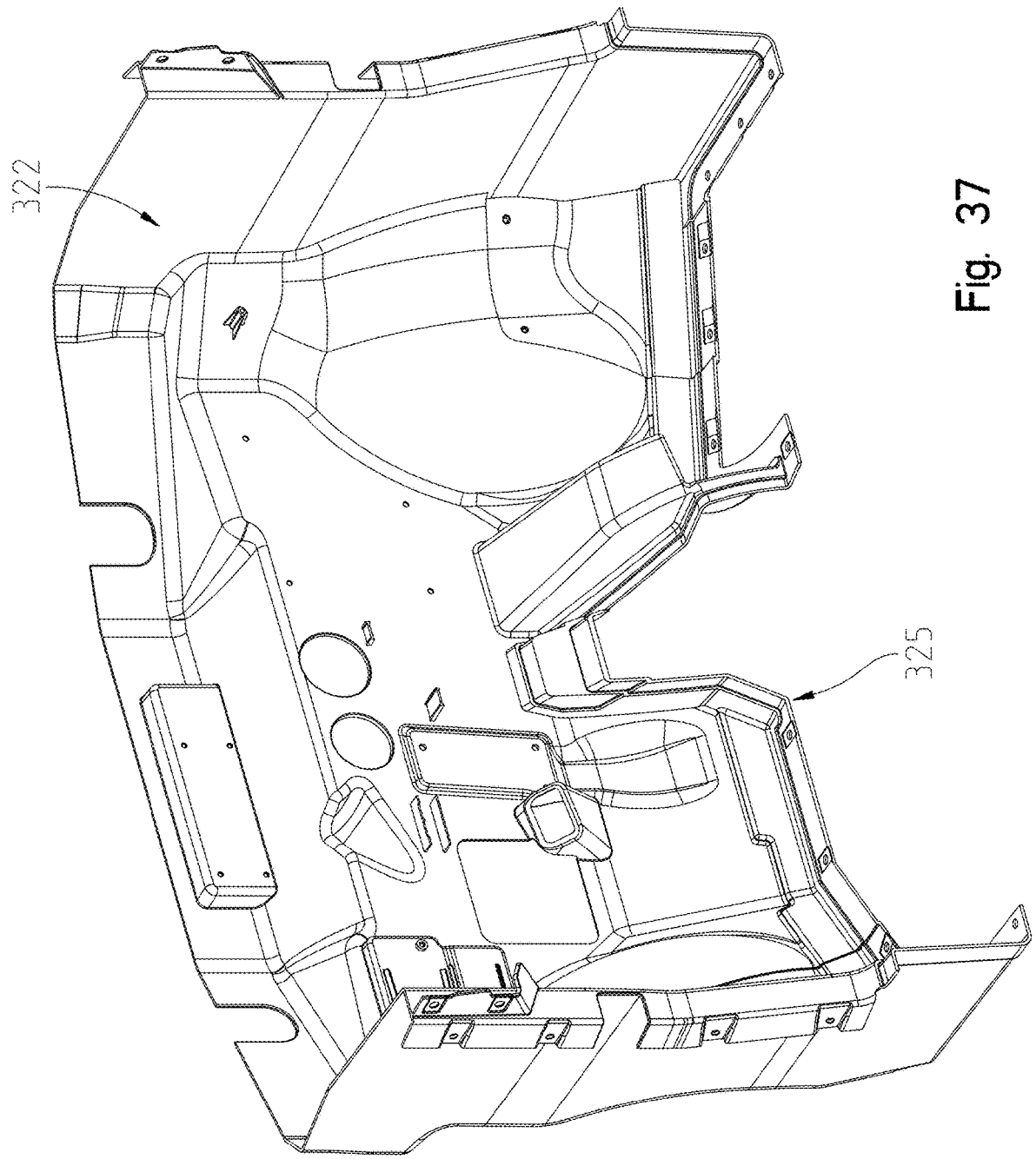
FIG. 37 shows a left rear perspective view of the close off wall of FIG. 36.

Referring to FIG. 37, close-off wall 322 is shown. Close-off wall 322 is a single unitary piece that closes off the forward portion of vehicle 2 from seating area 22. Close-off wall 322 is configured to provide protection to seating area 22 from debris and/or hot air, etc. A lower edge 325 of close-off wall 322 is configured to couple with floor 152 of vehicle 2.

Figure 38:
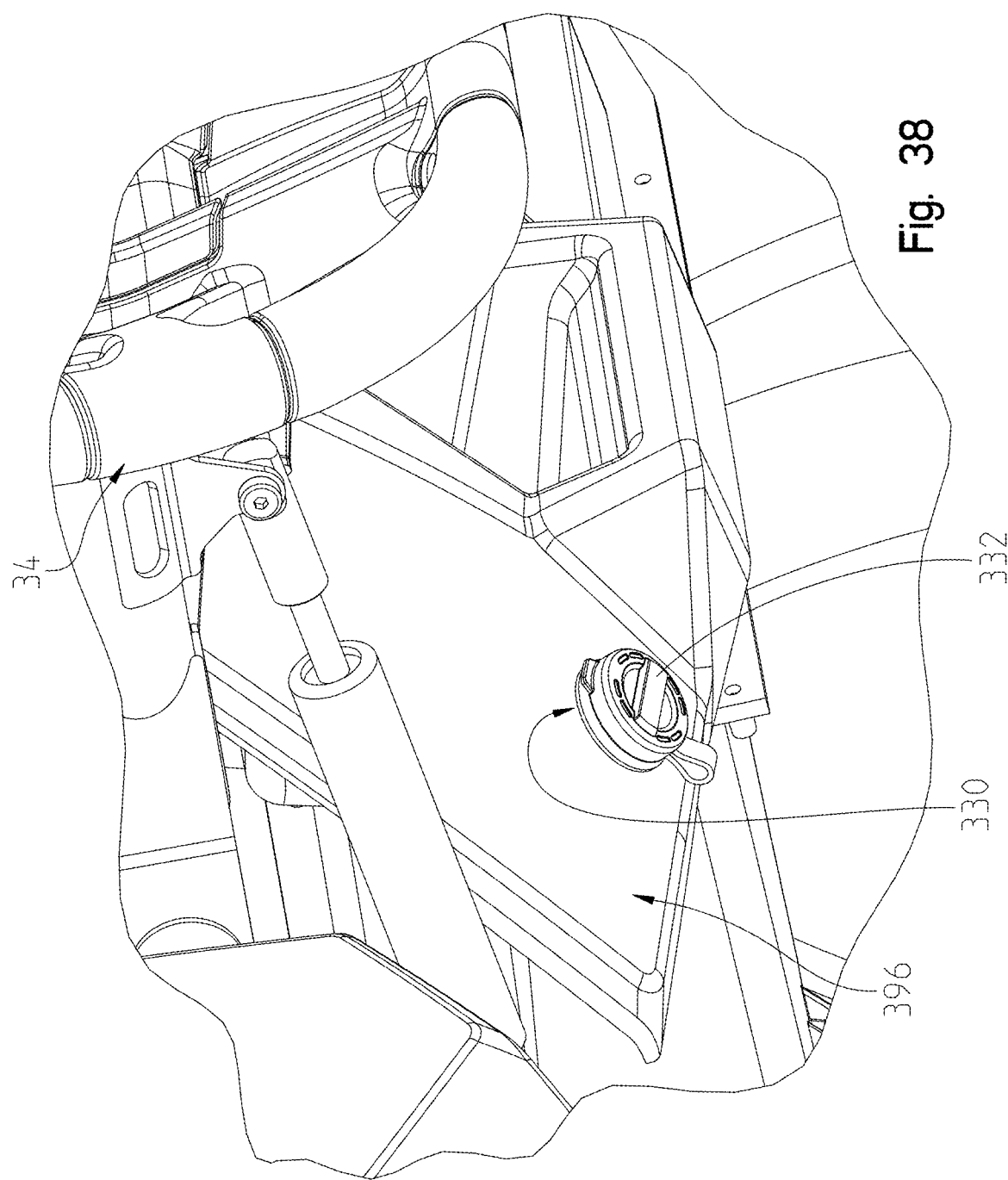
FIG. 38 shows an enlarged left rear perspective view of a dash of the present disclosure including an electrical plug.

With reference now to FIG. 38, an electrical connector is provided generally at 330. Electrical plug 330 is positioned in dash 396 laterally inward of at least a portion of steering wheel 34, and configured to provide power to various components. Connector 330 is configured to receive power from a battery maintainer (not shown) and can be used to charge and/or maintain the vehicle battery without the need of an adapter. Connector 330 includes a tethered cap 332 to keep debris out. In various embodiments, electrical plug 330 is a 12V electrical plug.

Figure 39:
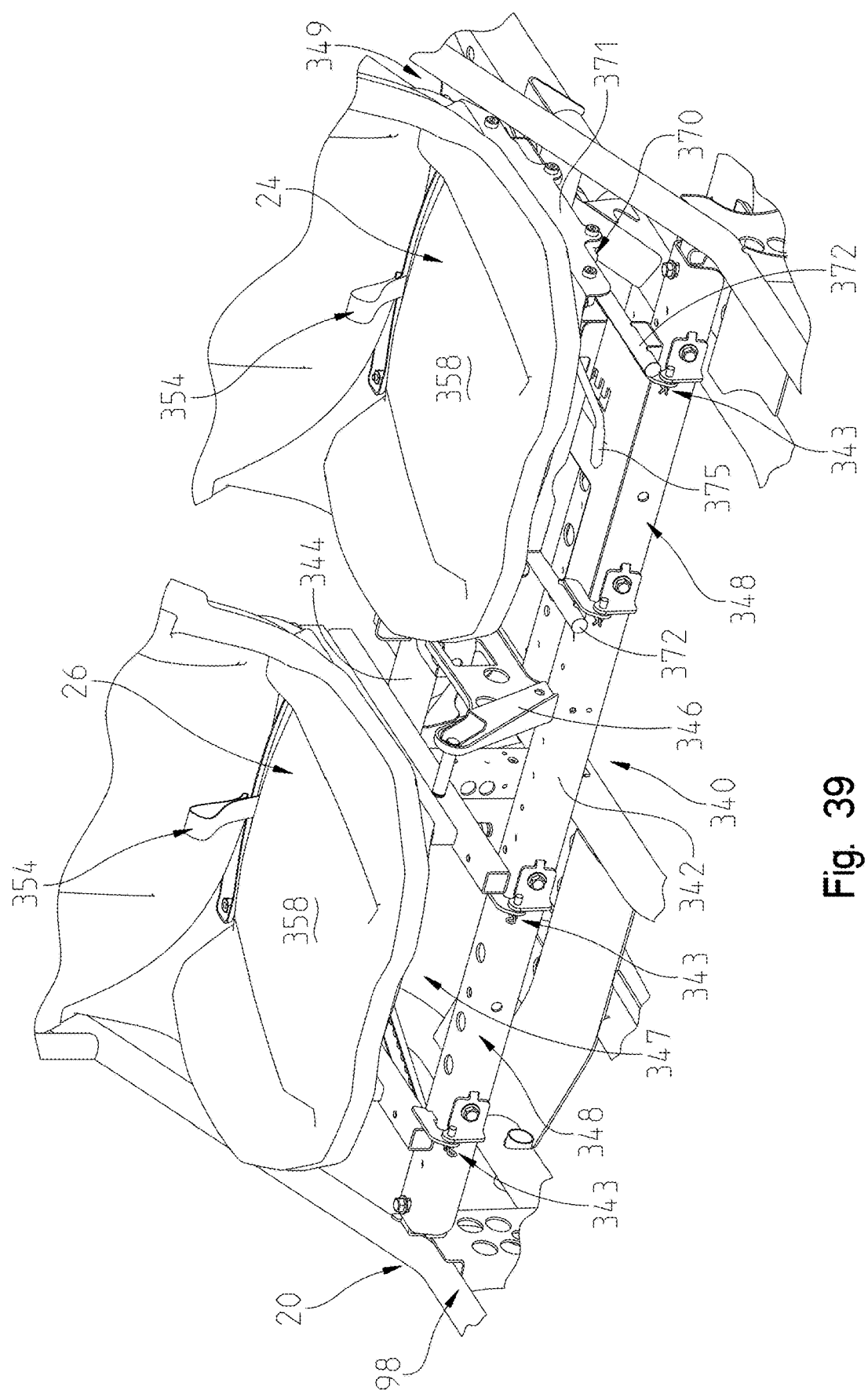
FIG. 39 shows a front left perspective view of a lower portion of seats and a seating support of the present disclosure.
Figure 40:
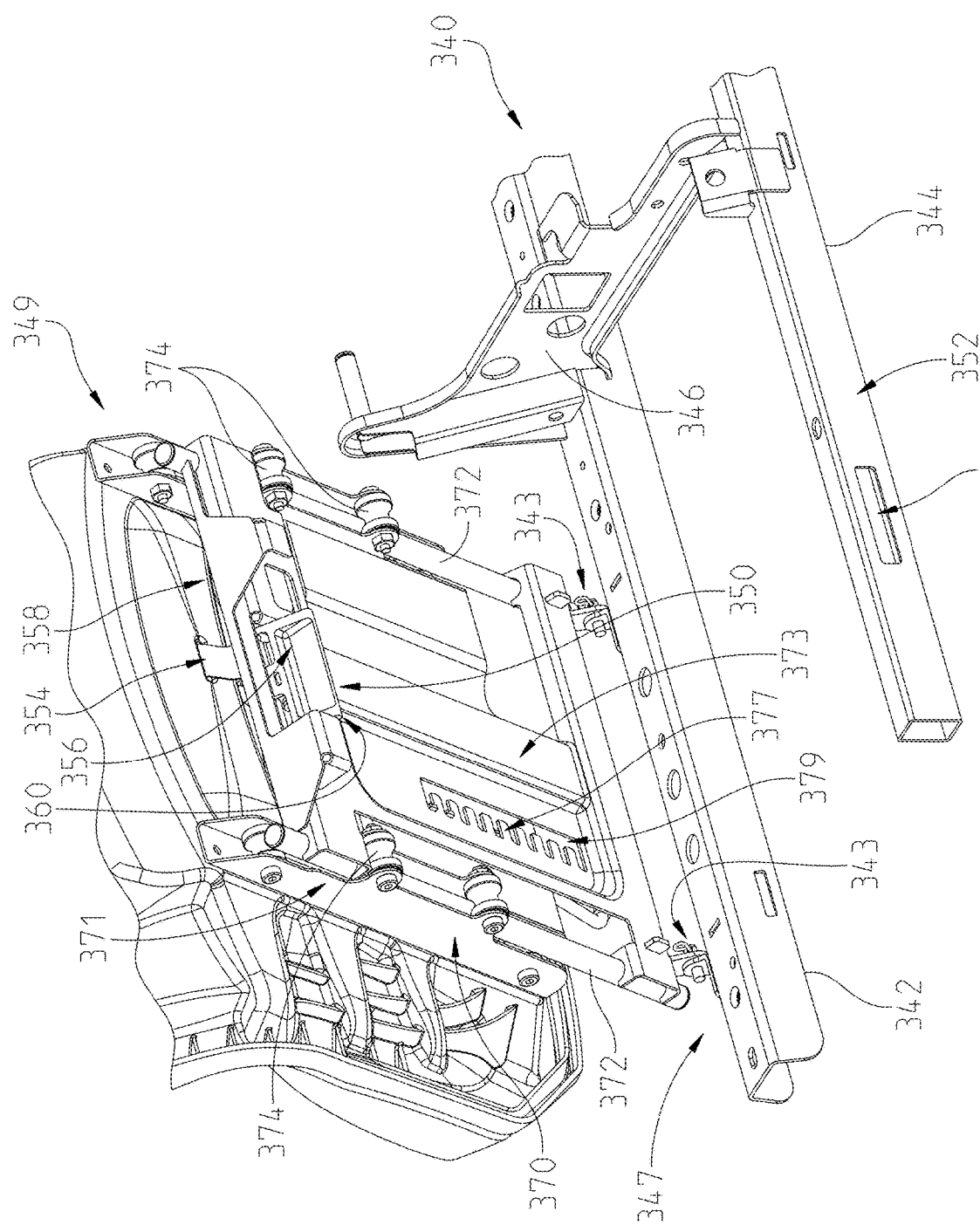
FIG. 40 shows a left rear perspective view of one of the seats and a portion of the seating support of FIG. 39 with the seat shown pivoted forward relative to the seating support.

Referring now to FIGS. 39 and 40, a seating support is generally shown at 340 including transverse frame member 342 and 344 coupled to lower frame portion 98 of frame 20 and supporting seats 24, 26, and longitudinal bracket 346 coupling transverse frame member 342 and 344 between seats 24, 26. Front ends 347 of seats 24, 26 are hingedly coupled to a forward surface 348 of transverse frame member 342 via a set of hinges 343, which are positioned at least partially forward of transverse frame member 342. Rear ends 349 of seats 24, 26 each include a securing element 350 for securing rear ends 349 to a rear surface 352 of transverse frame member 344.

Securing element 350 generally includes a release mechanism 354 and a latch 356. Release mechanism 354 extends through seat bottom 358 and couples to latch 356. In various embodiments, release mechanism 354 is a looped strap or tether. Latch 356 is coupled to seat bottom 358 and includes an extension member or lip 360 configured to be received within an opening 363 within rear surface 352 of transverse frame member 344. In various embodiments, seat bottom 358 may include a bracket (not shown) extending from rear surface 352 of transverse frame member 344, where latch 356 is configured to be received by a U-shaped wire extension of the bracket having both ends coupled to a plate affixed to rear surface 352. When seats 24, 26 are securely coupled to seating support 340, extension member 360 is positioned within opening 363 of transverse frame member 344 securing seats 24, 26 to seating support 340. To release rear end 349 of seat 24 or 26 from seating support 340, release mechanism 354 is engaged (i.e., the looped strap or tether is pulled) causing extension member 360 of latch 356 to disengage with opening 363 such the rear end 349 can be lifted and rotated forward and front end 348 is rotated about hinges 343.

Seats 24, 26 can also be adjusted forward and aft as desired by the driver and/or the passenger. Seat adjustment mechanism 370 is positioned between a bottommost portion of seat 24 or 26 and transverse members 342 and 344. Seat adjustment mechanism 370 generally includes a pair of brackets 371 coupled to seat bottom 358, a pair of bars 372 extending longitudinal below seat bottom 358, a seat adjustment bottom plate 373 coupled to hinges 343 and supporting bars 372, a set of rollers 374 coupled to brackets 371 and received on bars 372, and a lever 375 configured to release a locking mechanism (not shown) from one of notches 377 in opening 379 in plate 373 for holding seat 24 or 26 in a desired position. Rollers 374 are coupled to brackets 371 and received on bars 372 and allow seat 24 or 26 and brackets 371 to adjust forward and aft relative to plate 373 and bars 372 by passing and/or rolling over bars 372. In various embodiments, there number of rollers provided may be 4, while in other various embodiments, the number of rollers provided may be 6 or 8. When lever 375 is actuated, the locking mechanism is disengaged and seat 24 or 26 is allowed to move forward and aft until the desired position is found. Once the desired position is found, lever 374 is released and the locking mechanism is engaged within one of notches 377 in opening 379 to hold seat 24 or 26 in the desired position.

Figure 41:
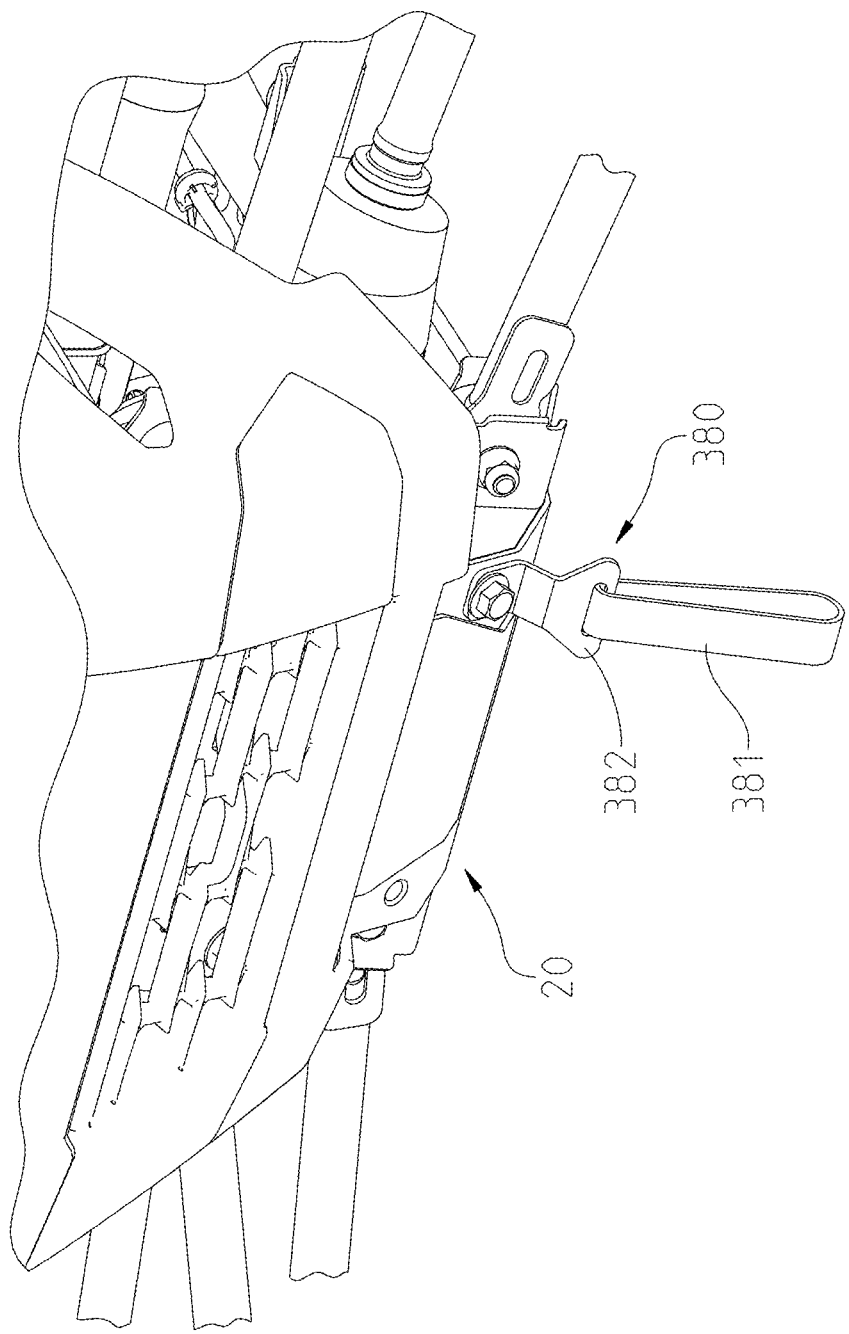
FIG. 41 shows a front left perspective view of a recovery strap of the present disclosure.

Referring now to FIG. 41, a recovery strap of vehicle 2 is generally shown at 380. Recovery strap 380 generally includes a handle 381 and a bracket 382 for coupling handle 381 to frame 20. In various embodiments, recovery strap 380 is coupled to front frame portion 100 of lower frame portion 98. Handle 381 may include webbing (not shown) for increasing the strength of handle 381. Bracket 382 is configured to break at a specific load such that bracket 382 breaks before frame 20 can be damaged when recovery strap 380 is being utilized.

Figure 42:
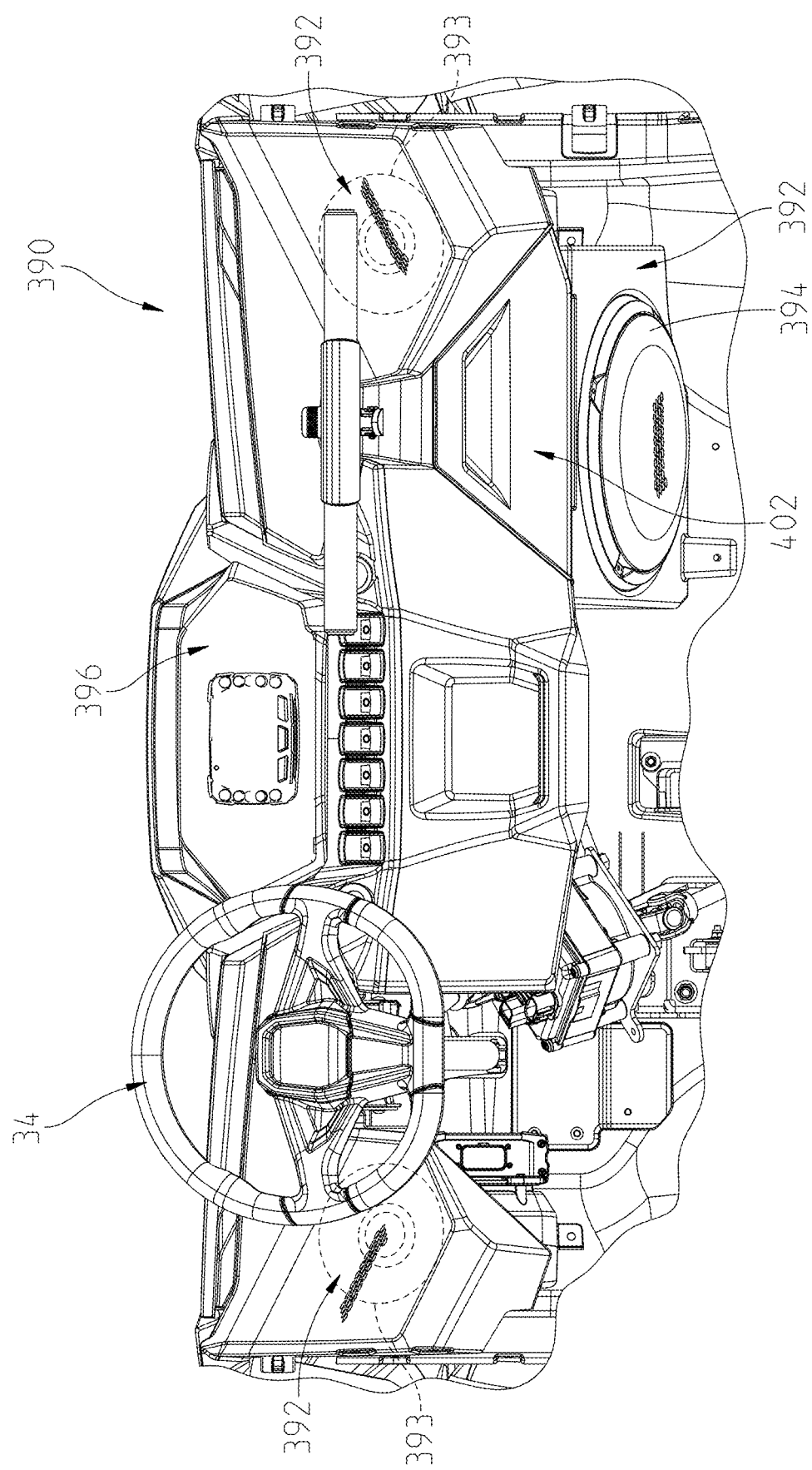
FIG. 42 shows an enlarged view of a dash of the present disclosure including a first set of speakers of the present disclosure.
Figure 43:
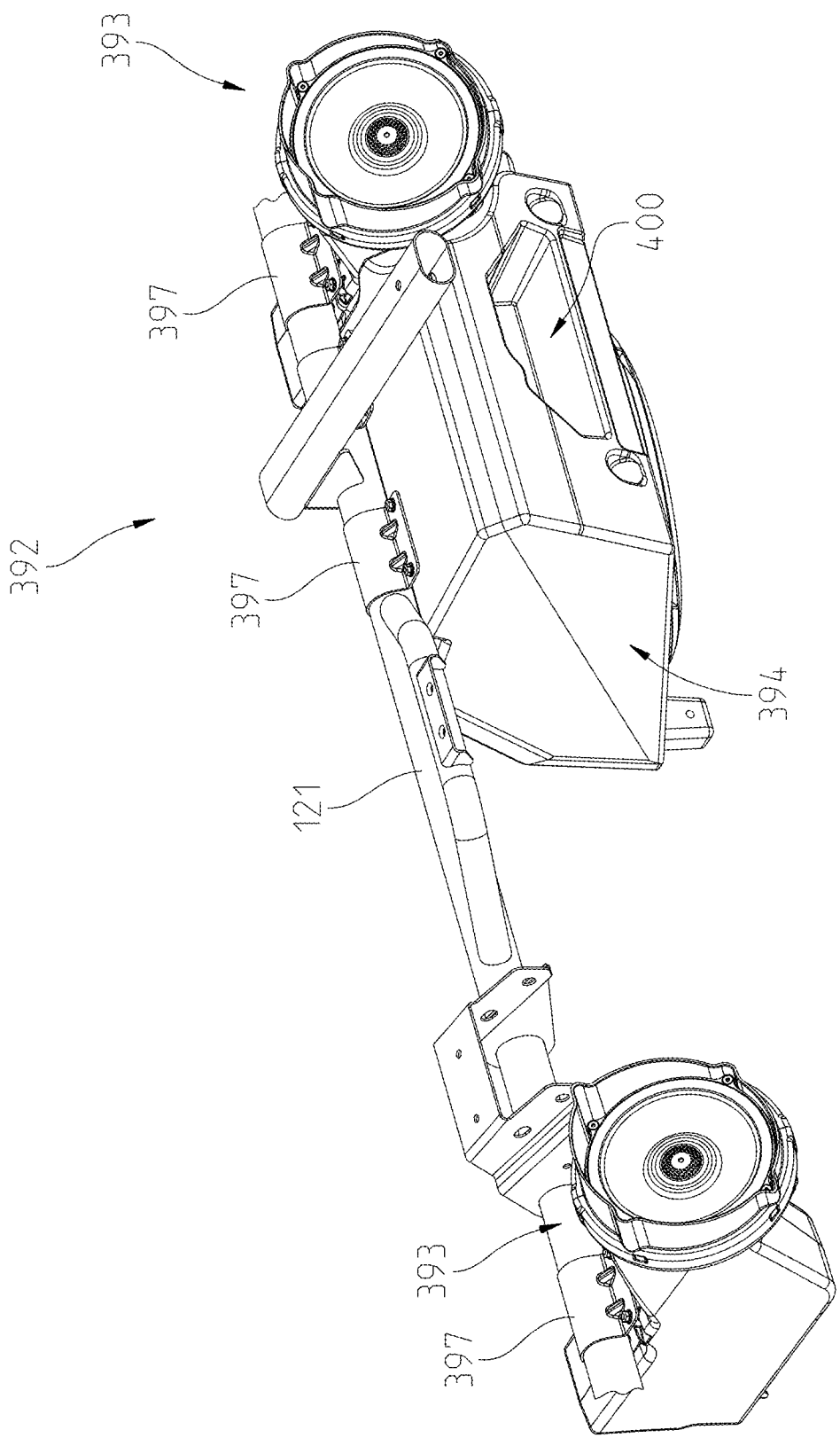
FIG. 43 shows a left rear perspective view of the dash frame portion of FIG. 13 with the first set of speakers of FIG. 42 coupled thereto.
Figure 44:
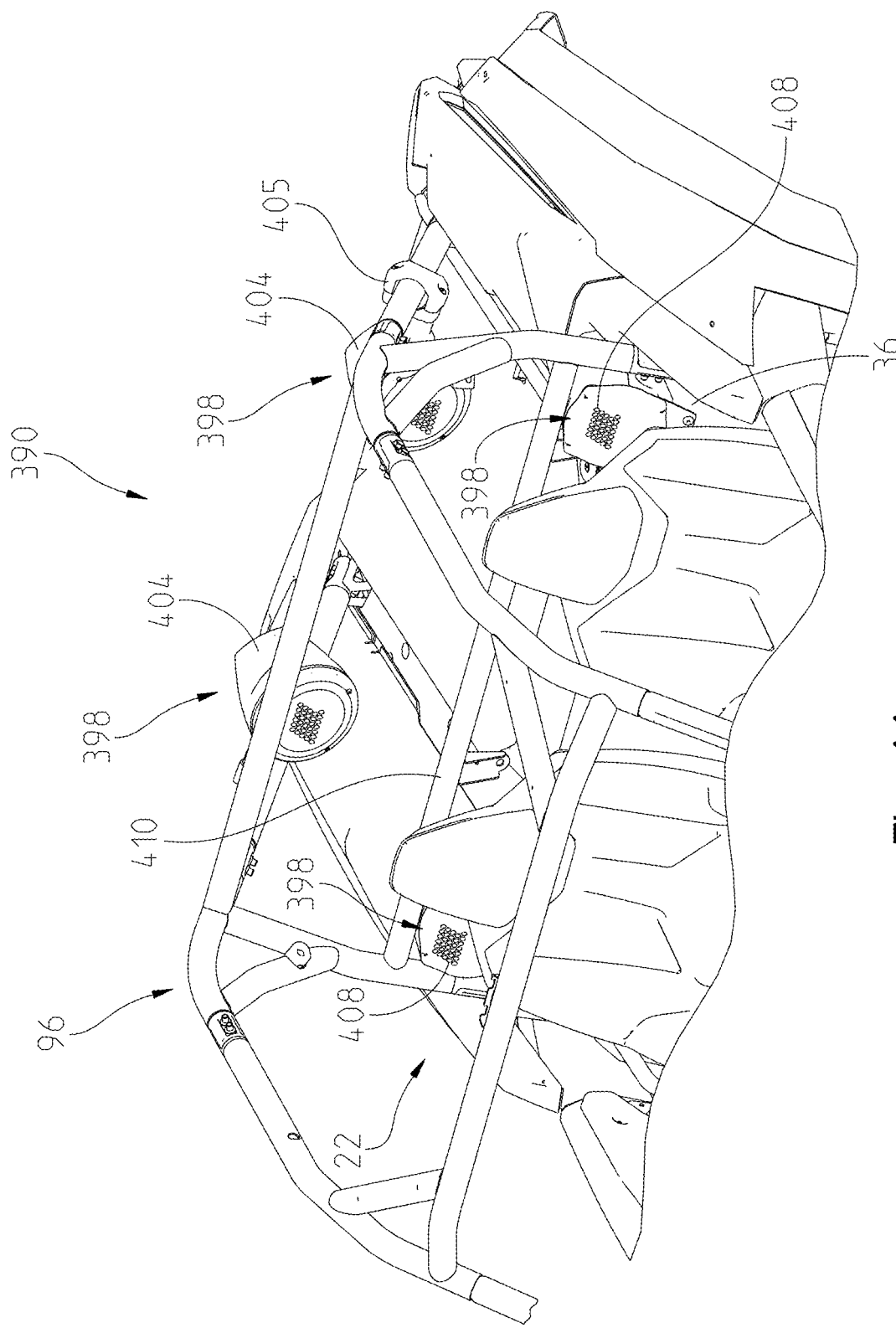
FIG. 44 shows an enlarged left front perspective view of a rear of the vehicle of FIG. 1 including a second set of speakers of the present disclosure.

With reference now to FIGS. 42-44, an audio system 390 is shown. Audio system 390 generally includes a first set of speakers 392 (FIGS. 42 and 43) positioned within dash 396 and a second set of speakers 398 (FIG. 44) positioned rearward of seating area 22.

First set of speakers 392 include a pair of speakers having tweeters or speakers 393 on either end of dash 396 and a subwoofer 394 positioned below passenger grab bar 222 and forward of passenger seat 26. Speakers 393 and subwoofer 394 are coupled to dash frame tube 121 via brackets 397. In various embodiments, brackets 397 are metal clamps that extend over dash frame tube 121 and couple to speaker 393 or subwoofer 394. Subwoofer 394 generally replaces a glove box typically similarly positioned within a vehicle. In various embodiments, subwoofer 394 includes a storage area 400 having an access panel 402 providing storage similar to that of a glove box.

Second set of speakers 398 includes a first pair of speakers 404 and a second pair of speakers 408. First pair of speakers 404 are generally coupled to cab frame 27 at a position higher than an uppermost extent of seats 24, 26 via brackets 405. In various embodiments, brackets 405 are coupled around rear downwardly angled frame members 50 of cab frame 27. Second pair of speakers 408 are coupled to lower frame portion 98 and/or rear body panel assembly 36 at a position below lower cross member 80 of cab frame 27 and behind seats 24, 26.

Figure 45:
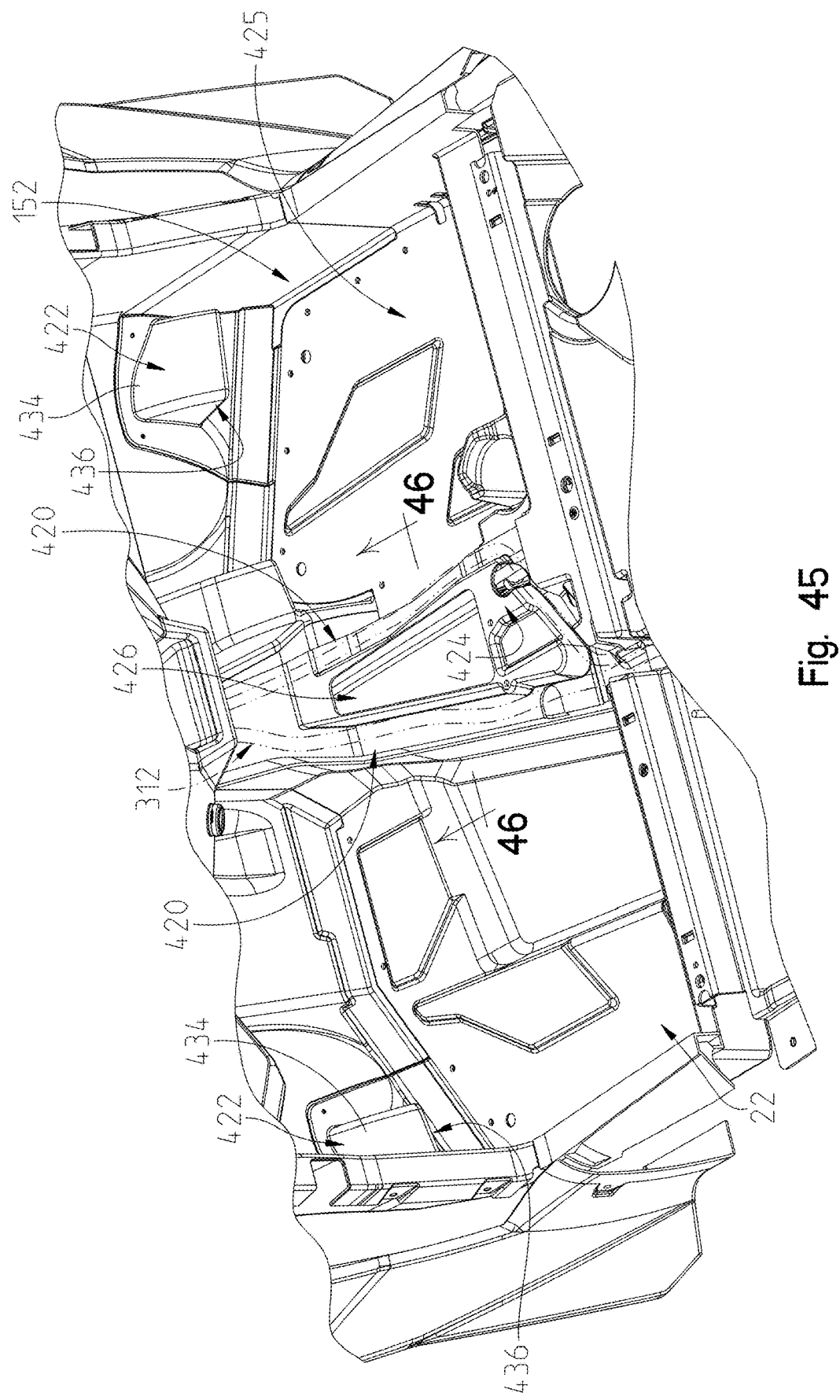
FIG. 45 shows an enlarged upper left rear perspective view of the floor of FIG. 16.
Figure 46:
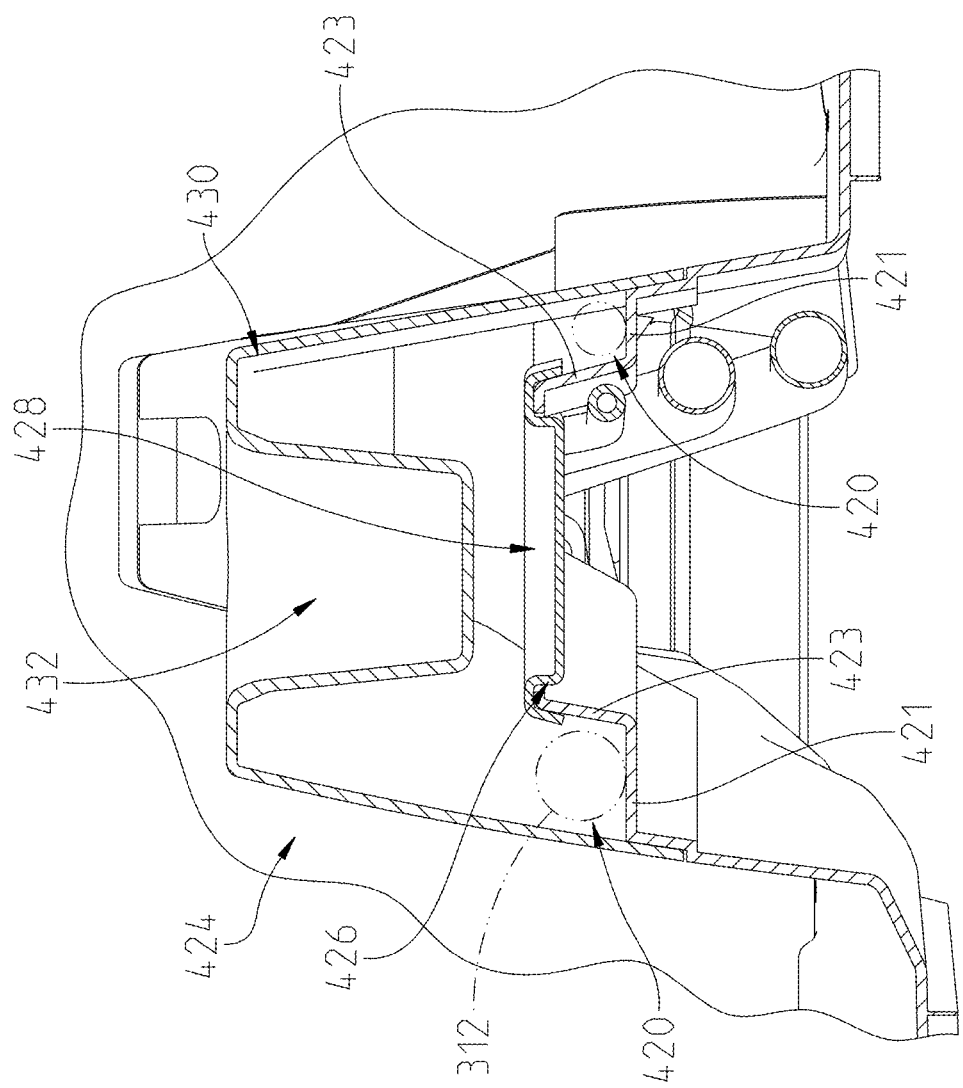
FIG. 46 shows a cross sectional view of the floor of FIG. 45 taken along line 46-46.

Referring now to FIGS. 45 and 46, floor 152 generally includes a set of channels 420 integrally formed within an upward-facing surface 425 of floor 152. Channels 420 are configured to receive wiring harness cable 312, fluid transmission lines, and/or other electrical, fluid or air lines of vehicle 2. In various embodiments, channels 420 are routed on each side of a console 424 in floor 152 between seats 24 and 26.

Console 424 in floor 152 is configured to receive a first cover 428 (FIG. 46) to cover an opening 426 providing access to drivetrain 194 and other components below floor 152, and a second cover 430 (FIG. 46) configured to cover first cover 428 and channels 420. Second cover 430 generally includes a storage area 432 (FIG. 46). Channels 420 are generally defined by a horizontal wall 421 and a generally vertical wall 423 of floor 152, and when second cover 430 is coupled with console 424, a portion of second cover 430. When covers 428 and 430 are removed from console 424, wire harness cable 312 and/or other various wiring components may be easily accessible for cleaning and/or servicing.

Opening 426 is configured to allow drivetrain 194 to be serviced and/or removed from seating area 22 through console 424 when only cover 430 is removed and while frame 20 remains intact. To service drivetrain 194 through opening 426 in console 424, covers 428 and 430 are first removed. Then, first portion 206 of propeller shaft 200 is accessed through opening 426 and disengaged from front drive gear 196 by removing pin, bolt or other coupler 197 (FIG. 25) from front drive gear 196 and first portion 206 of propeller shaft 200. Next, front drive gear 196 is slid forward and/or first portion 206 of propeller shaft 200 is slid rearward to disengage first portion 206 of propeller shaft 200 from front drive gear 196. Once disengaged from front drive gear 196, first portion 206 of propeller shaft 200 is disengaged from second portion 208 by disengaging first portion 206 from universal joint 210, and removed through console 424 such that a new first portion 206 may be installed in reverse order.

Still referring to FIG. 45, floor 152 further includes a pair of foot rests 422 configured to provide support for the driver and/or the passenger. Similar to channels 424, foot rests 422 are formed in upward-facing surface 425. Foot rests 422 are each generally triangular shaped and include a resting surface 434 and a securing surface 436. Resting surface 434 is a generally forward angled surface facing upward and configured to allow the driver or passenger to rest a foot thereon. Securing surface 436 is generally downward facing and configured to allow the driver or passenger to secure themselves by placing their heel on floor 152 and push their toe against securing surface 436. Securing surface 436 is positioned between resting surface 434 and floor 152 such that securing surface 436, resting surface 434, and floor 152 define a triangle. In various embodiments, one of each of foot rests 422 are provided on each of the driver's side and the passenger's side.

Figure 47:
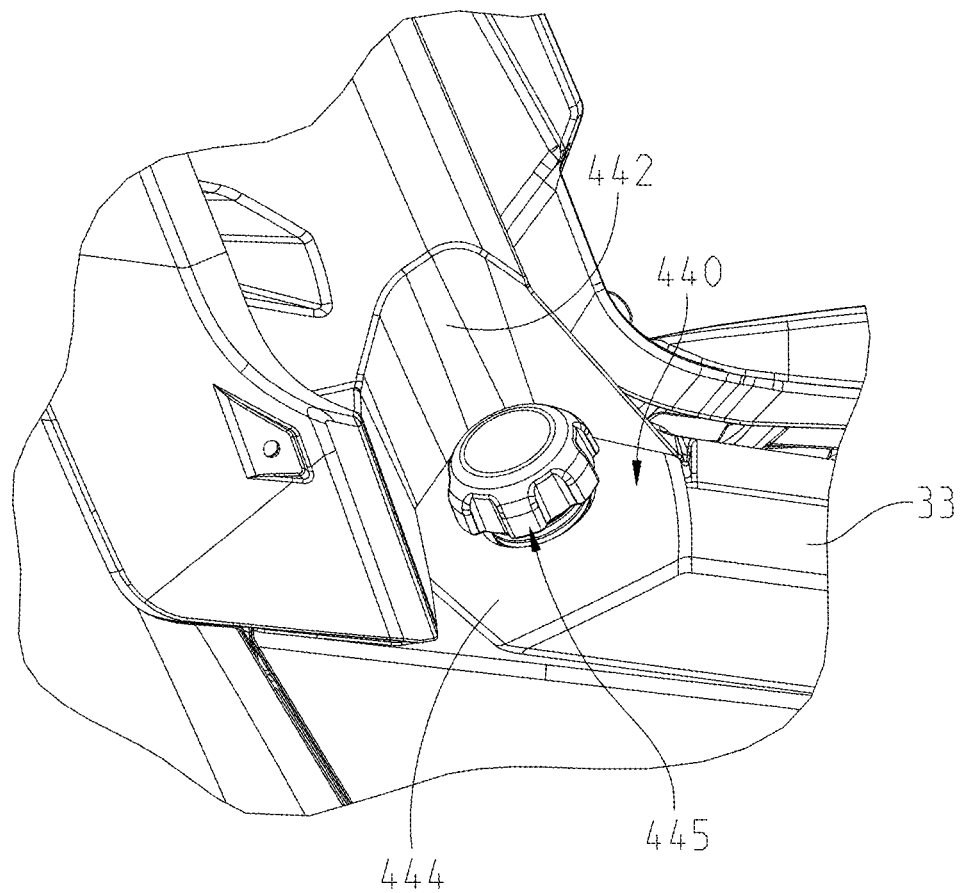
FIG. 47 shows a fuel spill route of the present disclosure.

With reference now to FIG. 47, a fuel spill route in main body panel 33 is shown generally at 440. Fuel spill route 440 generally includes a wall 442 and an angled surface 444. Wall 442 is positioned between fuel fill spout 445 and door 35 and/or frame 20. Angled surface 444 is positioned around fuel fill spout 445 and is sloped generally outward away from wall 442 and door 35 and/or frame 20 such that overflow from fuel fill spout 445 is routed away from door 35 and/or frame 20 and the remainder of vehicle 2 including the powertrain and exhaust assembly 250.

Figure 48:
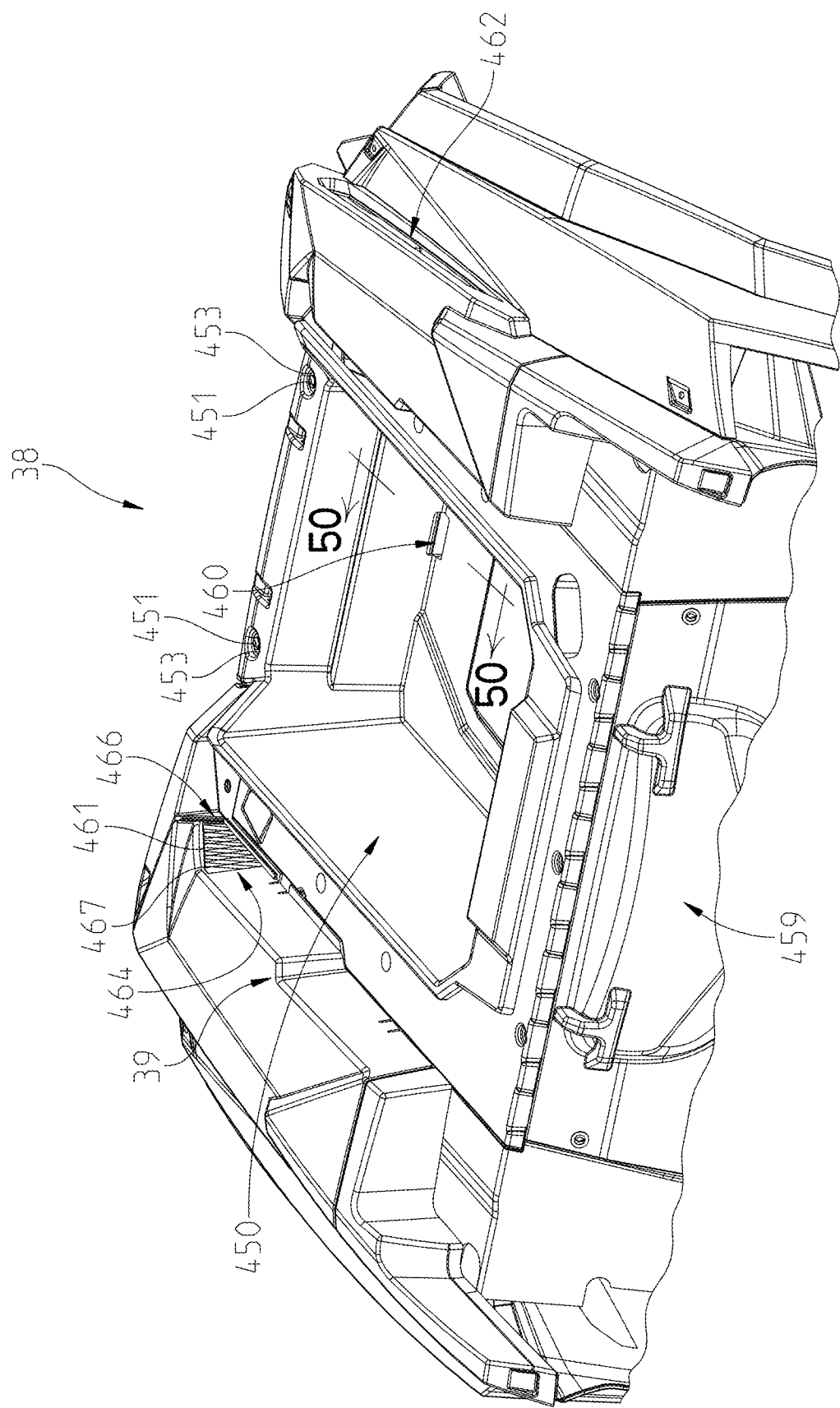
FIG. 48 shows an enlarged front left perspective view of a cargo area and a rear body assembly of the present disclosure.
Figure 49:
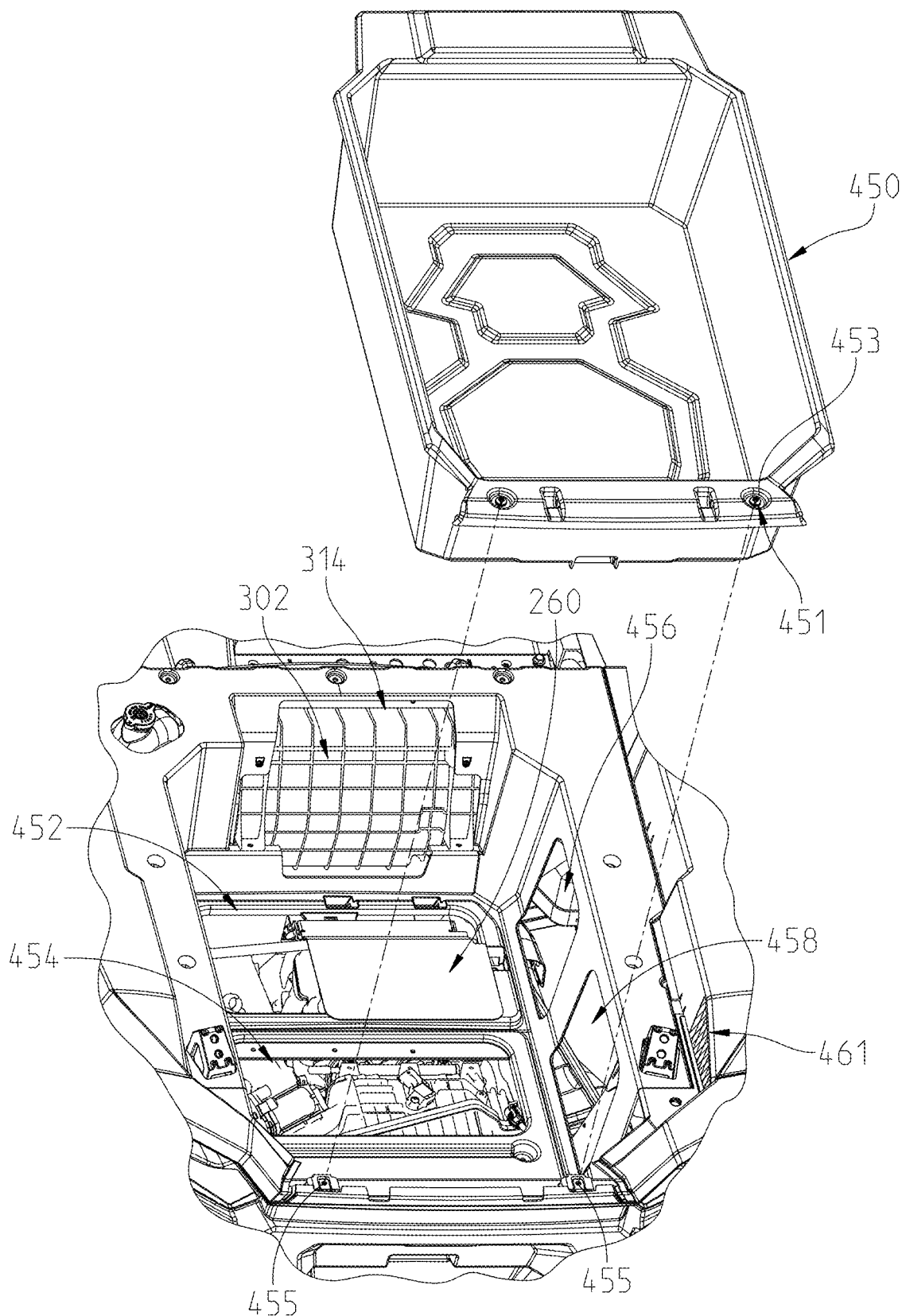
FIG. 49 shows an exploded view of the cargo area and the rear body assembly of FIG. 48.
Figure 50:
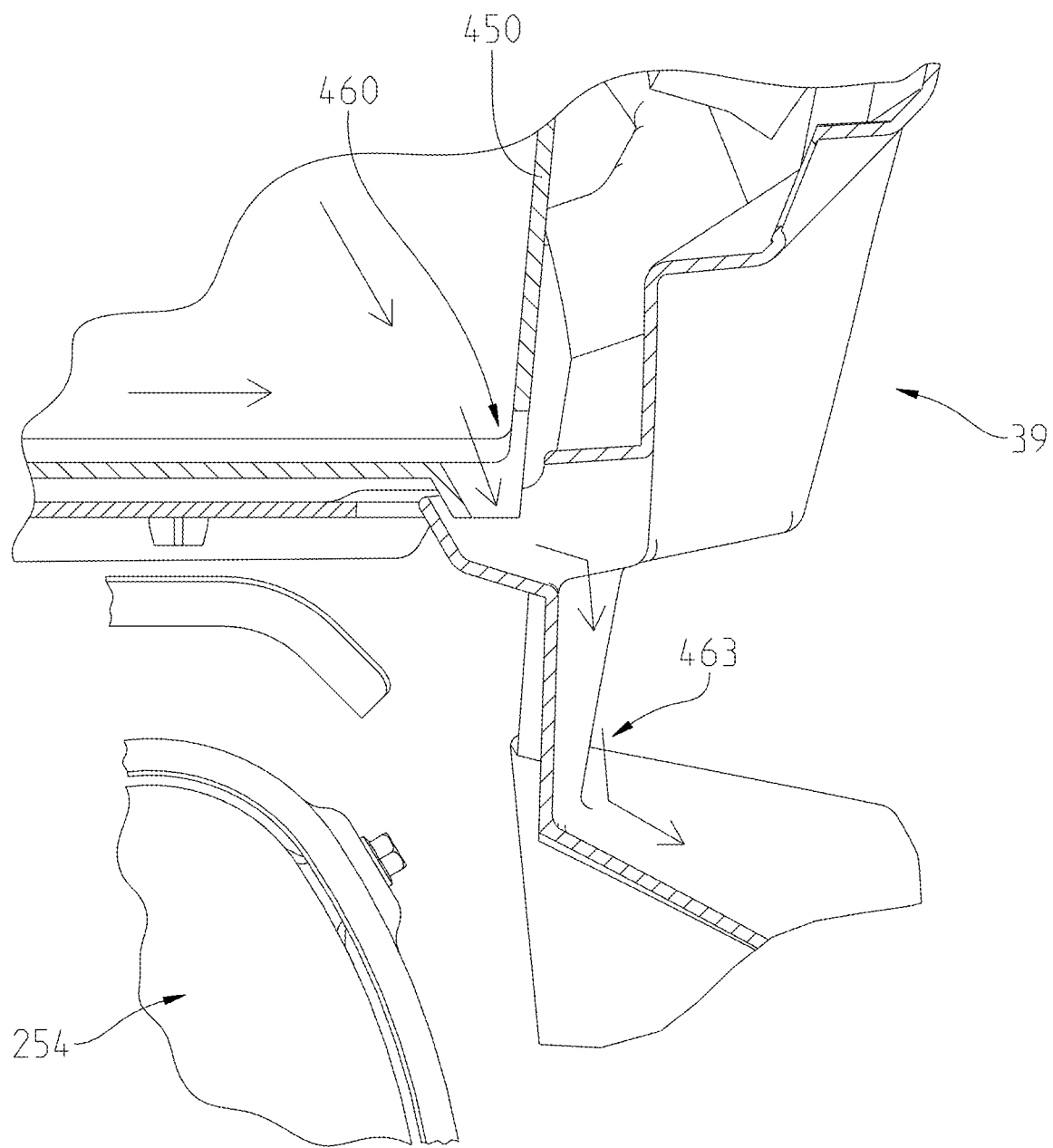
FIG. 50 shows a cross sectional view of the cargo area of FIG. 48 taken along section line 50-50 of FIG. 48.

Referring now to FIGS. 48-50, cargo area 38 includes a cargo tub 450 removably coupled with rear body panel 39 via couplers 451 passed through openings 453 of cargo tub 450 and openings 455 (FIG. 49) in rear body panel 39. When cargo tub 450 is removed from rear body panel 39, the engine, exhaust assembly 250, CVT 282, and airbox 302, among other components of vehicle 2, are all accessible through openings 452, 454, 456, 458, and 314. Exhaust assembly 250 and the engine are generally accessible through opening 452 when hingeable heat shield 260 is opened. When hingeable heat shield 260 is in the open position, cargo tub 450 is unable to be placed back within cargo area 38, thus ensuring that hingeable heat shield 260 is in the closed position before cargo tub 450 is placed back within cargo area 38. In various embodiments, an access panel 459 (FIG. 48) is provided behind seating area 22 forward for cargo tub 450 which allows even further access to components in the rear of vehicle 2 such as the engine, exhaust assembly 250, CVT 282, and airbox 302, among others.

In various embodiments, cargo tub 450 includes a drain spout 460 towards the rear of cargo tub 450 configured to allow fluid and/or debris to leave cargo tub 450. Cargo tube 450 is generally angled rearwardly such that any fluid and/or debris would be pulled towards drain spout 460. Rear body panel 39 generally includes a routing portion 463 configured to route any fluid and/or debris leaving cargo tube 450 through drain spout 460 away from muffler 254.

Figure 51:
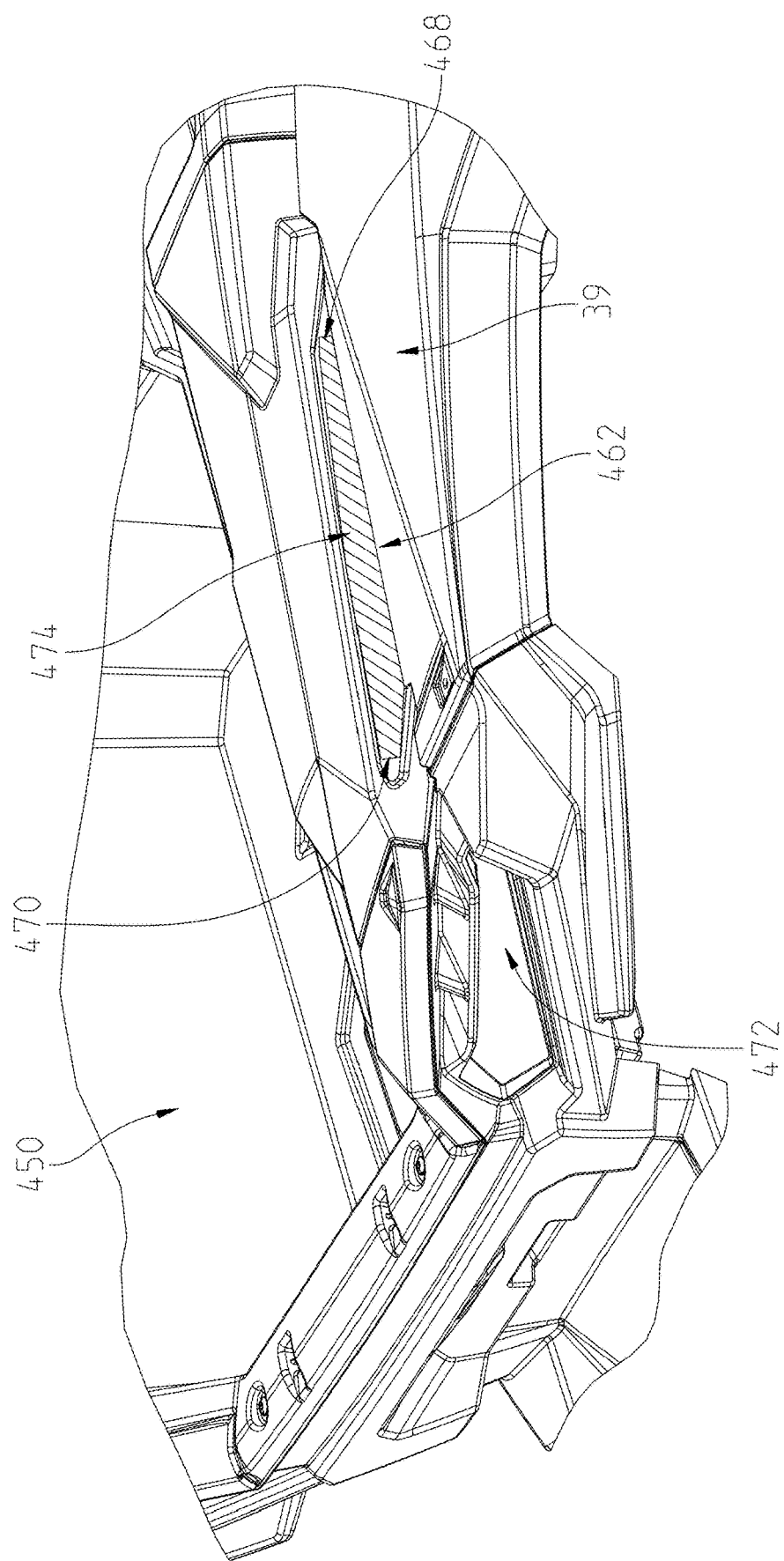
FIG. 51 shows an enlarged right rear perspective view of the rear body assembly of FIG. 49.

With reference now to FIGS. 48 and 51, rear body assembly 36 generally includes a pair of inward-facing intake ports 461 (FIG. 45) and a pair outward-facing intake ports 462 (FIG. 47) for providing air intake into air intake assembly 300 and/or air intake assembly 280. Inward-facing intake ports 461 face each other and are positioned on either side of cargo area 38 at a positioned higher than an uppermost portion of cargo tub 450. Inward-facing intake ports 461 have a first end 464 and a second end 466, where a height of first end 464 is greater than a height of second end 466 and first end 464 is positioned forward of second end 466. Inward-facing intakes ports 461 are generally trapezoidal-shaped openings including a plurality of slots 467. In various embodiments, inward-facing intake ports 460 may include a filter.

Outward-facing intake ports 462 each face outward away from vehicle 2 and are positioned opposite of inward-facing intake ports 460. Outward-facing intake ports 462 have a first end 468 and a second end 470, where second end 470 is positioned adjacent openings 472 within rear body panel 39, where openings 472 are configured to provide access to brakes lights (not shown). Outward-facing intake ports 462 are slim, elongated openings extending from first end 468 to second end 470, and include a plurality of slots 474. In various embodiments, outward-facing intake ports 462 may include a filter and/or air intake input cover 288 may be positioned downstream of outward-facing intake ports 462 below an upper portion of rear body assembly 36.

Figure 52:
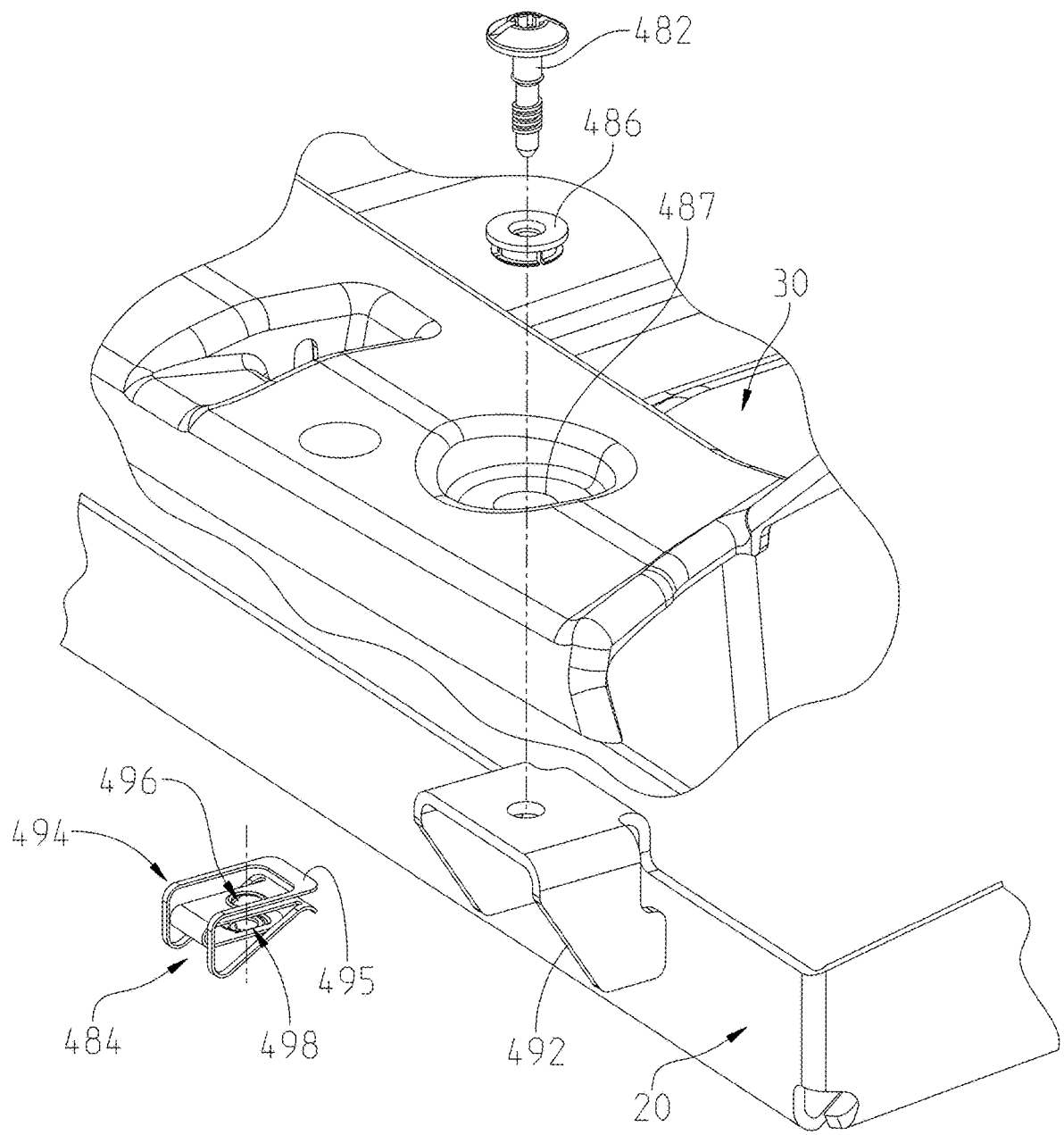
FIG. 52 shows an exploded view of a coupler of the present disclosure for coupling a body panel and a frame portion.

Referring now to FIGS. 52-54, a coupler for coupling body panel 30 to frame 20 and/or another body panel 30' is generally shown at 480. In various embodiments, coupler 480 may also or alternatively be used to couple body panels 31, 33, 37, 39, and/or 450 to frame 20. Coupler 480 generally allows for quick removal of panels 30, 31, 33, 37, 39, and/or 450 in that couple 480 is loosened by only a few turns. Coupler 480 includes a screw 482, a coupling bracket 484, and a press fit receiver 486. Screw 482 includes a head 481, a body 483, and a threaded portion 499. Press fit receiver 486 is press fit into an opening 487 in body panel 30 and includes a collar 488 and a tab 490 configured to secure press fit receiver 486 within opening 487 and an opening 489 configured to receive screw 482. Coupling bracket 484 clips onto a mounting bracket 492 of frame 20 or a portion 492' of body panel 30' via clip portion 494, and further includes first and second openings 496 and 498 for receiving screw 482. Screw 482 passes through opening 487 in body panel 30, opening 489 in receiver 486, an upper portion 495 of clip portion 494, an opening 493 in mounting bracket 492/portion 492', and first and second openings 496 and 498 of coupling bracket 484. Screw 482 includes a threaded portion 499 configured to threadingly engage with second opening 498 of coupling bracket 484 to secure body panel 30 to mounting bracket 492 of frame 20 or portion 492' of body panel 30'. Coupler 480 is generally configured to be removed and tightened with only a few turns and is incapable of being over-torqued. Rather, if coupler 480 is turned beyond the few turns it takes to tighten coupler 480, threaded portion 499 on screw 482 reengages second opening 498 of coupling bracket 484.

Figure 55:
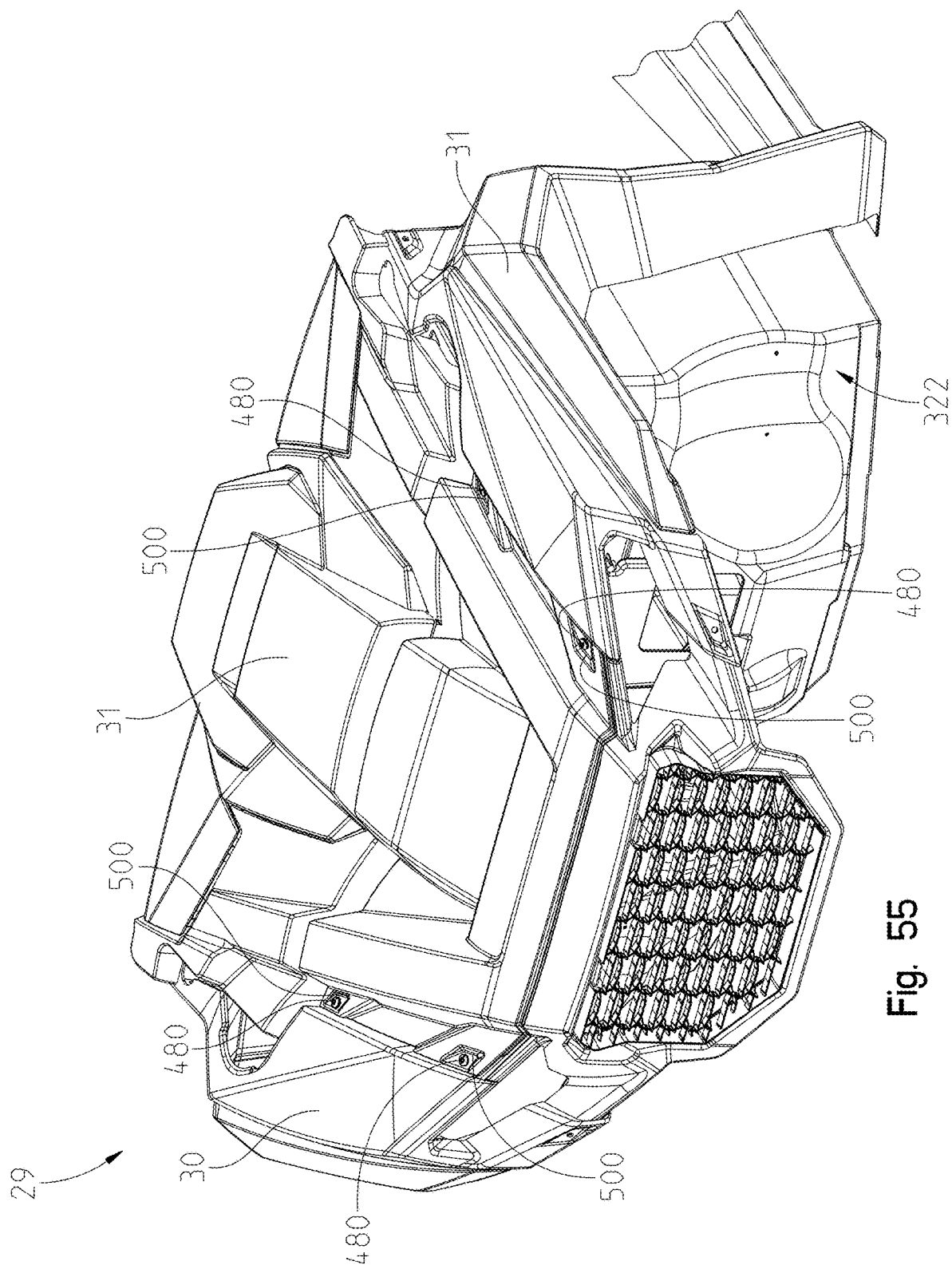
FIG. 55 shows a front left perspective view of a front body assembly of the present disclosure.

With reference now to FIG. 55, in various embodiments, coupler 480 may couple body panels 30, 31, 33, 37, 39, and/or 450 to one another. For instance, hood panel 31 may be coupled to front fender body panels 30 via openings 500 using couplers 480 such that hood panel 31 can be quickly removed from vehicle 2. With the use of couplers 480, body panels 30, 31, 33, 37, 38 and 450 may all be quickly removed from vehicle 2 such that the various ports, engine components, and other various areas may be quickly accessed and/or cleaned.

Figure 56:
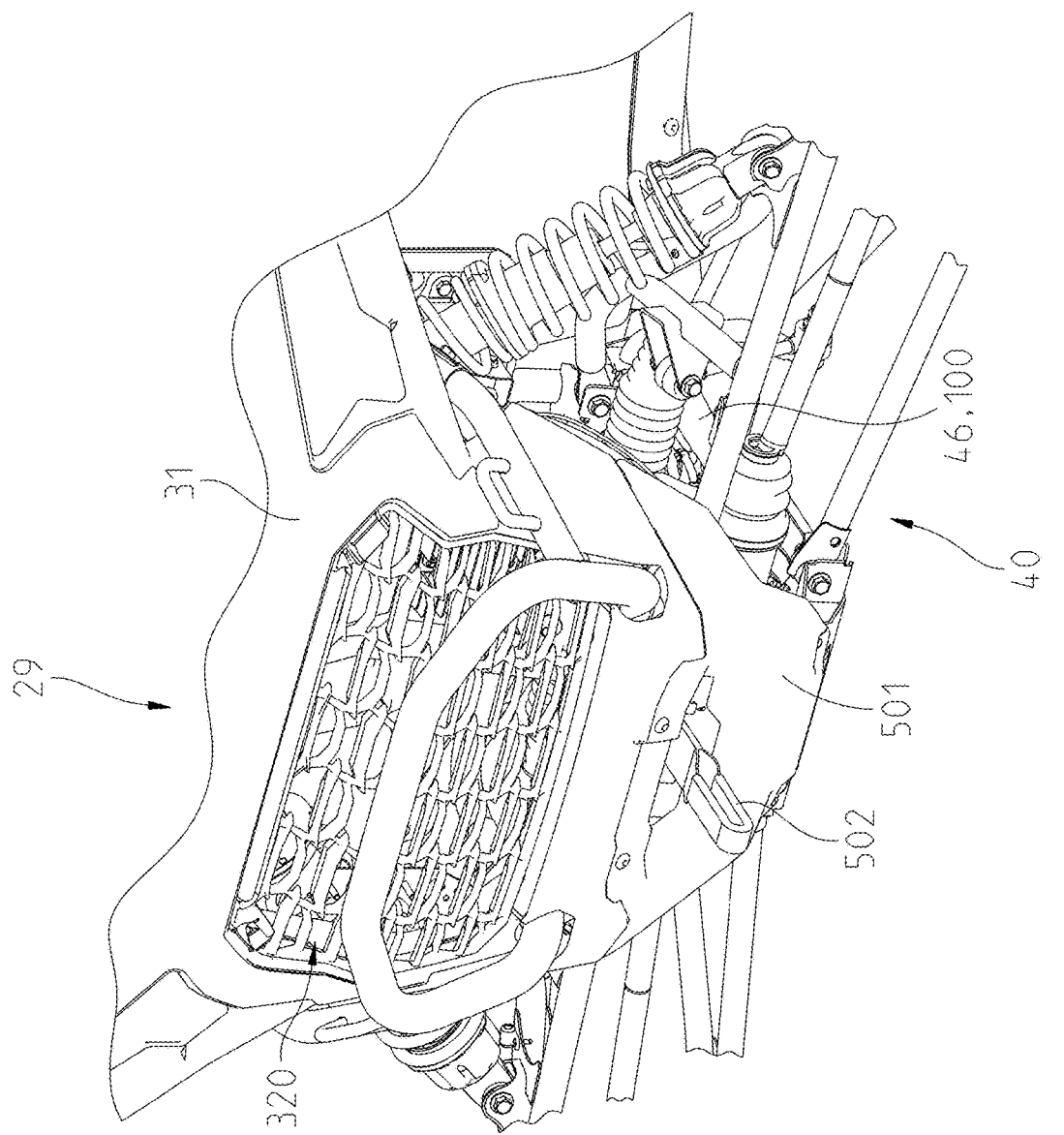
FIG. 56 is a left front perspective view of a front portion of the vehicle of FIG. 1 and illustrating a location for a tow strap of the vehicle.

Referring to FIG. 56, front frame portion 46, 100 may support a tow strap 502 thereon to allow vehicle 2 to be towed and/or to pull other objects. Tow strap 502 is illustratively positioned along a longitudinal axis of vehicle 2 and generally below radiator 320 and above a front bumper 501 of front body assembly 29. Tow strap 502 also may be positioned forward of front suspension assembly 40 and vertically intermediate portions thereof (e.g., vertically intermediate an upper control arm and a lower control arm and/or vertically intermediate a portion of a shock absorber and a lower control arm). As with recovery strap 380 of FIG. 41, brackets or other components which support tow strap 502 on vehicle 2 may be configured to break at a specific load such that the bracket(s) or couplers break before frame 20 can be damaged when tow strap 502 is being utilized.

Figure 57A:
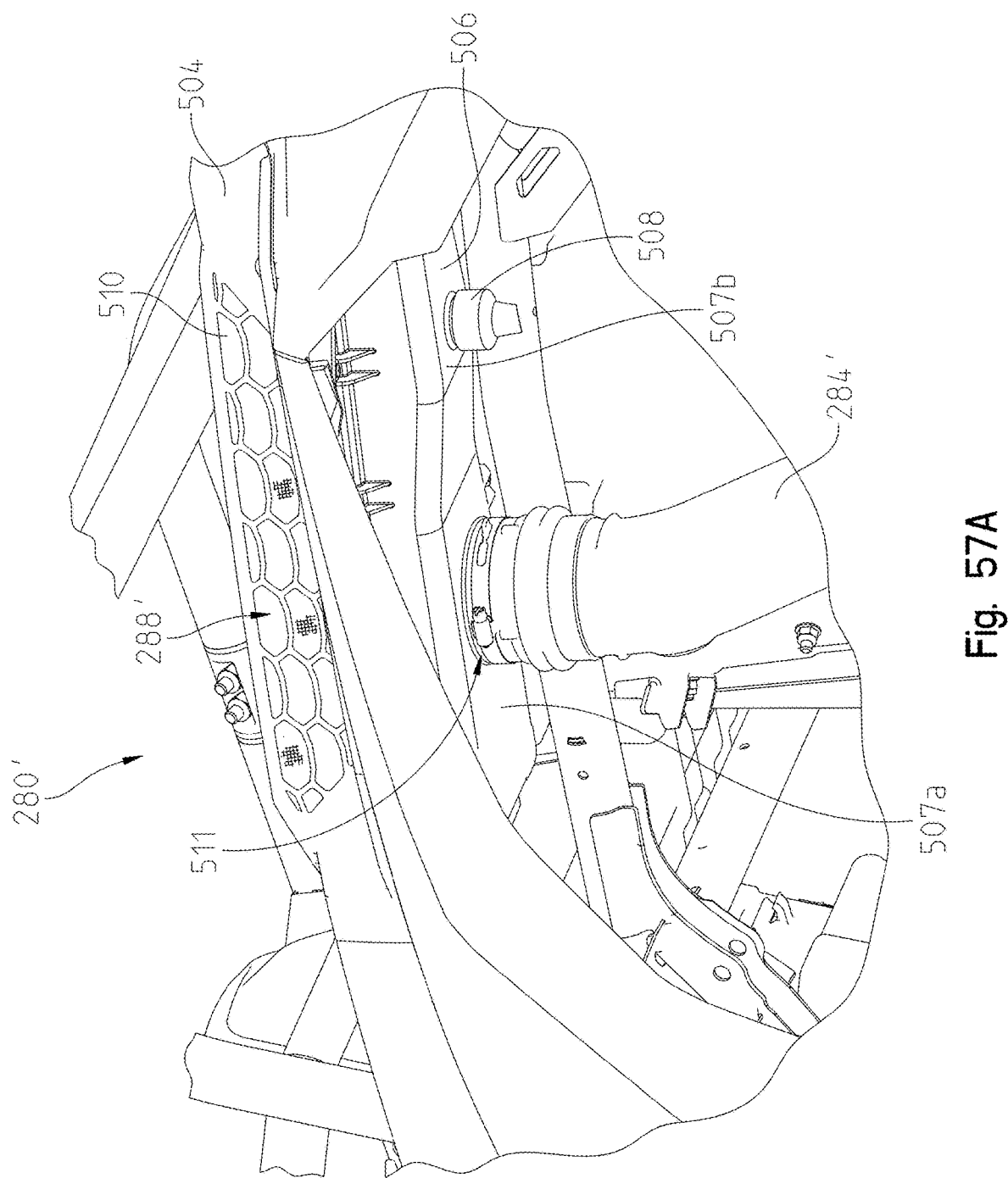
FIG. 57A is a left rear perspective view of an alternative embodiment air intake assembly for a continuously variable transmission ("CVT") of the vehicle of FIG. 1.
Figure 57B:
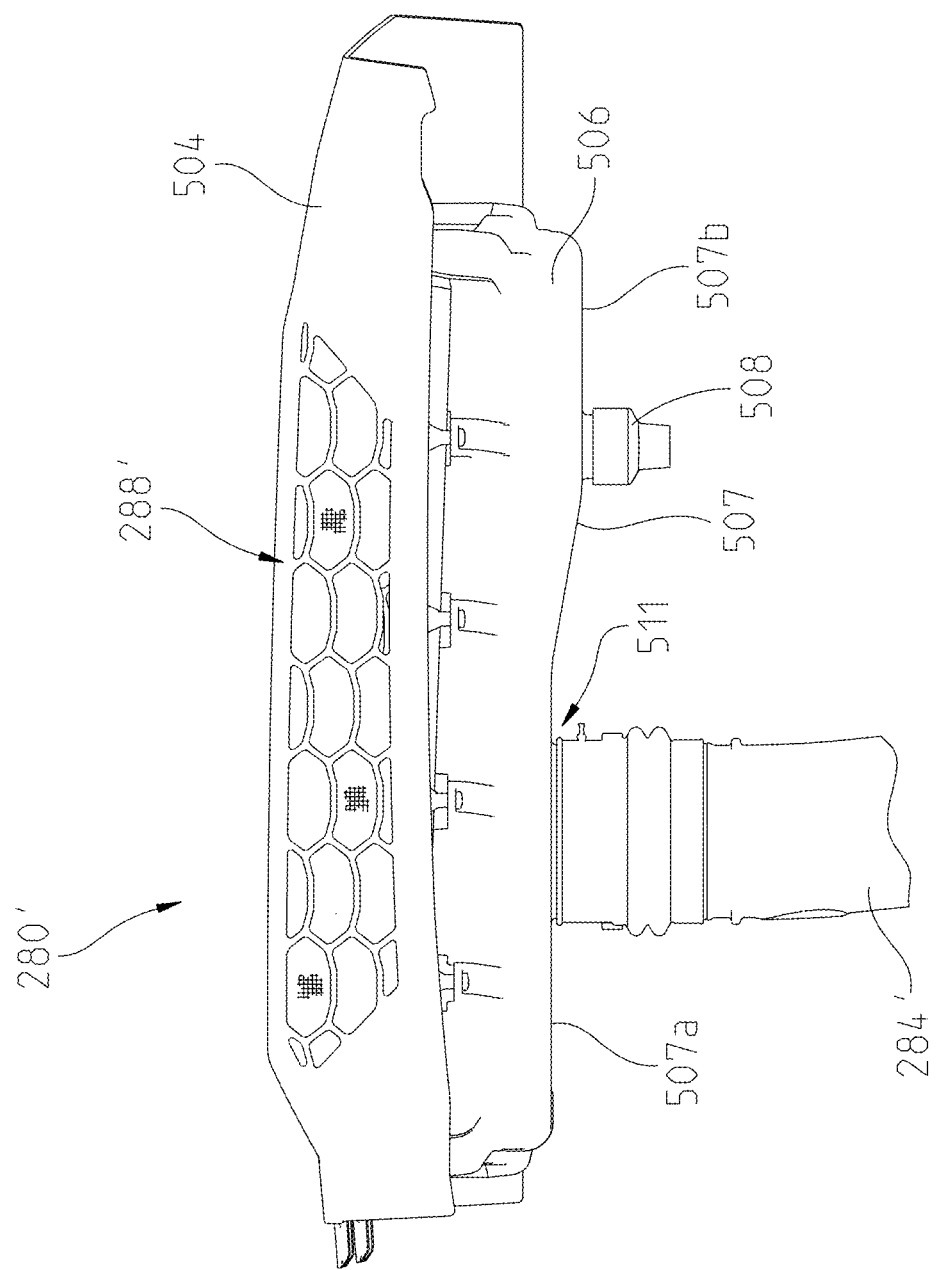
FIG. 57B is a left side view of the air intake assembly of FIG. 57A.
Figure 58:
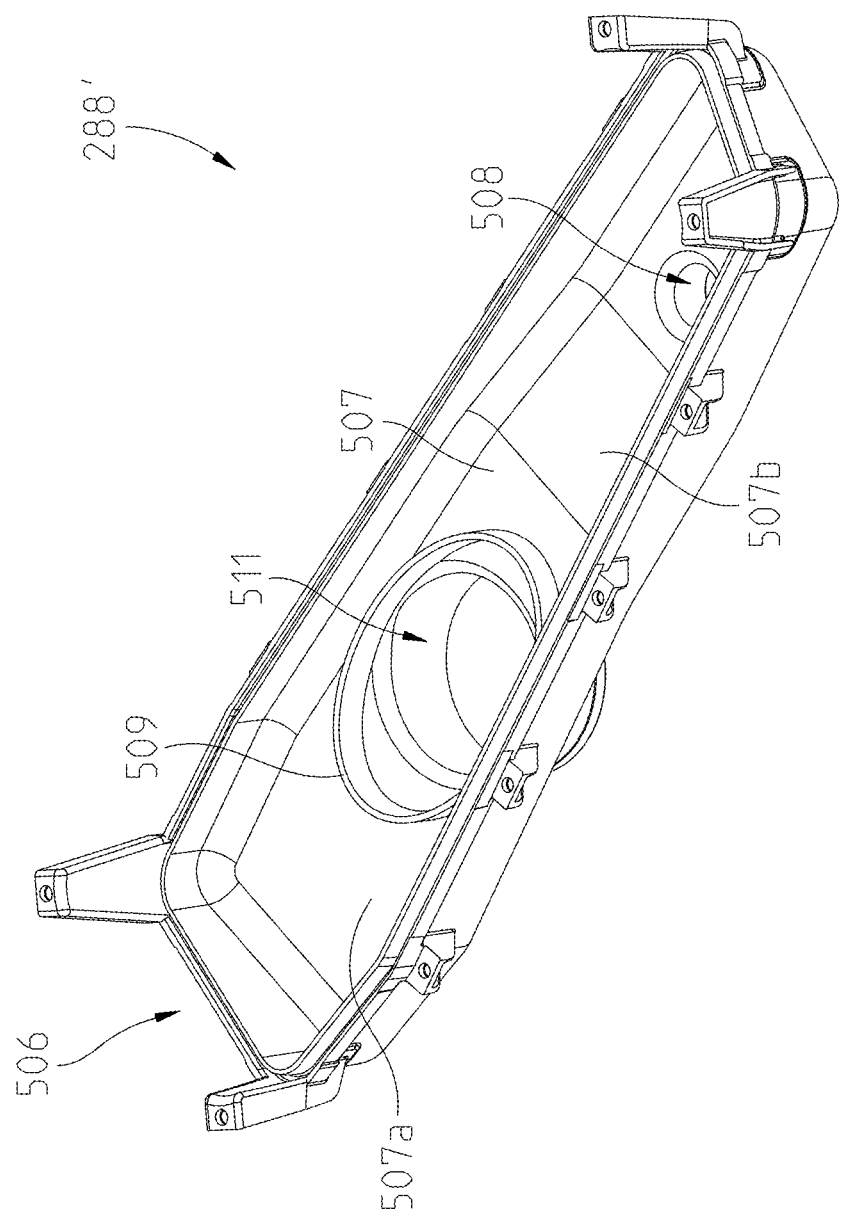
FIG. 58 is a top perspective view of the air intake assembly of FIG. 57A.
Figure 60:
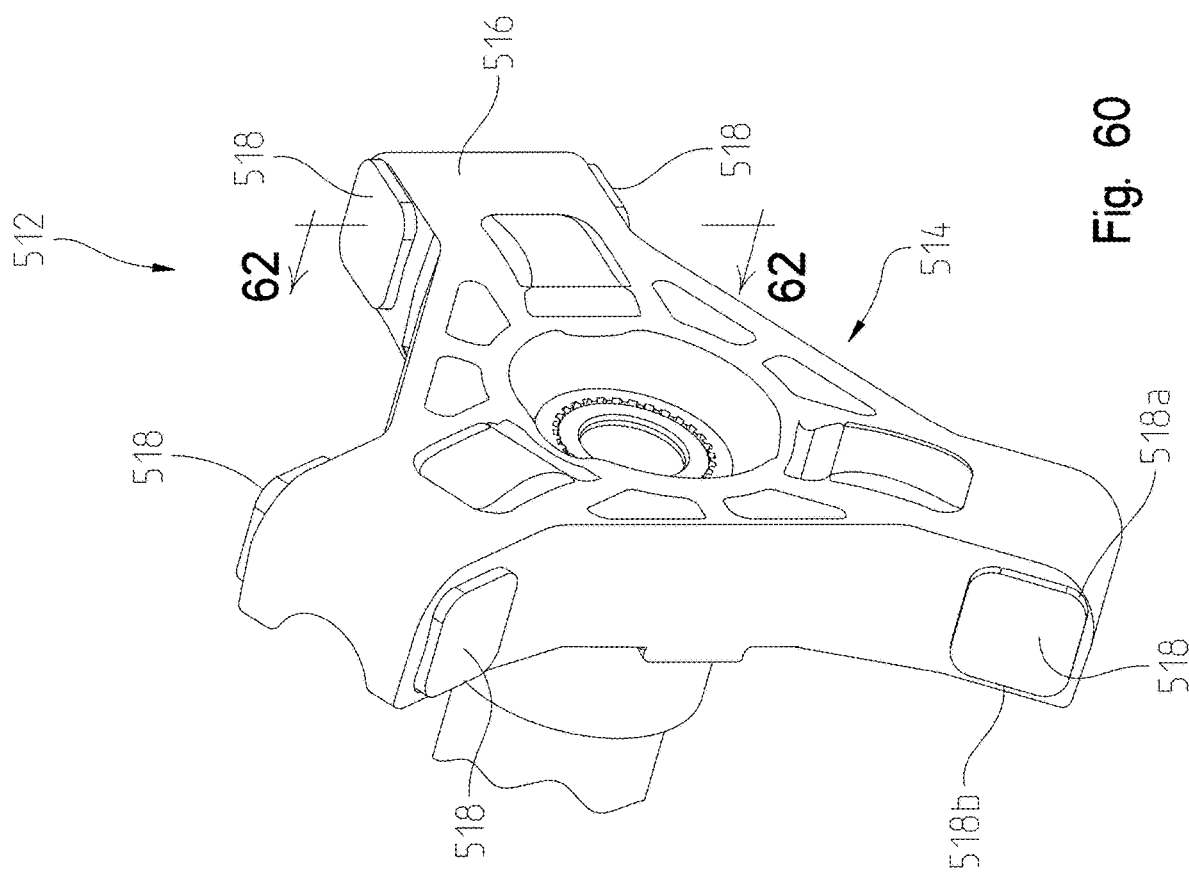
FIG. 60 is a perspective view of a spider of a drive clutch of the CVT of the vehicle of FIG. 1.
Figure 59:
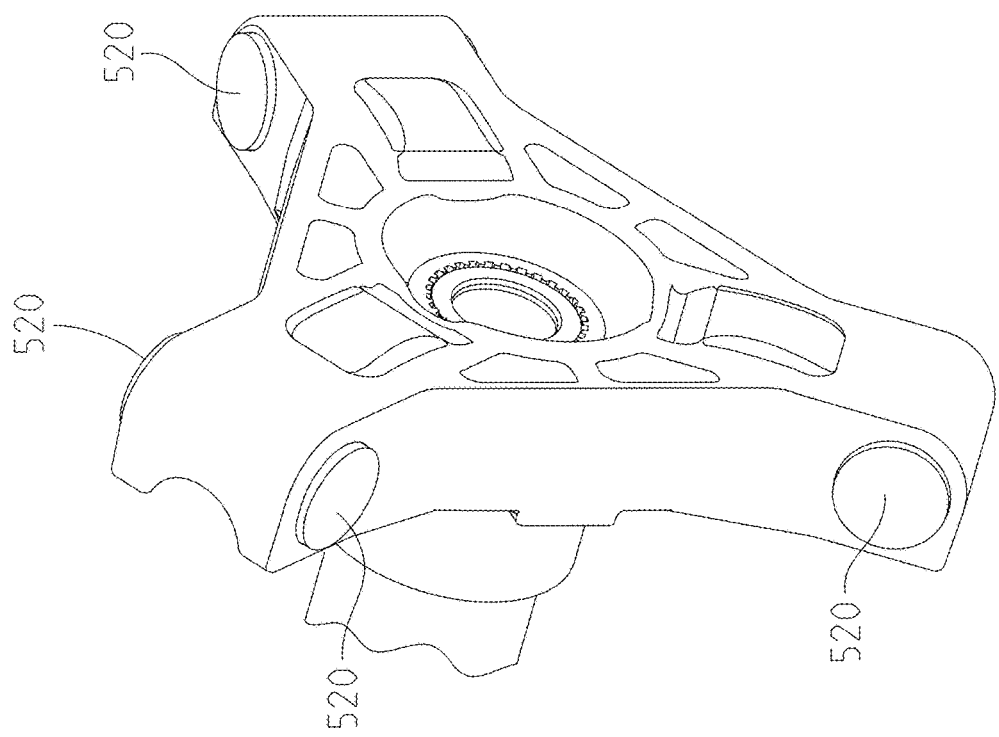
FIG. 59 is a perspective view of a prior art spider of a drive clutch for the CVT.
Figure 61:
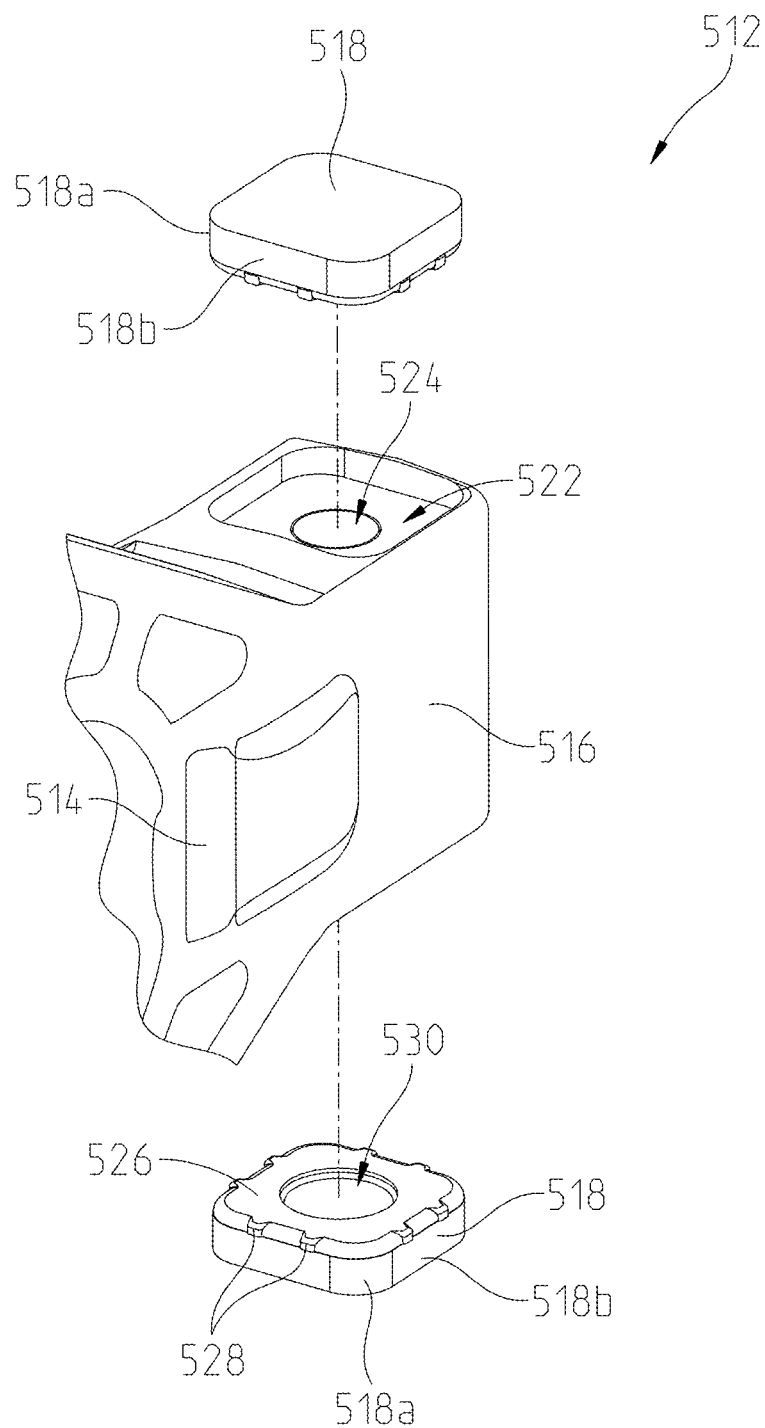
FIG. 61 is an exploded view of a portion of the spider of FIG. 60.
Figure 62:
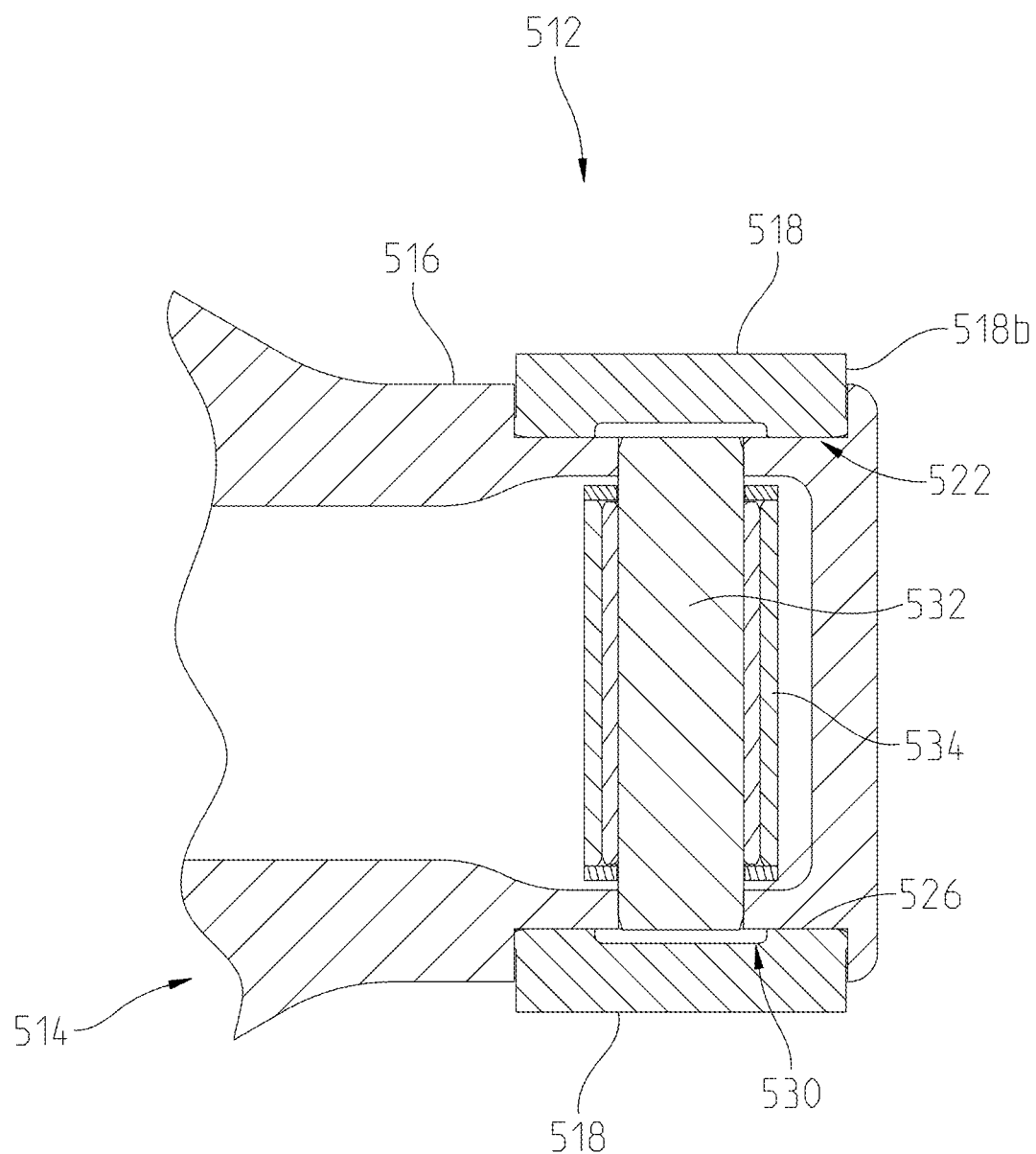
FIG. 62 is a cross-sectional view of the portion of the spider of FIG. 61, taken along line 62-62 of FIG. 60.

Referring now to FIGS. 57A and 58, an alternative air intake assembly is shown as 280'. Air intake assembly 280' includes air intake conduit 284' and air intake input cover or housing 288'. Housing 288' includes a first (illustratively, upper) portion 504 and a second (illustratively, lower) portion 506 removably coupled together with conventional fasteners. At least one seal may be positioned at the interface between first and second portions 504, 506 and compressed to ensure a watertight connection when the conventional fasteners secure first and second portions 504, 506 together. First portion 504 includes a filter 510 configured to prevent debris, dirt, and other particulates from entering air intake conduit 284'. In one embodiment, filter 510 may be comprised of a plurality of membranes or other filter members which filter the incoming air.

Second portion 506 includes a bottom wall 507 supporting a drain 508 (illustratively, a duck bill drain or port). More particularly, bottom wall 507 comprises a first portion 507*a* (e.g., a generally horizontal surface) and a second portion 507*b* (e.g., a surface comprising an angled surface extending to and/or defining the lowest vertical extent of housing 288') and drain 508 is positioned at any location along second portion 507*b*, including a horizontal or flat portion thereof defining the lowest vertical extent of housing 288'.

As shown best in FIG. 58, bottom wall 507 includes an upstanding wall 509 within the internal volume of housing 288' which generally surrounds an intake port 511 fluidly coupled to air intake conduit 284'. Upstanding wall 509 has a generally rounded shape and, in various embodiments, may define a circle, oval, or ellipse. Upstanding wall 509 surrounds intake port 511 and, therefore, if water or other fluids enter housing 288', as the fluid collects on bottom wall 507, the fluid is prevented from entering air intake conduit 284' by upstanding wall 509 and flows towards drain 508 along second portion 507b due to the sloping nature of second portion 507b. Because drain 508 is supported at the lowest vertical extent of bottom wall 507, the water or fluid which collects at drain 508 and can be removed from vehicle 2. It may be appreciated that upstanding wall 509 merely prevents water or other liquids from entering intake port 511 but does allow the air entering housing 288' to flow into intake port 511. More particularly, upstanding wall 509 has a height that prevents liquids from entering intake port 511 but allows air to enter intake port 511.

Referring now to FIGS. 59-64, a portion of CVT 282 is shown. As is known, for example from U.S. patent application Ser. No. 16/357,695, filed Mar. 19, 2019, and U.S. patent application Ser. No. 16/357,676, filed Mar. 19, 2019, the complete disclosures of which are expressly incorporated by reference herein, CVT 282 includes a drive clutch or pulley 512, a driven clutch or pulley (not shown), and a belt (not shown) extending therebetween. Drive clutch 512 is operably coupled to the engine and the driven clutch is operably coupled to a geartrain (not shown).

Drive clutch 512 may include a plurality of components and, illustratively, a moveable sheave 536 and a spider 514 (FIG. 60) which may be movable relative to each other. Because of this movement, spider 514 may include buttons 518 positioned on arms 516 of spider 514. Buttons 518 are positioned at potential wear points between spider 514 and moveable sheave 536. For example, if buttons 518 rotate during operation of the CVT, material loss of buttons 518 and/or spider 514 and shearing may occur. Illustratively, buttons 518 are defined by a shape configured to prevent rotation. For example, buttons 518 have a generally rectangular configuration and, more particularly, generally define a square having rounded edges 518a at the ends of linear portions or walls 518b; however, buttons 518 may be defined by any shape other than a perfect circle to prevent rotation. In one embodiment, buttons 518 may be defined by flat surfaces configured to prevent rotation, such as a triangular shape. In other embodiments, buttons 518 may be configured with rounded and/or elongated surfaces to prevent rotation, such as an oval shape. Further still, buttons 518 may be configured with angled surfaces to prevent rotation, such as a square or rectangular shape with 90-degree corners. Each button 518 also may include a plurality of tabs 528 extending from a base 526 toretain button 518 within recess 522 of arm 516.

Two buttons 518 may be supported on each arm 516 and are adjacent a pin 532. Pin 532 extends through a portion of arm 516 and is received within recesses 530 of the opposing buttons 518 on arm 516. Recess 530 is defined on base 526 of button 518. At least base 526 is received within a recess 522 of arm 516. Arm 516 includes a throughbore 524 which aligns with recesses 530 of buttons 518. Pin 532 extends along throughbore 524 and is received within recesses 530. However, in other embodiments, buttons 518 may not include recesses 530 and pin 532 may be positioned adjacent a flat inner surface of buttons 518. A bushing 534 may be positioned at throughbore 524 to prevent rotation of pin 532 therein.

It may be appreciated that the configuration of buttons 518 prevents rotation of buttons 518 on spider 514 during the movement between spider 514 and moveable sheave 536 because the non-circular shape of buttons 518 includes stop surfaces (e.g., linear portions 518b) to prevent rotation or other movement of buttons 518 if buttons 518 contact moveable sheave 536. Conversely, if buttons had a circular configuration, such as buttons 520 of FIG. 59, then buttons 520 may easily rotate during the movement between spider 514 and moveable sheave 536 because there are no features (e.g., corners) of buttons 520 that prevent rotation. Additionally, tabs 528 may prevent button 518 from rotating within recess 522.

Figure 63:
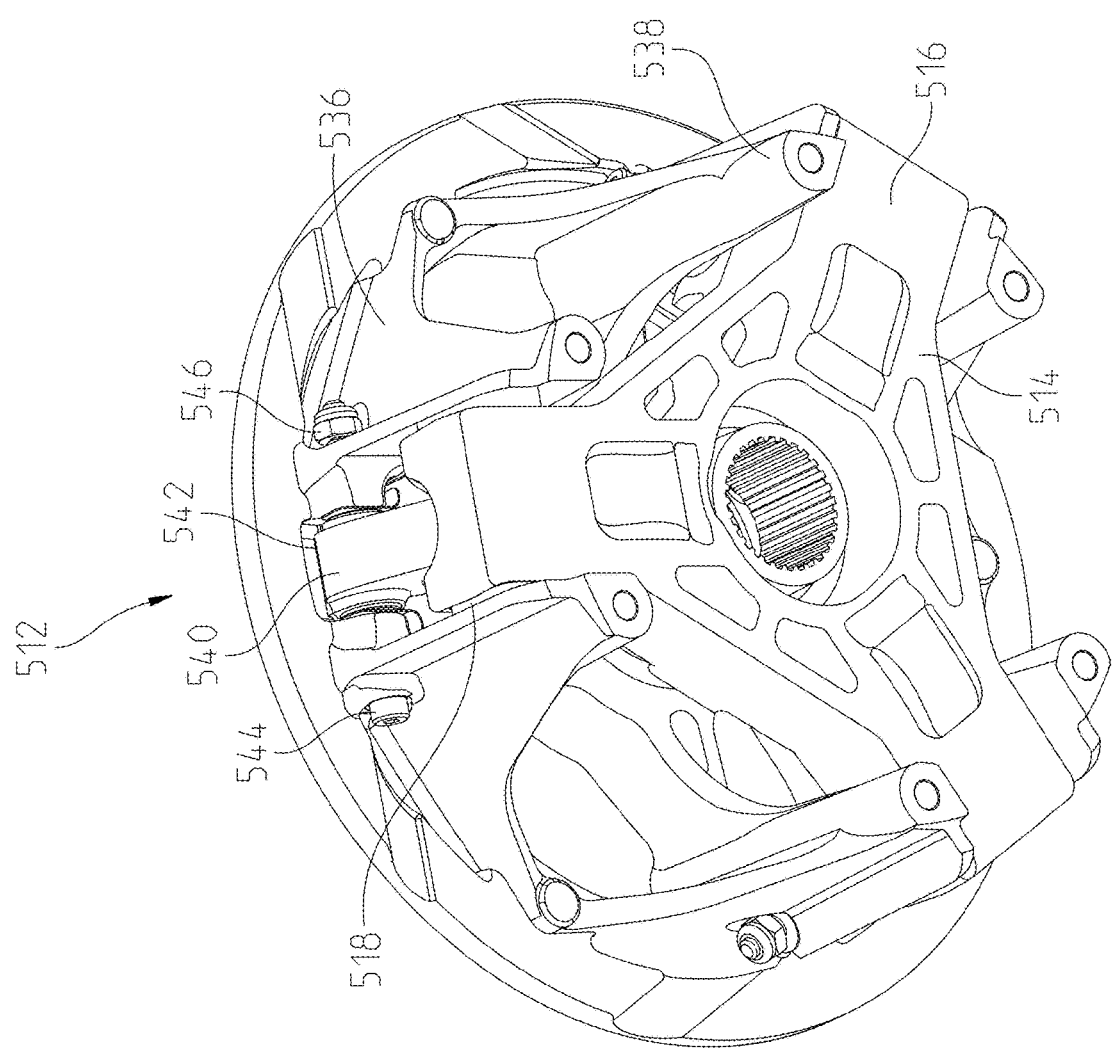
FIG. 63 is a perspective view of a portion drive clutch of the CVT of the vehicle of FIG. 1.
Figure 64:
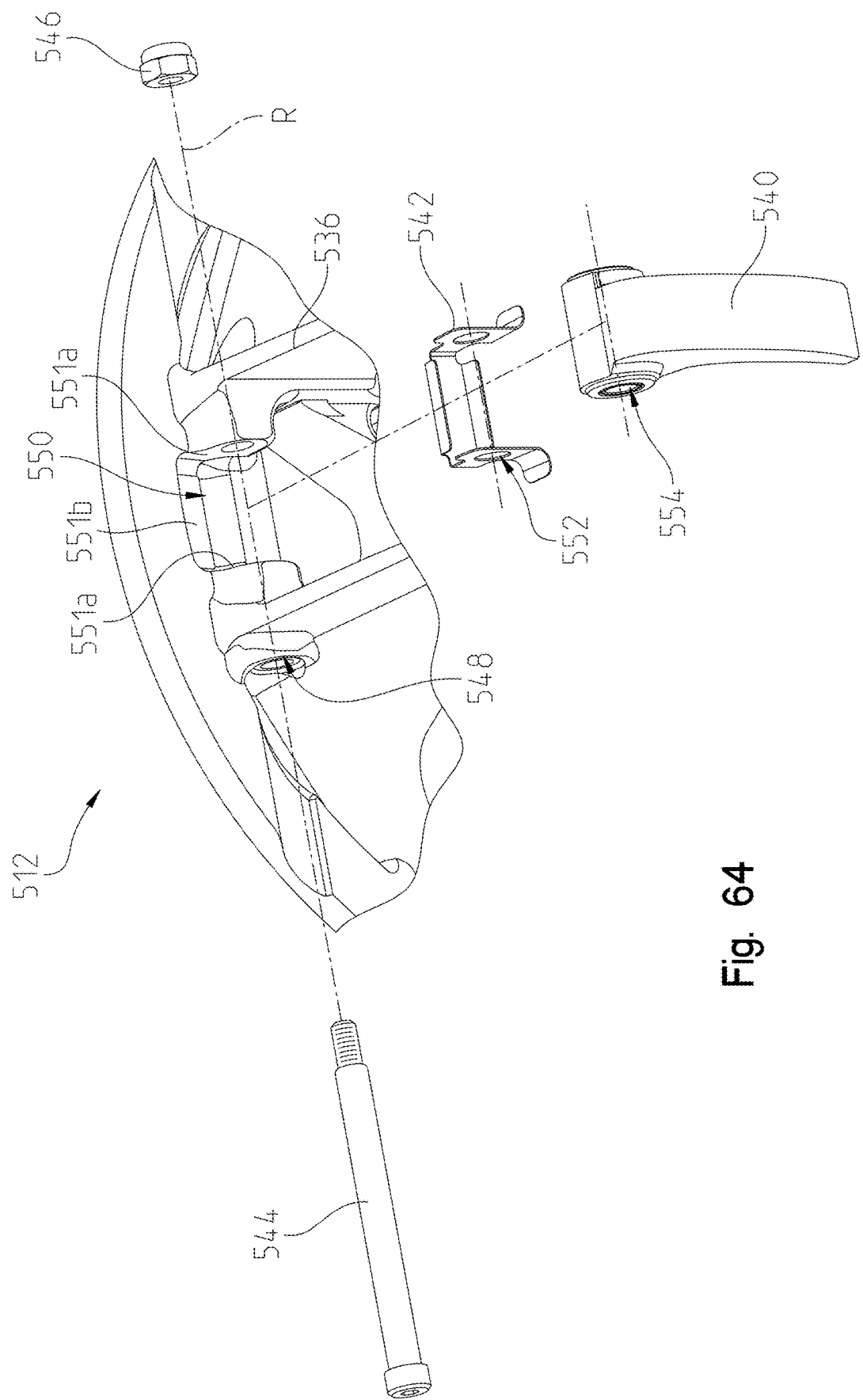
FIG. 64 is an exploded view of the portion of the drive clutch of FIG. 63.
Figure 65:
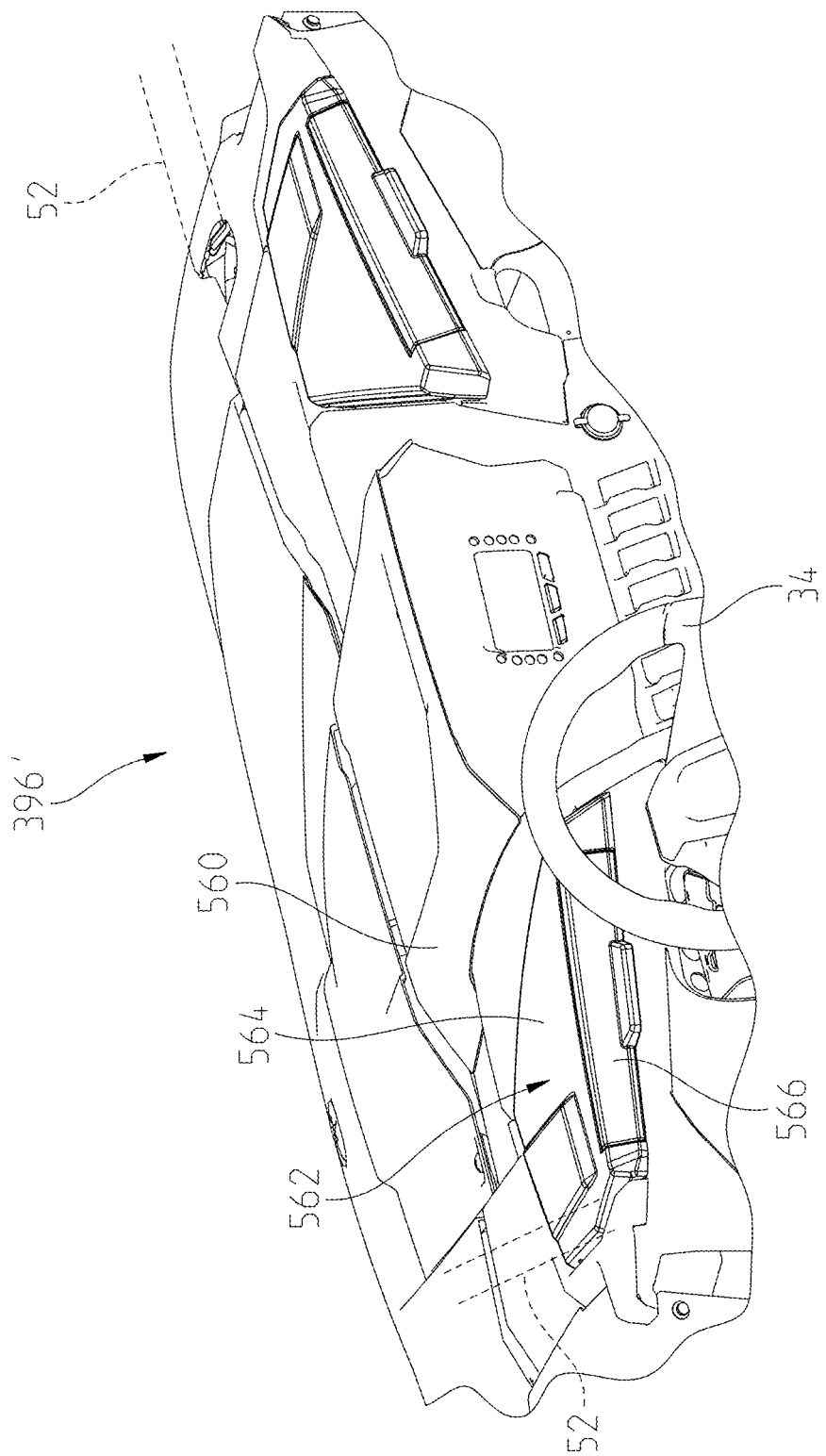
FIG. 65 a left rear perspective view of a first alternative embodiment of the dashboard assembly of the vehicle of FIG. 1.

As shown best in FIGS. 63 and 64, moveable sheave 536 of drive clutch 512 includes weights 540 which are configured to rotate during movement of moveable sheave 536. It may be appreciated that weight 540 is a one-piece weight. Weights 540 are rotatably coupled to moveable sheave 536 with couplers 544, 546. More particularly, a first coupler 544 (e.g., a bolt) extends through bores 548 on moveable sheave 536 and a bore 554 on weight 540 to couple with a second coupler 546 to secure weight 540 to moveable sheave 536. Weight 540 may extend into a notched or recessed area 550 of moveable sheave 536.

A wear plate 542 may be positioned intermediate notched area 550 and weight 540. Illustrative wear plate 542 is a one-piece plate compared to prior art wear mechanisms which may be comprised of multiple components and/or separate components positioned on either side of weight 540. More particularly, wear plate 542 includes opposing arms 551a and a center portion 551b which are integrally formed together to define the one-piece wear plate 542. Arms 551a are positioned on either side of weight 540 to prevent weight 540 or moveable sheave 536 from wear.

Wear plate 542 includes apertures 552 on arms 551a which align with bores 554, 548 such that first coupler 544 extends through moveable sheave 536, wear plate 542, and weight 540. Wear plate 542 is positioned adjacent the rotational axis R of weight 540 to prevent weight 540 and moveable sheave 536 of drive clutch 512 from wearing against each other during rotation of weight 540 because wear can cause binding and inconsistent operation of drive clutch 512 which should be minimized.

Referring now to FIGS. 65-76, an alternative embodiment of dash 396 of FIG. 42 is shown as dash 396'. An upper dash portion 560 may include at least one storage compartment. As shown best in FIGS. 65-69, dash 396' may include a first storage compartment 562 of upper dash portion 560. Storage compartment 562 may be positioned generally forward of driver seat 24 and/or passenger 26. Additionally, storage compartment 562 is positioned adjacent frame tube 52 of cab frame 27 and, illustratively, storage compartment 562 is positioned generally laterally intermediate steering wheel 34 and frame tube 52 and directly forward of steering wheel 34. It may be appreciated that storage compartment 562 is offset from steering wheel 34 and is positioned towards a left side of steering wheel in order to prevent storage compartment 562 from interfering with any gauges or displays and/or steering components. In this way, storage compartment 562 is positioned laterally inward of frame tube 52 on the left side of vehicle 2 and is laterally intermediate a portion of steering wheel 34 (e.g., a center point of steering wheel 34) and cab frame 27. Storage compartment 562 also is positioned longitudinally intermediate steering wheel 34 and a forwardmost extent of frame tube 52. Additionally, storage compartment 562 is rearward of a forward extent of frame tubes 52 and/or a windshield of vehicle 2. Storage compartment 562 is configured to open to a position in which at least a portion of storage compartment 562 is positioned vertically higher than at least the center point of steering wheel 34.

Referring still to FIGS. 65-69, storage compartment 562 includes a lid assembly 564, a handle assembly 566, and a storage bin 568. Storage bin 568 may be coupled to a portion of dash 396' with fasteners received through bosses 588, 594

Figure 69:
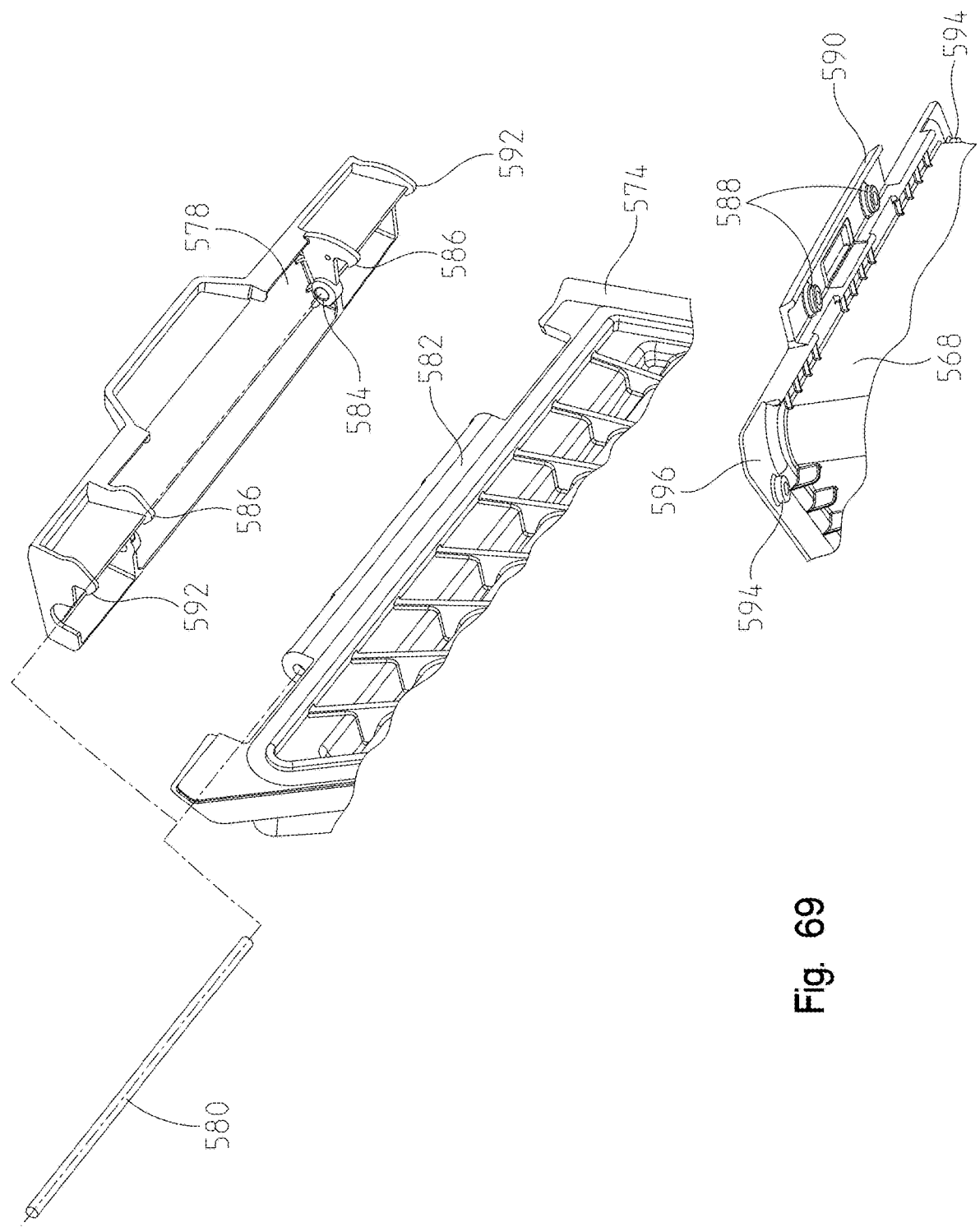
FIG. 69 is an exploded view of a handle assembly of the storage compartment of FIG. 66.
Figure 70:
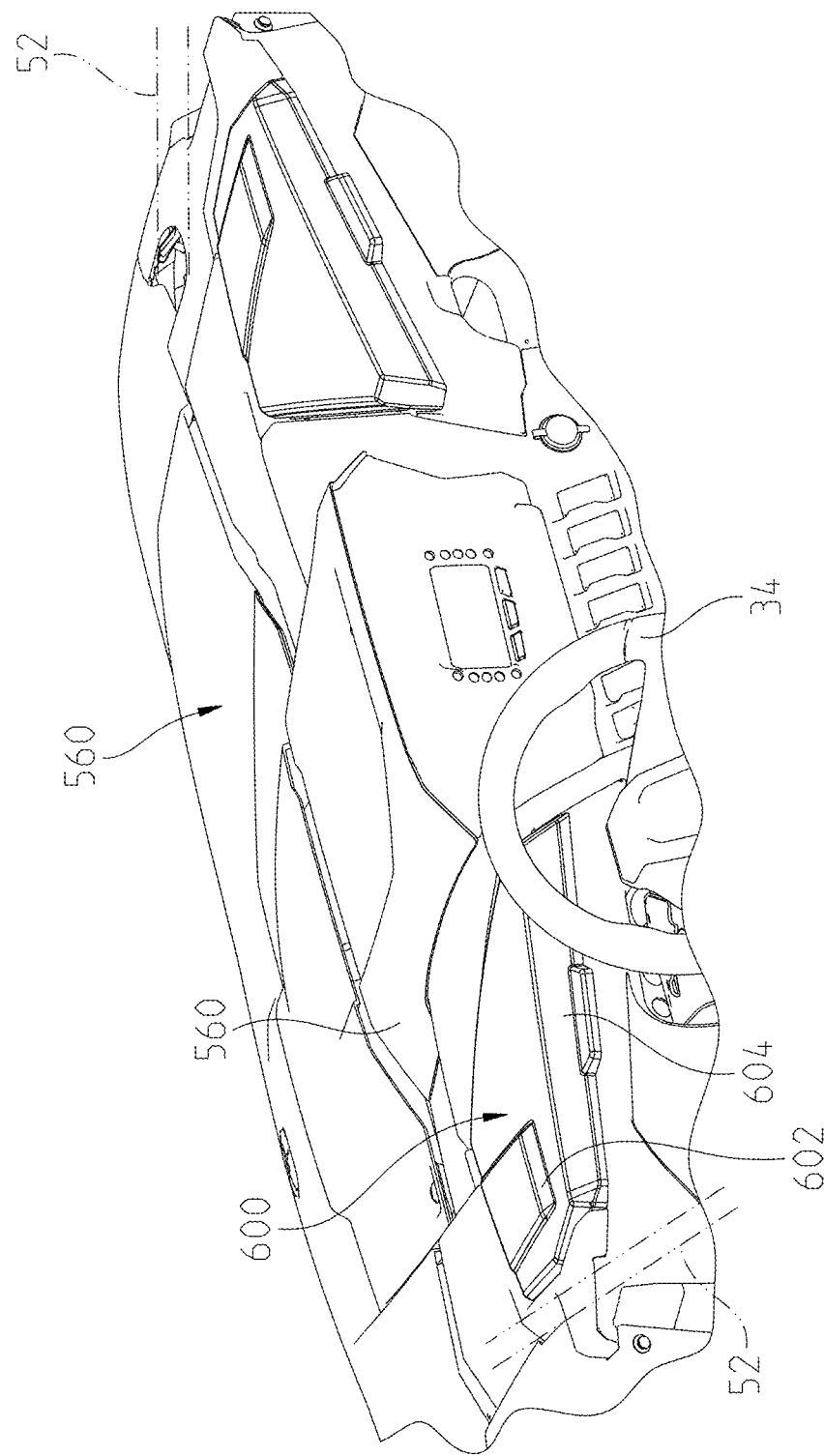
FIG. 70 is a left rear perspective view of a second alternative embodiment of the dashboard assembly of the vehicle of FIG. 1.

(FIG. 69). Storage bin 568 may include an electrical connection or component, such as a USB port. Lid assembly 564 is hingedly coupled to storage bin 568 with a hinge assembly 570. Illustratively, lid assembly 564 may be comprised of a plurality of components, such as an outer lid 572 and an inner lid 574. Inner lid 574 is positioned adjacent storage bin 568 and may be configured as a structural member of lid assembly 564. Outer lid 572 is positioned outward of inner lid 574 such that inner lid 574 is positioned vertically intermediate storage bin 568 and outer lid 572. Outer lid 572 may be configured as a decorative member of lid assembly 564. Outer lid 572 and inner lid 574 are coupled together such that rotation of lid assembly 564 rotates both outer lid 572 and inner lid 574 together.

Figure 66:
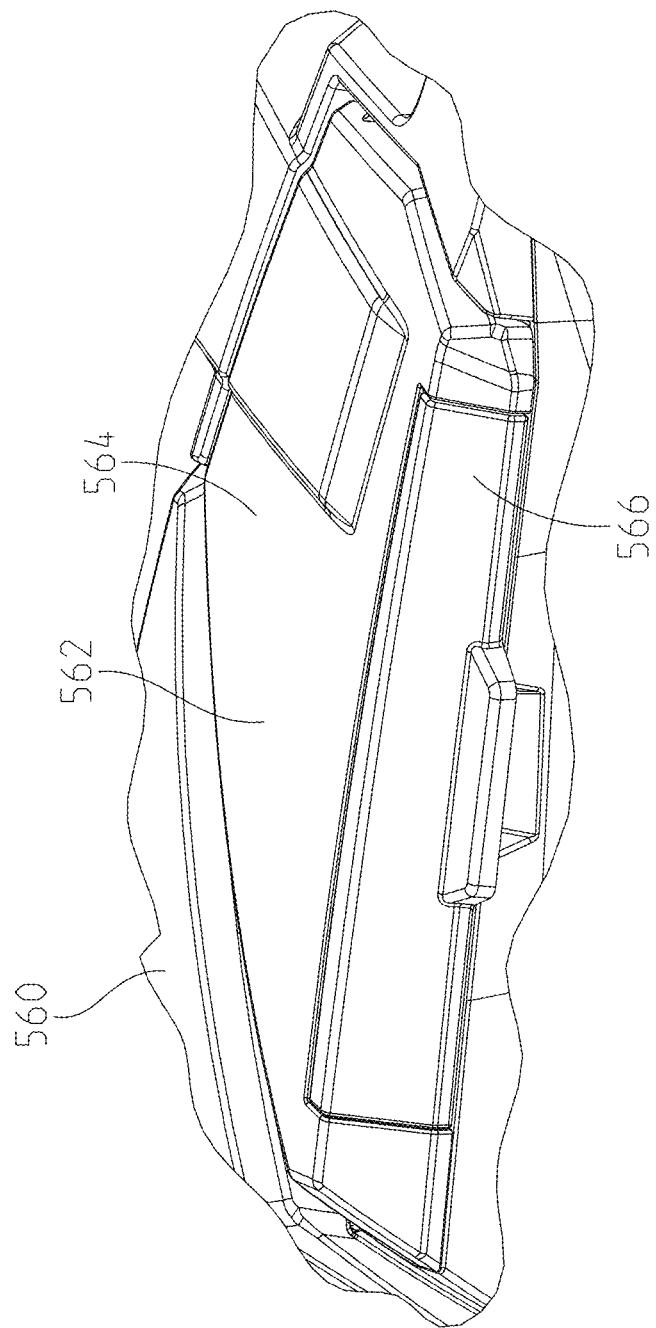
FIG. 66 is a rear perspective view of a storage compartment of the dashboard assembly of FIG. 65 in a closed position.
Figure 67:
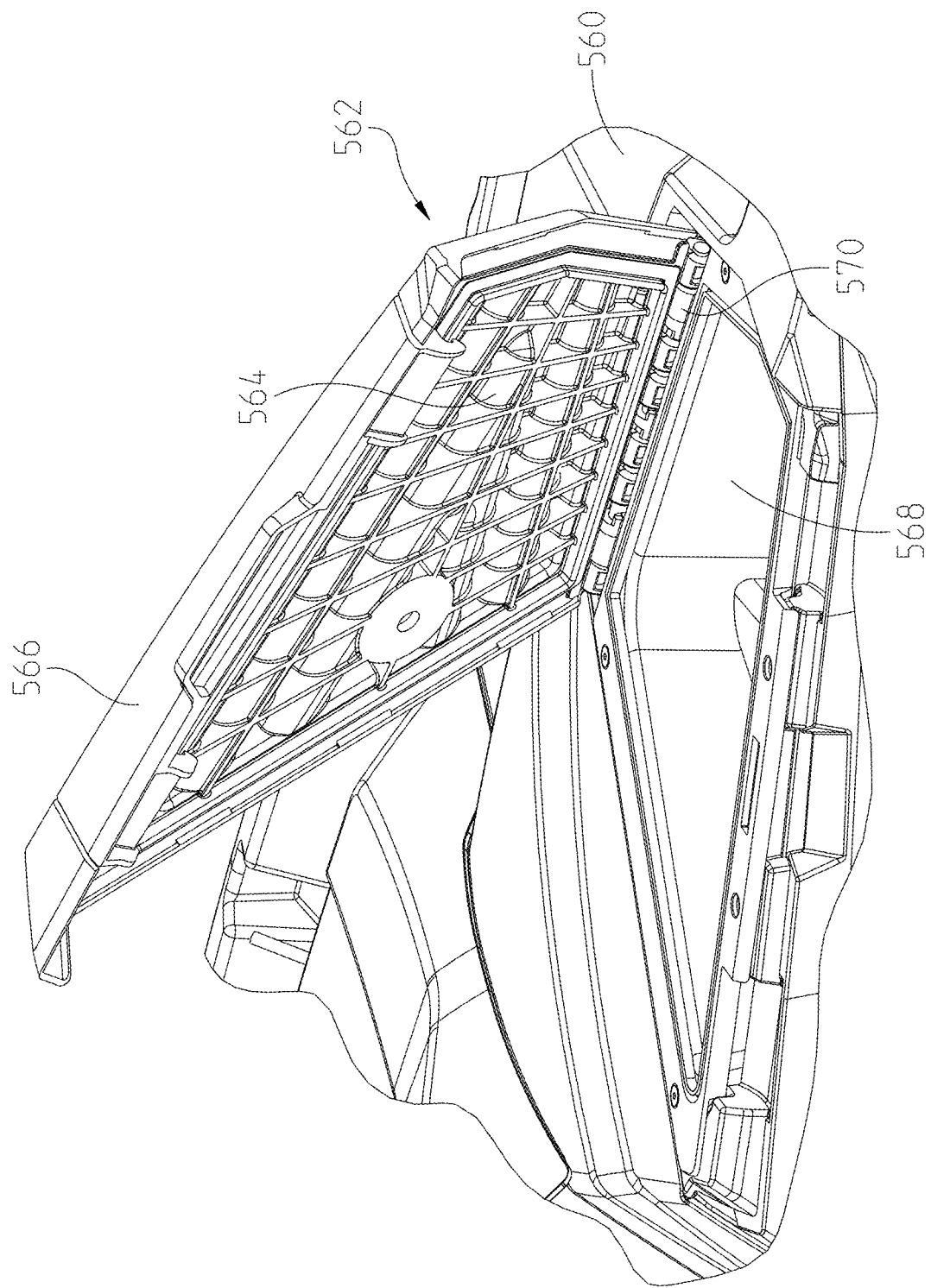
FIG. 67 is a rear perspective view of the storage compartment of FIG. 66 in an open position.
Figure 68:
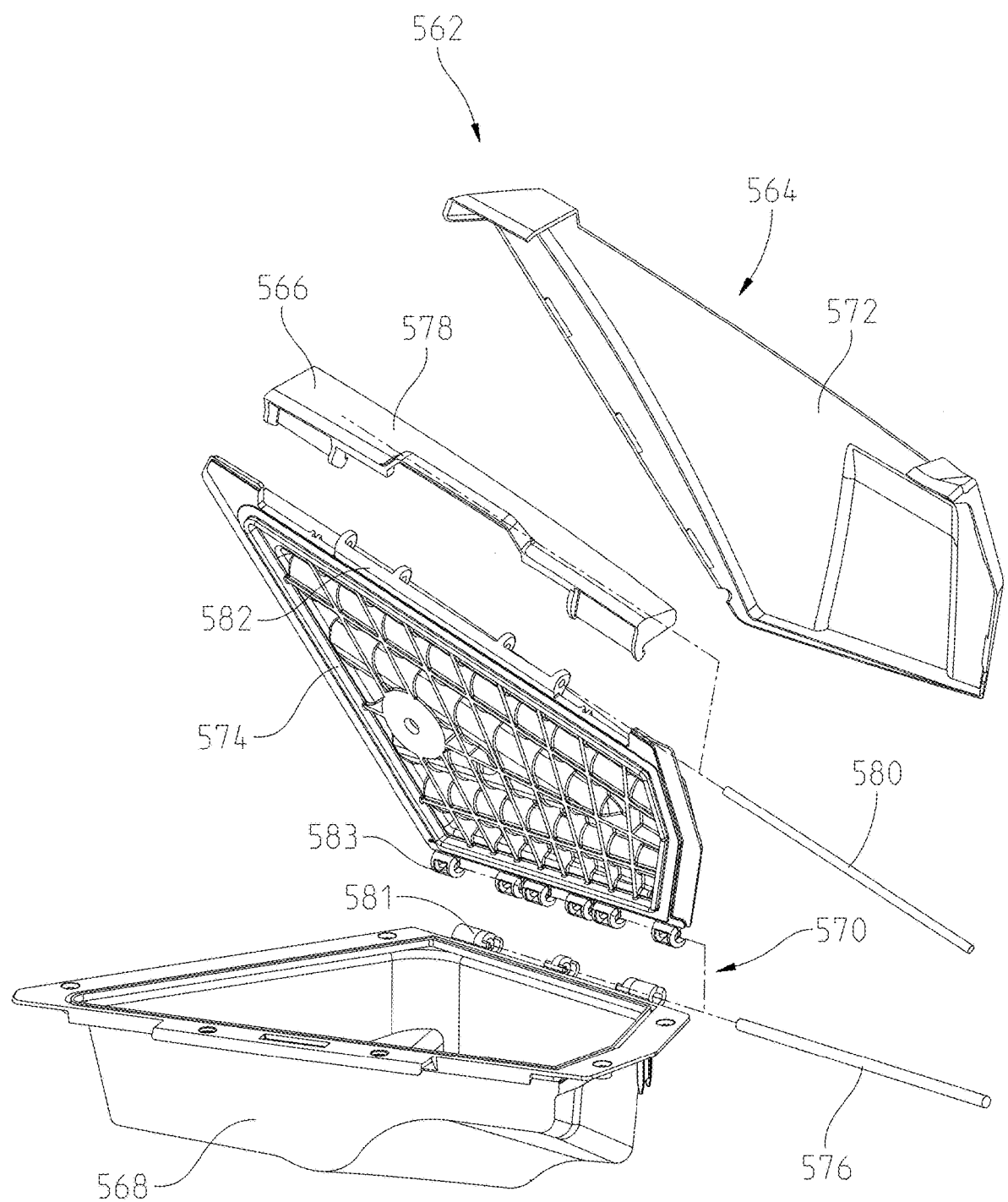
FIG. 68 is an exploded view of the storage compartment of FIG. 66.

When storage compartment 562 is in the closed position, as shown in FIG. 66, an upper surface of lid assembly 564 is generally flush with an upper surface of upper dash portion 560. However, in order to access storage bin 568, lid assembly 564 is configured to rotate to an open position, as shown in FIG. 67. Hinge assembly 570 allows for rotation of lid assembly 564 relative to storage bin 568. Hinge assembly 570 includes a hinge pin 576 which extends through a channel 581 on storage bin 568 and at least one corresponding channel member 583 on inner lid 574. In this way, hinge pin 576 rotatably couples together inner lid 574 and storage bin 568 and allows for rotation of inner lid 574 relative to storage bin 568.

When it is desired to open storage compartment 562 to access storage bin 568, handle assembly 566 is configured to release lid assembly 564 from storage bin 568. Handle assembly 566 includes a handle latch 578 and a handle pin 580 which extends through at least one channel member 582 on inner lid 574 and at least one corresponding channel member 584 on handle latch 578. Handle pin 580 allows for handle latch 578 to rotate relative to inner lid 574, thereby allowing handle latch 578 to be released from storage bin 568 to open lid assembly 564. More particularly, handle latch 578 includes first catches 586 configured to cooperate with a recessed portion on storage bin 568 (e.g., configured to cooperate with a tab 590). Additionally, handle latch 578 includes second catches 592 configured to cooperate with a second recessed portion of storage bin 568 (e.g., configured to cooperate with a lip 596 of storage bin 568). In this way, when lid assembly 564 is closed against storage bin 568, handle assembly 566 retains lid assembly 564 in the closed position by securing first and second catches 586, 592 on storage bin 568. When it is desirable to open lid assembly 564, handle latch 578 is rotated about handle pin 580 to release catches 584, 592 from storage bin 568, thereby allowing lid assembly 564 to rotate to the open position.

Lip 596 of storage bin 568 may be comprised of a waterproof sealing material or may include a waterproof sealing material within a groove thereof to ensure that water does not enter storage bin 568 when lid assembly 564 is in the closed position. For further waterproofing of storage bin 568, a cam-over latch may be used to secure lid assembly 564 to storage bin 568 in addition to, or as an alternative to, the configuration of handle assembly 566.

Referring now to FIGS. 70-73, dash 396' may include a second storage compartment 600 of upper dash portion 560. Storage compartment 600 may be positioned generally forward of driver seat 24 and/or passenger 26. Additionally, storage compartment 600 is positioned adjacent frame tube 52 of cab frame 27 and, illustratively, storage compartment 600 is positioned generally laterally intermediate steering wheel 34 and frame tube 52 and directly forward of a portion of steering wheel 34. It may be appreciated that storage compartment 600 is offset from steering wheel 34 and is positioned towards a left side of steering wheel in order to prevent storage compartment 600 from interfering with any gauges or displays and/or steering components. In this way, storage compartment 600 is positioned laterally inward of frame tube 52 on the left side of vehicle 2 and is laterally intermediate a portion of steering wheel 34 (e.g., a center point of steering wheel 34) and cab frame 27. Additionally, storage compartment 600 is rearward of a forward extent of frame tubes 52 and/or a windshield of vehicle 2. Storage compartment 600 is configured to open to a position in which at least a portion of storage compartment 600 is positioned vertically higher than at least the center point of steering wheel 34.

Figure 71:
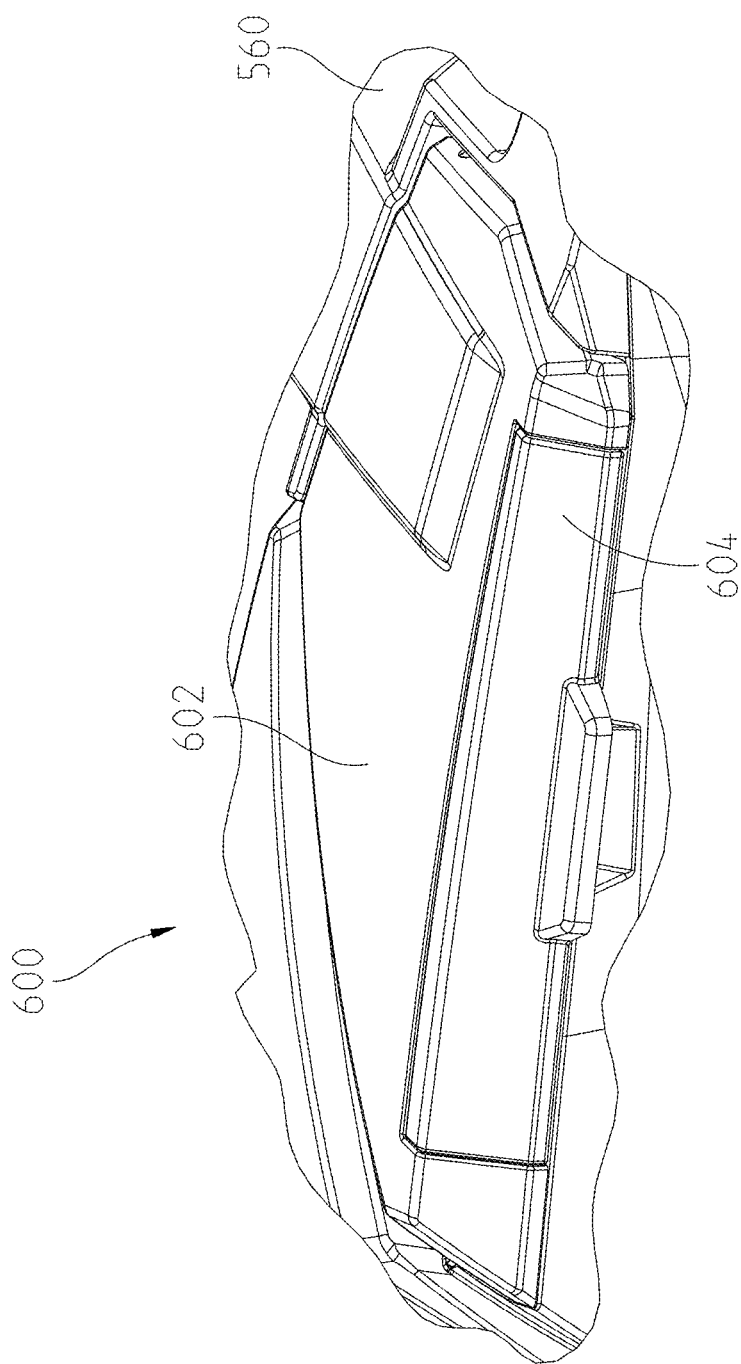
FIG. 71 is a rear perspective view of a storage compartment of the dashboard assembly of FIG. 70 in a closed position.
Figure 72:
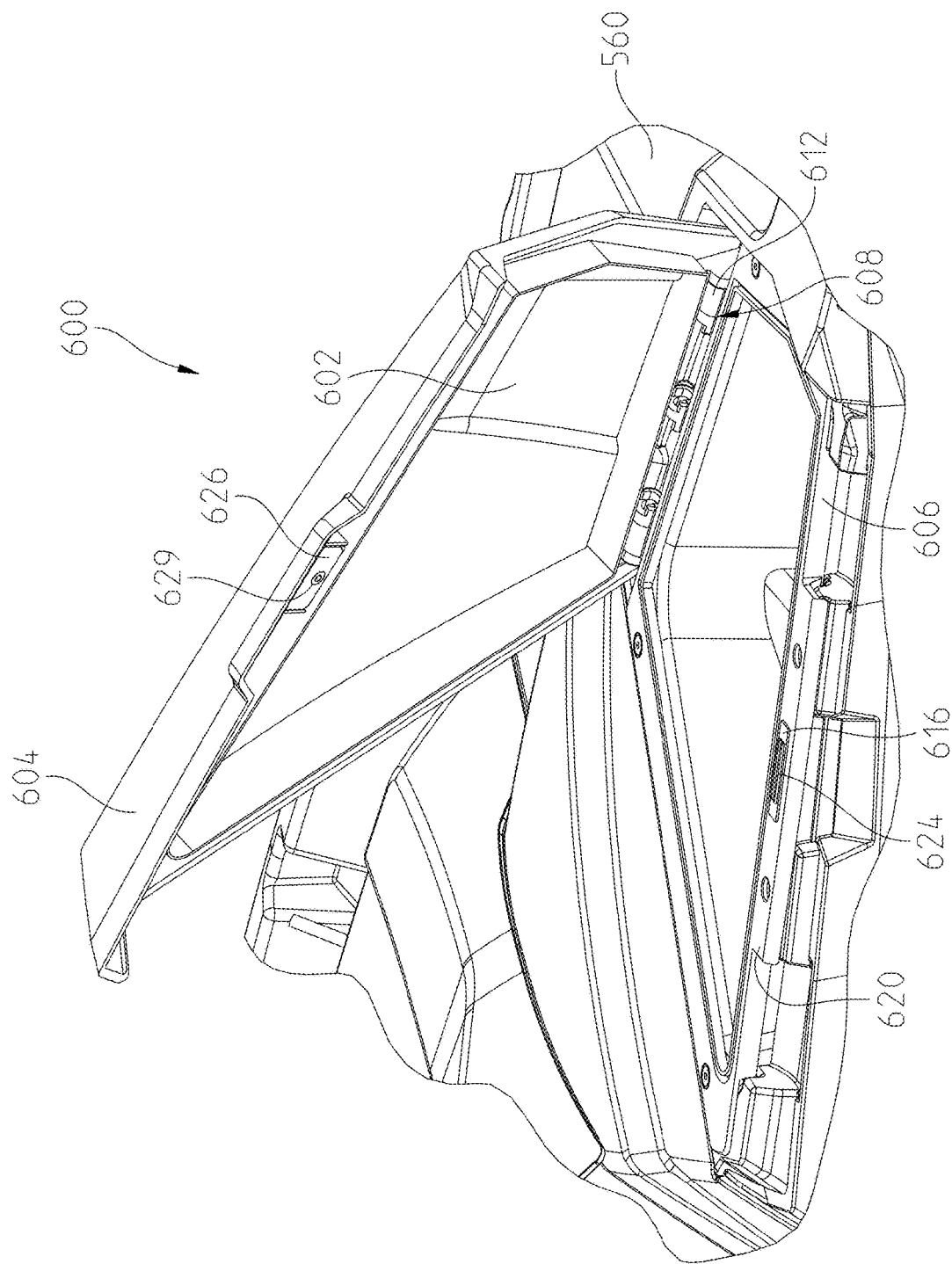
FIG. 72 is a rear perspective view of the storage compartment of FIG. 70 in an open position.
Figure 73:
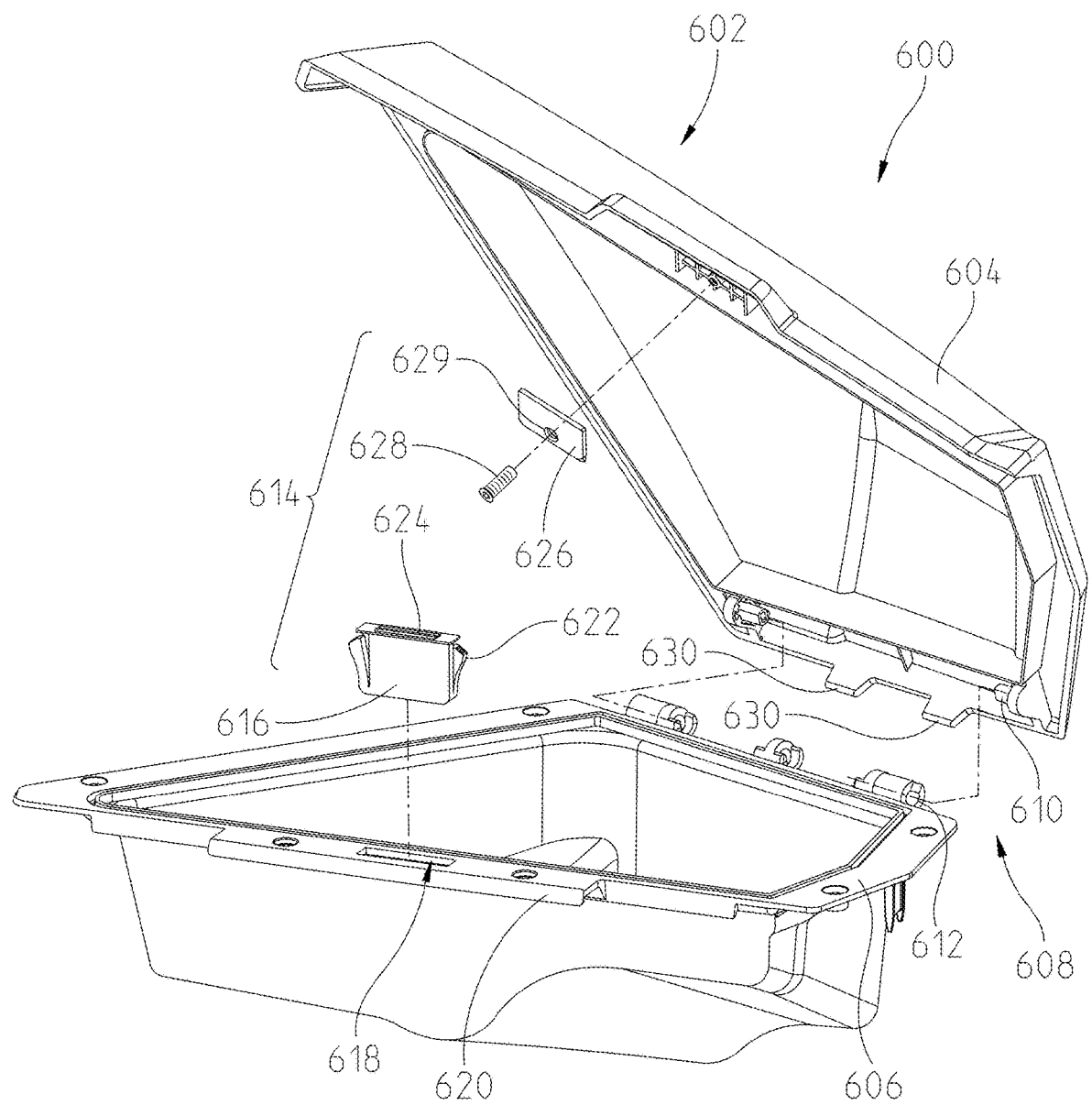
FIG. 73 is an exploded view of the storage compartment of FIG. 71.

Referring still to FIGS. 70-73, storage compartment 600 includes a lid assembly 602, a handle assembly 604, and a storage bin 606. Storage bin 606 may include an electrical connection or component, such as a USB port. Lid 602 may be integrally formed with handle assembly 604 or may be separate therefrom. Lid 602 is configured to rotate about a hinge assembly 608 to move lid 602 between an open position (FIG. 73) and a closed position (FIG. 71). Hinge assembly 608 is comprised of at least one pin 610 extending from an inner surface of lid assembly 602 and configured to be received within at least one channel 612 on storage bin 606. Pin(s) 610 rotate(s) within channel(s) 612 and, because pin(s) 610 is (are) integrally formed with or coupled to lid assembly 602, lid assembly 602 rotates with pin(s) 610 between the open and closed positions.

When lid assembly 602 is in the closed position, handle assembly 604 maintains lid 602 in the closed position. A seal may be positioned intermediate storage bin 606 and lid assembly 602 to ensure a water-tight connection between lid assembly 602 and storage bin 606 when lid assembly 602 is in the closed position. For further waterproofing of storage bin 606, a cam-over latch may be used to secure lid assembly 602 to storage bin 606 in addition to, or as an alternative to, the configuration of handle assembly 604.

Handle assembly 604 may comprised of any mechanical latching mechanism and, illustratively, is comprised of a magnetic latching assembly 614. Other latching assemblies are envisioned, such as cam-over latches, etc. A first magnet 616 may be positioned within an aperture 618 of a tab 620 on storage bin 606. First magnet 616 may be retained within aperture 618 with tension arms 622. First magnet 616 includes a magnetic upper surface 624 which is configured to magnetically couple with a second magnet 626. Second magnet 626 is retained on a portion of handle assembly 604 or lid assembly 602 with a fastener 628 which extends through an aperture 629 of second magnet 626. As such, when lid assembly 602 is in the closed position, the magnetic attraction of magnets 616, 626 retains lid assembly 602 in the closed position.

Figure 74:
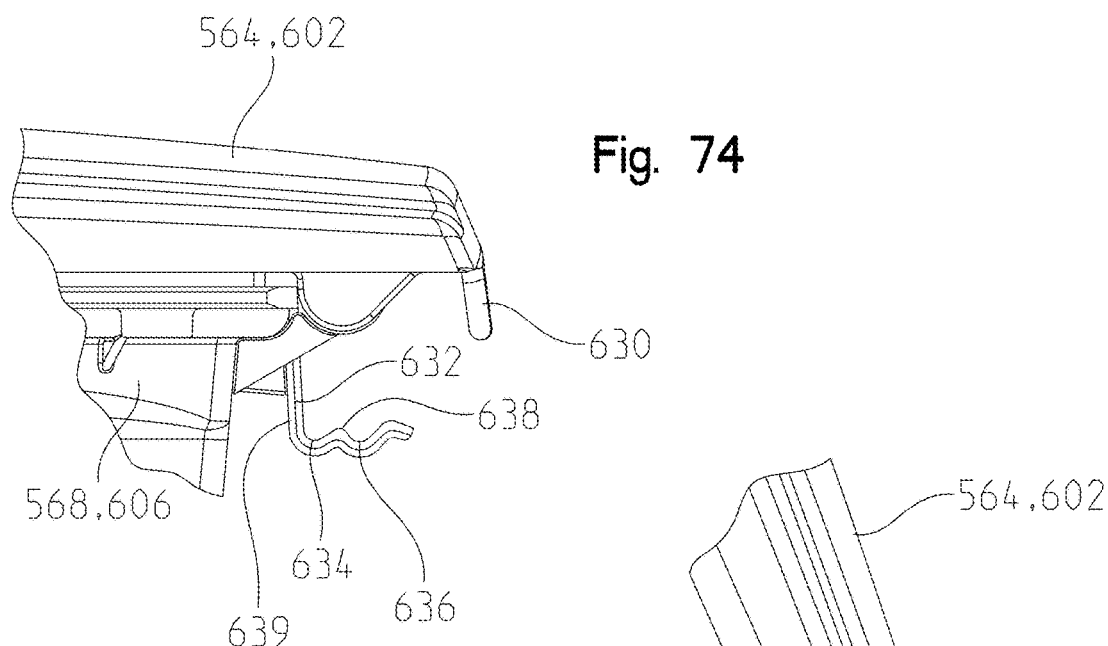
FIG. 74 is a side view of a portion of the storage compartments of FIGS. 66 and/or 71 in a closed position.
Figure 75:
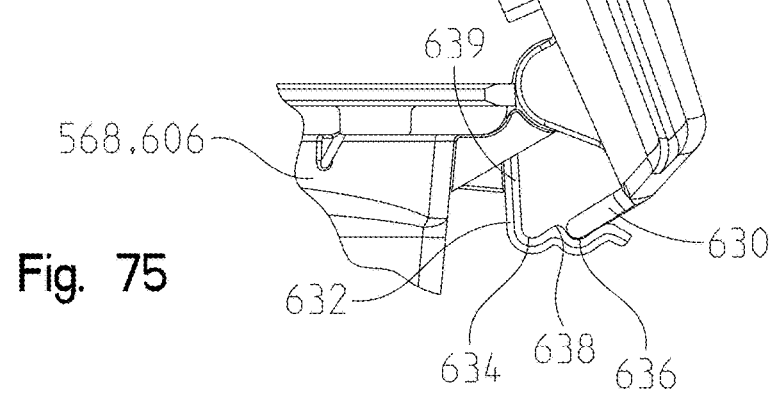
FIG. 75 is a side view of the portion of the storage compartments of FIG. 74 in a first open position.
Figure 76:
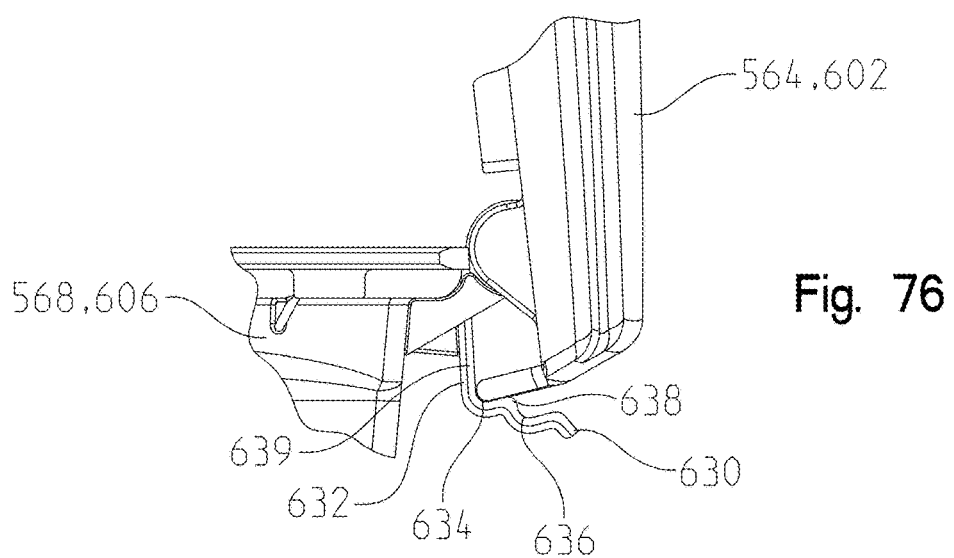
FIG. 76 is a side view of the portion of the storage compartments of FIG. 74 in a second open position.
Figure 77:
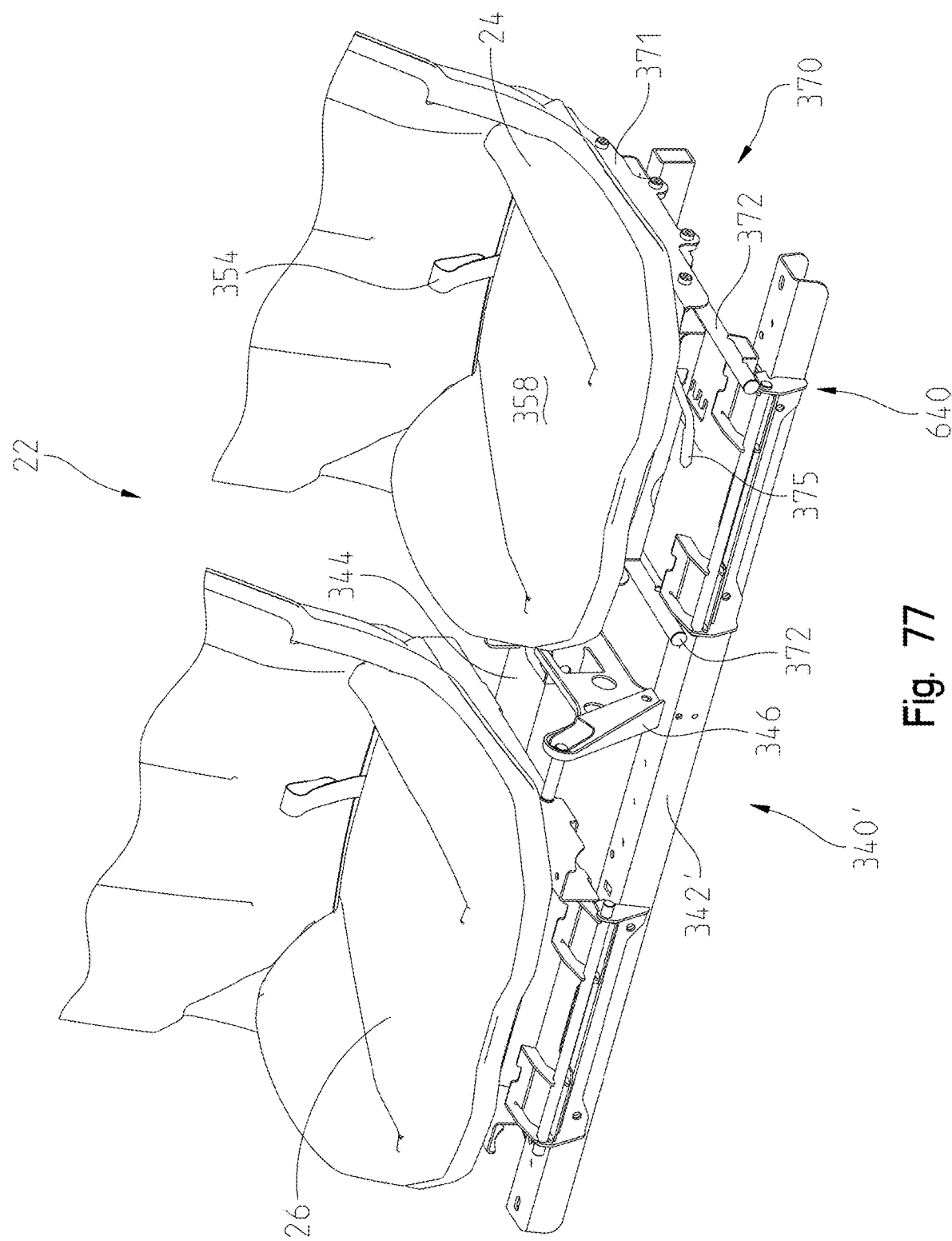
FIG. 77 is a left front perspective view of the seating area of the vehicle of FIG. 1.
Figure 78:
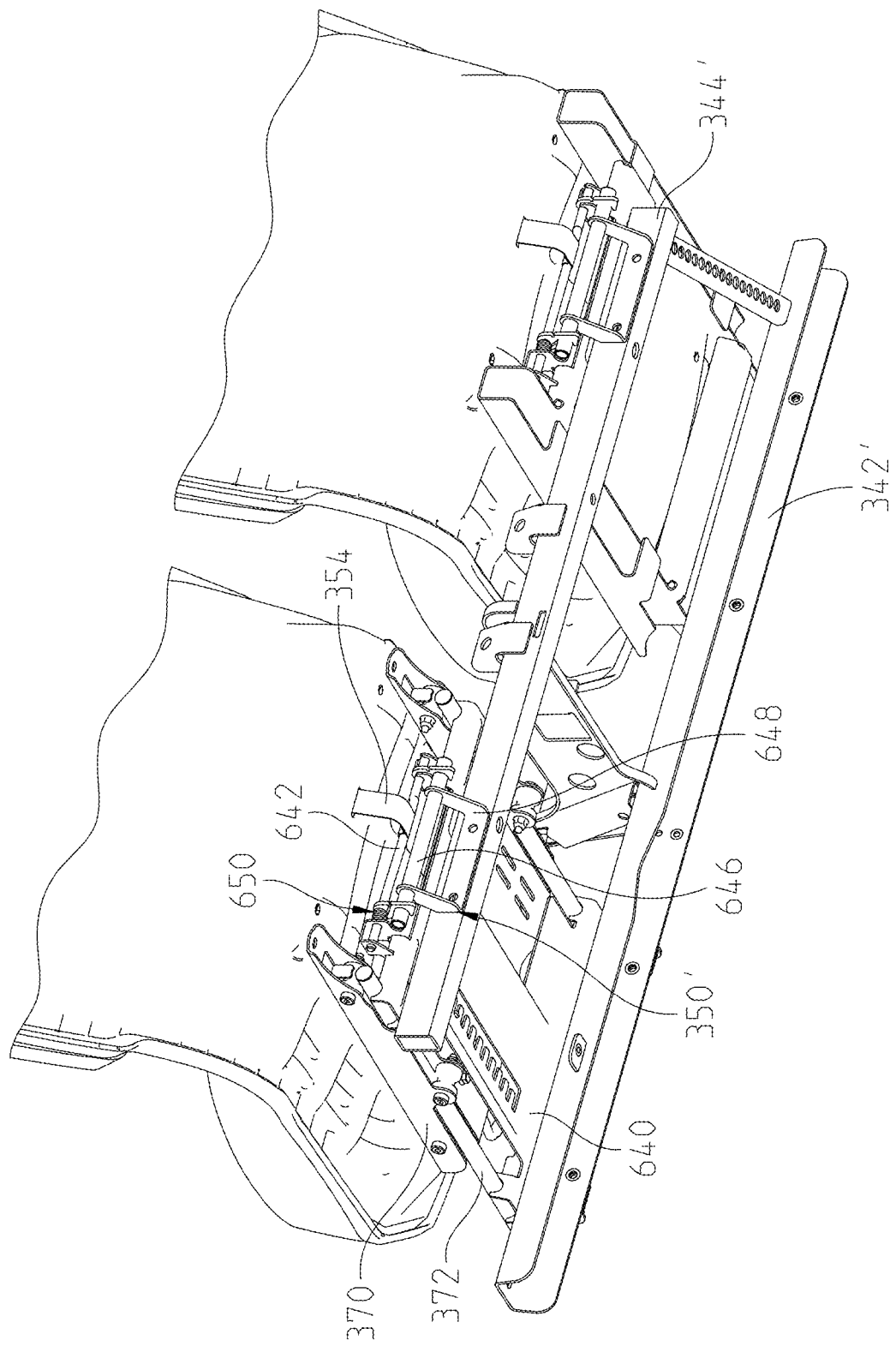
FIG. 78 is a left rear perspective view of the seating area of FIG. 77.

Referring now to FIGS. 74-76, either of lid assemblies 564, 602 may be configured to be retained in a plurality of predetermined open positions. In various embodiments, lid assemblies 564, 602 may be configured to be retained in an infinite number of open positions. Illustratively, lid assemblies 564, 602 are configured to be retained in at least two discrete open positions. More particularly, lid assemblies 564, 602 may include at least one tab 630 extending therefrom and configured to cooperate with a bracket 632 extending from storage bins 568, 606. Bracket 632 includes a first cam or recessed portion 634 and a second cam or recessed portion 636. A protrusion 638 is positioned intermediate first and second recessed portions 634, 636. Bracket 632 is configured to receive a portion of tab 630 when lid assemblies 564, 602 are moved towards the open position.

As shown in FIG. 74, when lid assemblies 564, 602 are in the closed position, tab 630 is spaced apart from bracket 632. However, as lid assemblies 564, 602 are moved to the open position, lid assemblies 564, 602 may be retained in a first open position, as shown in FIG. 75, where bracket 632 receives a portion of tab 630 in second recessed portion 636. Tab 630 is retained within second recessed portion 636 by protrusion 638 because tab 630 is not able to pass over protrusion 638 without external force (e.g., that applied by the operator of vehicle 2). As such, lid assemblies 564, 602 may be retained in the first open position when tab 630 is positioned within second recessed portion 636. In the first open position, lid assemblies 564, 602 may be generally parallel to a windshield of vehicle 2 and/or front frame tubes 52. As shown in FIG. 76, lid assemblies 564, 602 also may be moved to a second open position, in which tab 630 is received within first recessed portion 634 and retained therein by a rearward wall 639 of bracket 632. When in the second open position, lid assemblies 564, 602 are fully opened and cannot be opened any further. In one embodiment, lid assemblies 564, 602 are moved to the second open position only if vehicle 2 does not include a windshield, however, in other embodiments, lid assemblies 564, 602 may be retained in the second open position even when a windshield is supported on vehicle 2.

Referring to FIGS. 77-81, seating area 22 is shown. An alternative embodiment of seating support 340 in FIGS. 39 and 40 is shown as seating support 340' and includes transverse frame members 342' and 344' coupled to lower frame portion 98 of frame 20 (FIG. 39). Seating support 340' supports both seats 24, 26 and, more particularly, supports seat bases 640 for seats 24 and/or 26. Seat bases 640 may allow seats 24, 26 to slide or otherwise move within seating area 22 to adjust the fore/aft position of seats 24, 26, may allow seats 24, 26 to be rotated forwardly within seating area 22, and/or may allow seats 24, 26 to be entirely removed from vehicle 2. Seating support 340' further includes longitudinal bracket 346 coupling transverse frame members 342 and 344 between seats 24, 26.

Each seat base 640 includes seat adjustment mechanism 370, as disclosed with respect to FIGS. 39 and 40. Additionally, seat base 640 includes a securing or latch assembly 350' similar to that shown in FIGS. 39 and 50. Latch assembly 350' allows seats 24, 26 to be rotated forwardly within seating area 22 and/or removed entirely from vehicle 2. Latch assembly 350' includes release mechanism 354 (illustratively a strap), a latch arm 642 coupled to release mechanism 354, and a tension assembly 350 operably coupled to latch arm 642. In this way, when release mechanism 354 is actuated (e.g., pulled from a rearward portion of seat bottom 358), latch arm 642 is engaged to release seat base 640 from frame members 342', 344' which allows seat 24 and/or 26 to be rotated forward and/or removed from vehicle 2.

Figure 79:
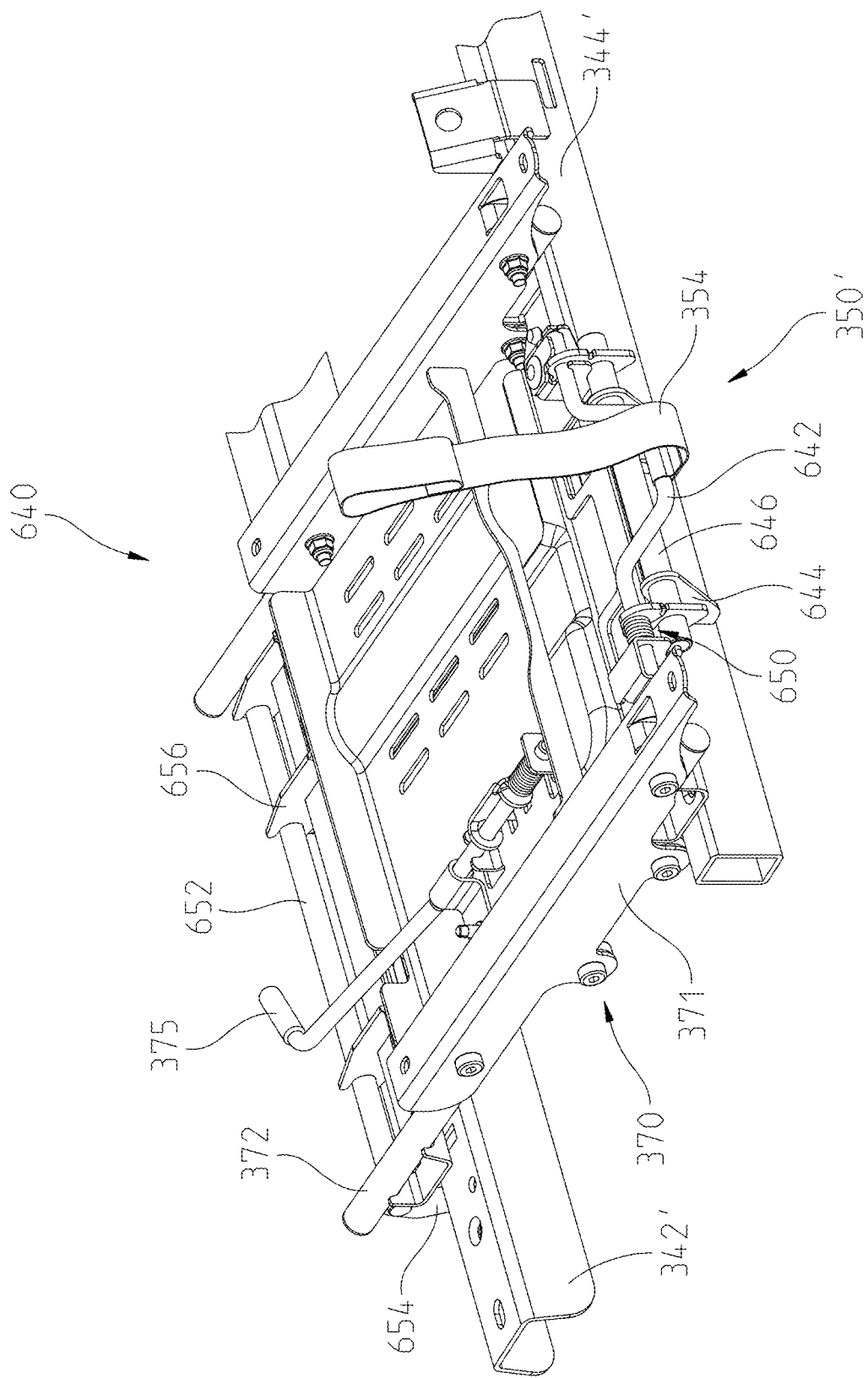
FIG. 79 is a left rear perspective view of a seat base of the seating area of FIG. 78.
Figure 80:
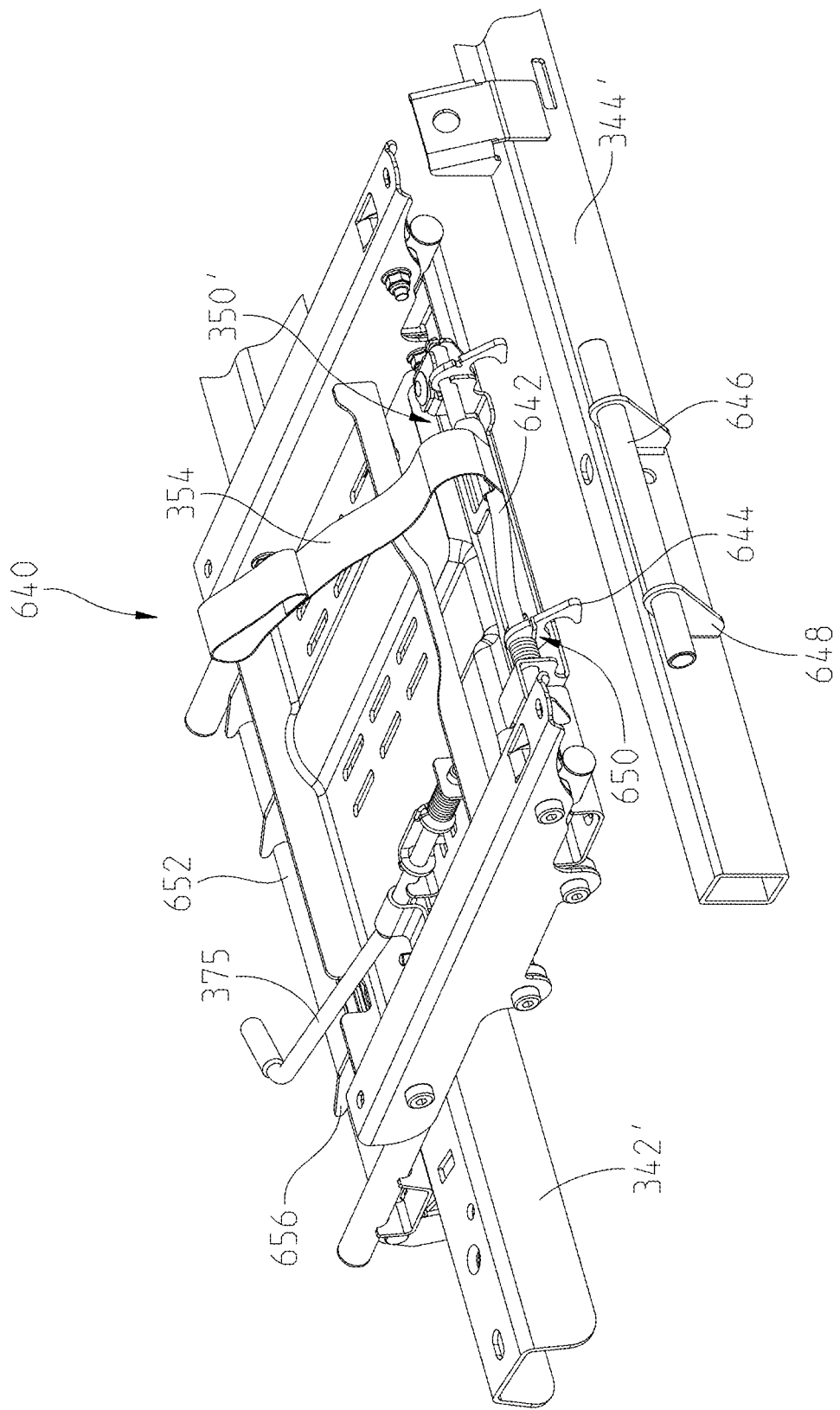
FIG. 80 is a disassembled view of a portion of the seating area of FIG. 79.
Figure 81:
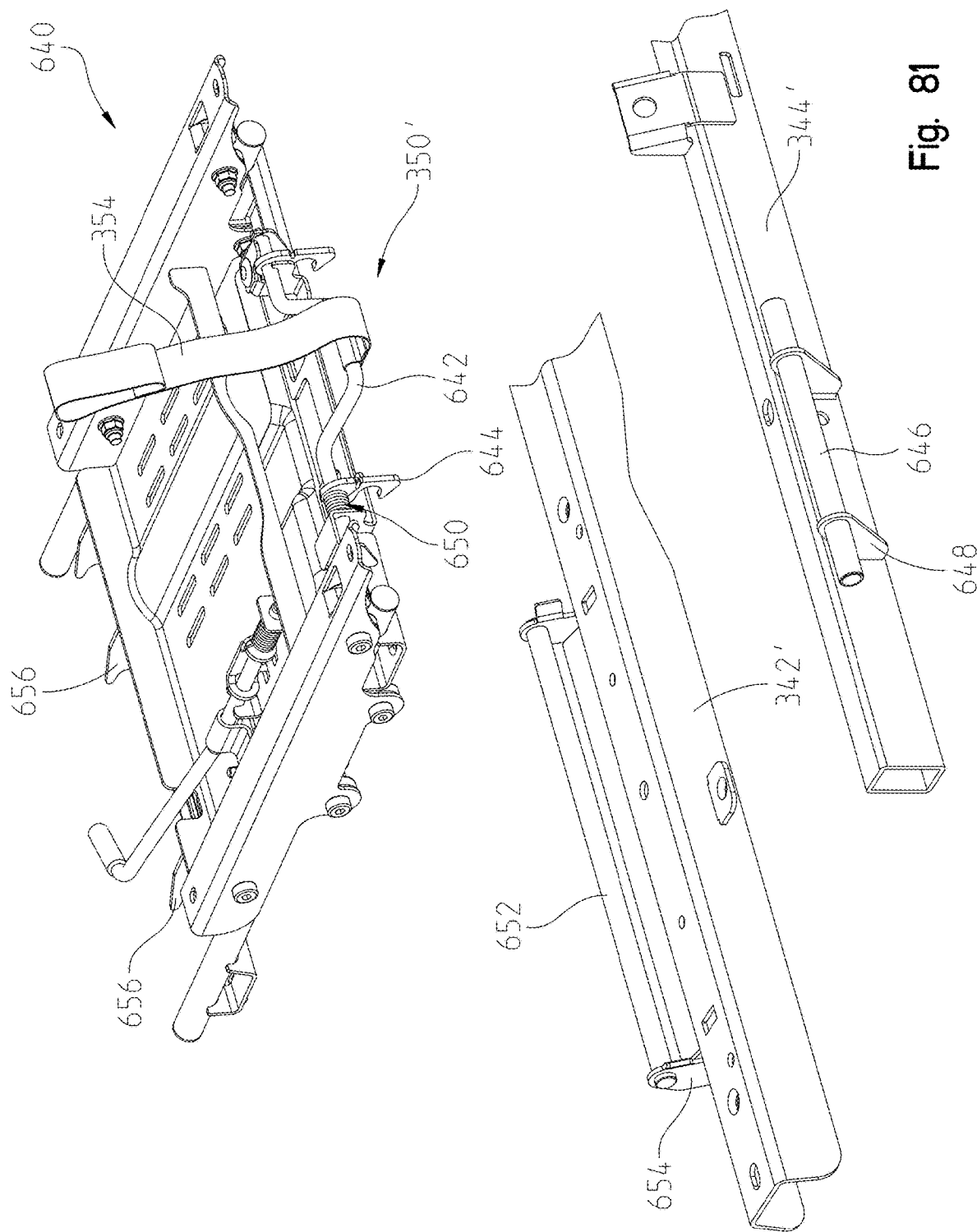
FIG. 81 is a further disassembled view of the seating area of FIG. 80.

Latch assembly 350' is removably coupled to frame members 342', 344', as shown best in FIGS. 79-81. Illustratively, latch arm 642 includes catches or clips 644 coupled thereto and configured to rotate with latch arm 642 when release mechanism 354 is pulled (as shown in FIG. 80 compared to the position of latch arm 642 in FIG. 81). Catches 644 engage a bar 646 coupled to frame member 344' through a bracket 648 at a rear of seating area 22. If it is desirable to rotate or remove seat 24, 26, release mechanism 354 is pulled upwardly which rotates latch arm 642 and releases catches 644 from bar 646 such that the rearward extent of seat base 640 is removed from frame member 344'.

A forward portion of seat base 640 includes arms 656 configured to engage a bar 652 coupled to frame member 342' through a bracket 654. Once latch arm 642 is released from bar 646 and seat is rotated forwardly about bar 652, arms 656 may be disengaged from bar 652 to fully remove seat 24, 26 from vehicle 2. As shown best in FIG. 79, bar 652 is positioned lower than seat adjustment mechanism 370 of seating area 22 which prevents bar 652 from interfering with seat adjustment mechanism 370. When it is desired to move seat adjustment mechanism 370 forward, seat 24, 26 may slide directly over bar 652. In view of the foregoing, it is apparent that seat 24, 26 and corresponding seat base 640 may be fully removed from vehicle 2. It may be appreciated that, because release mechanism 354 is used to release latch arm 642 from bar 646, attachment and removal of seat 24, 26 and seat base 640 to/from frame members 342', 344' are entirely tool-less operations.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
    a frame;
    front and rear ground engaging members supporting the frame;
    a powertrain drivingly coupled to the front and rear ground engaging members;
    a radiator configured to cool the powertrain;
    a seating area supported by the frame; and
    at least one deflector shield positioned between the radiator and the seating area,
    wherein the at least one deflector shield includes at least one opening through a thickness of the at least one deflector shield and at least one slit extending between an edge of the at least one deflector shield and the at least one opening, and wherein the at least one deflector shield is configured to route hot air from the radiator away from the seating area.

2. The vehicle of claim 1, wherein the at least one deflector shield is configured to route the hot air toward at least one of the front and rear ground engaging members.

3. The vehicle of claim 1, wherein the vehicle includes a front portion positioned longitudinally forward of the seating area, and wherein the vehicle further includes a close off wall positioned between the front portion and the seating area.

4. The vehicle of claim 3, wherein the at least one deflector shield is positioned between the radiator and the close off wall.

5. The vehicle of claim 4, wherein the at least one deflector shield is spaced apart from the close off wall to define an air gap therebetween.

6. The vehicle of claim 1, wherein the at least one deflector shield extends on either side of a longitudinal centerline of the vehicle.

7. The vehicle of claim 1, wherein the at least one deflector shield is generally triangular in shape.

8. A vehicle, comprising:
    a frame;

front and rear ground engaging members supporting the frame;
a seating area supported by the frame;
a powertrain drivingly coupled to the front and rear ground engaging members;
a radiator configured to cool portions of the powertrain, the radiator including at least one conduit extending therefrom; and
a deflector shield defining at least one opening through a thickness of the deflector shield, and at least one slit extending between an edge of the deflector shield and the at least one opening wherein the at least one conduit extends through the at least one opening.

9. The vehicle of claim 8, wherein a width of the deflector shield at a lowermost extent is greater than a width of the deflector shield at an uppermost extent.

10. The vehicle of claim 8, wherein the vehicle includes a front portion positioned forward of the seating area, and wherein the vehicle further includes a close off wall positioned between the front portion and the seating area.

11. The vehicle of claim 10, wherein the deflector shield is spaced apart from the close off wall to define an air gap therebetween.

12. The vehicle of claim 8, wherein the deflector shield is configured to route hot air from the radiator away from the seating area and toward the front and rear ground engaging members.

* * * * *